(12) United States Patent
Takenaka et al.

(10) Patent No.: US 7,715,945 B2
(45) Date of Patent: May 11, 2010

(54) GAIT PRODUCING DEVICE FOR MOVING ROBOT

(75) Inventors: Toru Takenaka, Wako (JP); Takashi Matsumoto, Wako (JP); Takahide Yoshiike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 916 days.

(21) Appl. No.: 10/597,931

(22) PCT Filed: Feb. 28, 2005

(86) PCT No.: PCT/JP2005/003345

§ 371 (c)(1),
(2), (4) Date: Aug. 11, 2006

(87) PCT Pub. No.: WO2005/082583

PCT Pub. Date: Sep. 9, 2005

(65) Prior Publication Data

US 2007/0156284 A1    Jul. 5, 2007

(30) Foreign Application Priority Data

Feb. 27, 2004   (JP) ............................. 2004-052823

(51) Int. Cl.
*G06F 19/00* (2006.01)
(52) U.S. Cl. ..................... 700/245; 700/260; 700/261; 700/250; 318/568.17
(58) Field of Classification Search ................ 700/245, 700/250, 260, 261; 318/568.1, 568.11, 568.12, 318/568.17
See application file for complete search history.

(56) References Cited

U.S. PATENT DOCUMENTS 5,426,586 A * 6/1995 Ozawa ........................ 701/23

(Continued)

FOREIGN PATENT DOCUMENTS

EP         856 457         8/1998

(Continued)

OTHER PUBLICATIONS

Quasi-real Time Control of Biped Humanoid Robots, Application of The Control Method to HRP, Samuel Agus Seitawan et al., pp. 1467-1468, (English abstract included).

*Primary Examiner*—Thomas G Black
*Assistant Examiner*—Ce Li
(74) *Attorney, Agent, or Firm*—Rankin, Hill & Clark LLP

(57) ABSTRACT

By using a first dynamic model of a moving robot 1, a provisional motion, which indicates a provisional value of a desired motion of the robot 1, is created such that a desired value of a floor reaction force moment horizontal component and a permissible range of a translational floor reaction force horizontal component are satisfied on the first dynamic model. The difference between a floor reaction force produced on a second dynamic model, which has a dynamic accuracy that is higher than that of the first dynamic model, by the provisional motion and a floor reaction force produced on the first dynamic model is defined as a floor reaction force error. Based on this floor reaction force error, the provisional motion is corrected on the first dynamic model to generate a desired motion. The desired motion is generated such that the value obtained by adding the floor reaction force error to the floor reaction force generated on the first dynamic model satisfies the aforesaid desired value and permissible range.

4 Claims, 19 Drawing Sheets

U.S. PATENT DOCUMENTS

| | | | | |
|---|---|---|---|---|
| 5,594,644 | A * | 1/1997 | Hasegawa et al. | 701/23 |
| 5,872,893 | A * | 2/1999 | Takenaka et al. | 700/245 |
| 6,697,709 | B2 * | 2/2004 | Kuroki et al. | 700/245 |
| 6,876,903 | B2 * | 4/2005 | Takenaka | 700/245 |
| 6,969,965 | B2 * | 11/2005 | Takenaka et al. | 318/568.12 |
| 7,076,337 | B2 * | 7/2006 | Kuroki et al. | 700/254 |
| 7,120,518 | B2 * | 10/2006 | Takenaka et al. | 700/245 |
| 7,308,336 | B2 * | 12/2007 | Takenaka et al. | 700/245 |
| 7,319,917 | B2 * | 1/2008 | Takenaka et al. | 700/245 |
| 7,319,918 | B2 * | 1/2008 | Takenaka et al. | 700/245 |
| 7,337,039 | B2 * | 2/2008 | Takenaka et al. | 700/245 |
| 7,493,192 | B2 * | 2/2009 | Takenaka et al. | 700/260 |

FOREIGN PATENT DOCUMENTS

| | | |
|---|---|---|
| EP | 1 361 027 | 11/2003 |
| JP | 05-305584 | 11/1993 |
| JP | 10-086080 | 4/1998 |
| JP | 10-277969 | 10/1998 |
| JP | 2001-157973 | 6/2001 |
| JP | 02/40224 | 5/2002 |
| JP | 2002-326173 | 11/2002 |
| WO | 03/057427 | 7/2003 |
| WO | 03/061917 | 7/2003 |

* cited by examiner

FIG.12

S024 ENTRY

S200: DETERMINE INITIAL STATES (STATES AT INITIAL TIME Ts) OF FOOT POSITION/POSTURE, BODY POSTURE ANGLE $\theta bs$, AND ARM POSTURES ON THE BASIS OF NORMAL TURNING GAIT PARAMETER.

S202: PROVISIONALLY DETERMINE INITIAL (AT Ts) BODY HORIZONTAL POSITION, VELOCITY, ANGULAR VELOCITY, AND BODY INCLINATION RESTORING MOMENT ZMP-CONVERTED VALUE PEAK VALUE CANDIDATES (Xs, Vxs, $\omega bs$, ZMPrecpeak).

S204 ∞:

- S206: DETERMINE INITIAL BODY VERTICAL POSITION/VELOCITY (Zs, Vzs).
- S208: USING DYNAMIC MODEL, GENERATE GAIT FOR ON STEP ON THE BASIS OF NORMAL TURNING GAIT PARAMETER INCLUDING ZMPrecpeak, TAKING $\theta bs$, (Xs, Vxs, $\omega bs$), (Zs, Vzs) AS INITIAL STATES OF BODY.
- S210: CONVERT TERMINAL BODY HORIZONTAL POSITION, VELOCITY, POSTURE ANGLE, AND ANGULAR VELOCITY OF GENERATED GAIT INTO VALUES OBSERVED FROM SUPPORTING LEG COORDINATE SYSTEM OF NEXT STEP, AND DENOTE THE VALUES BY (Xe, Vxe, $\theta be$, $\omega be$).
- S212: BOUNDARY CONDITION ERRORS (errx, errv, err$\theta$, err$\omega$) = (Xs, Vxs, $\theta bs$, $\omega bs$)−(Xe, Vxe, $\theta be$, $\omega be$)
- S214: ARE ALL errx, errv, err$\theta b$, AND err$\omega b$ WITHIN PERMISSIBLE RANGES? — yes → LEAVE REPETITION LOOP.
- S216: DETERMINE A PLURALITY OF CANDIDATES (Xs+$\Delta$Xs, Vxs, $\omega bs$, ZMPrecpeak), (Xs, Vxs+$\Delta$Vxs, $\omega bs$, ZMPrecpeak), (Xs, Vxs, $\omega bs$+$\Delta\omega bs$, ZMPrecpeak), (Xs, Vxs, $\omega bs$, ZMPrecpeak+$\Delta$ZMPrecpeak) IN THE VICINITY OF (Xs, Vxs, $\omega bs$, ZMPrecpeak), AND BASED ON THEM, DETERMINE BOUNDARY CONDITION ERROR CORRESPONDING TO EACH OF THEM AS DESCRIBED ABOVE.
- S218: DETERMINE NEW CANDIDATES (Xs, Vxs, $\omega bs$, ZMPrecpeak) ON THE BASIS OF BOUNDARY CONDITION ERRORS CORRESPONDING TO (Xs, Vxs, $\omega bs$, ZMPrecpeak) AND EACH OF CANDIDATES IN THE VICINITY THEREOF.

S220: DETERMINE INITIAL BODY HORIZONTAL POSITION, VELOCITY, POSTURE ANGLE, AND ANGULAR VELOCITY (X0, Vx0, $\theta b0$, $\omega b0$), INITIAL BODY VERTICAL POSITION AND VELOCITY (Z0, Vz0), AND INITIAL BODY POSTURE ANGLE AND ANGULAR VELOCITY AT ORIGINAL INITIAL TIME 0.

S222: DETERMINE NORMAL TURNING INITIAL DIVERGENCE COMPONENT q[0] ACCORDING TO THE FOLLOWING EXPRESSION.
q[0] = X0 + Vx0/$\omega$0

S224: DETERMINE q", WHICH IS THE VALUE OF NORMAL TURNING INITIAL DIVERGENCE COMPONENT q[0] OBSERVED FROM SUPPORTING LEG COORDINATE SYSTEM OF CURRENT TIME GAIT, AND (Z0", Vz0"), WHICH ARE VALUES OF INITIAL BODY VERTICAL POSITION AND VELOCITY OBSERVED FROM SUPPORTING LEG COORDINATE SYSTEM OF CURRENT TIME GAIT.

RETURN

ENTRY

S400 DETERMINE DESIRED FLOOR REACTION FORCE VERTICAL COMPONENT AT TIME k ON THE BASIS OF GAIT PARAMETER.

S402 DETERMINE DESIRED ZMP AT TIME k ON THE BASIS OF GAIT PARAMETER.

S404 DETERMINE DESIRED POSITIONS/POSTURES OF BOTH FEET, REFERENCE BODY POSTURE, AND DESIRED ARM POSTURE AT TIME k ON THE BASIS OF GAIT PARAMETER.

S406 CALCULATE TOTAL CENTER-OF-GRAVITY VERTICAL POSITION/VELOCITY THAT SATISFY DESIRED FLOOR REACTION FORCE VERTICAL COMPONENT.

S408 CALCULATE BODY VERTICAL POSITION SATISFYING TOTAL CENTER-OF-GRAVITY VERTICAL POSITION.

S410 DETERMINE TRANSLATIONAL FLOOR REACTION FORCE HORIZONTAL COMPONENT PERMISSIBLE RANGE [Fxmin, Fxmax] AT TIME k ON THE BASIS OF GAIT PARAMETER.

S412 DETERMINE BODY HORIZONTAL ACCELERATION AND BODY POSTURE ANGULAR ACCELERATION SUCH THAT $-Merr\_p(k)$ IS PRODUCED ABOUT DESIRED ZMP. DETERMINE, HOWEVER, BODY HORIZONTAL ACCELERATION AND BODY POSTURE ANGULAR ACCELERATION SUCH THAT VALUE OBTAINED BY ADDING $Ferr\_p(k)$ TO TRANSLATIONAL FLOOR REACTION FORCE HORIZONTAL COMPONENT Fx DOES NOT EXCEED [Fxmin, Fxmax] AND THAT BODY POSTURE ANGULAR ACCELERATION BASED ON ZMPrec PATTERN IS PRODUCED DURING BODY INCLINATION ANGLE RESTORING PERIOD.

S414 INTEGRATE BODY HORIZONTAL ACCELERATION AND BODY POSTURE ANGULAR ACCELERATION TO CALCULATE BODY HORIZONTAL VELOCITY AND BODY POSTURE ANGULAR VELOCITY. INTEGRATE THESE FURTHER TO DETERMINE BODY HORIZONTAL POSITION AND BODY POSTURE.

S415 CALCULATE FLOOR REACTION FORCE MOMENT HORIZONTAL COMPONENT Msmpl(k) ABOUT DESIRED ZMP AND TRANSLATIONAL FLOOR REACTION FORCE HORIZONTAL COMPONENT Fsmpl(k) AT TIME k, WHICH ARE GENERATED ON SIMPLIFIED MODEL BY DETERMINED DESIRED MOTION.

S416 CALCULATE FLOOR REACTION FORCE MOMENT HORIZONTAL COMPONENT Msemifull(k) ABOUT DESIRED ZMP AND TRANSLATIONAL FLOOR REACTION FORCE HORIZONTAL COMPONENT Fsemifull(k) AT TIME k, WHICH ARE GENERATED ON SEMI-FULL MODEL BY DETERMINED DESIRED MOTION.

S418
Merr(k) = Msemifull(k) − Msmpl(k)
Ferr(k) = Fsemifull(k) − Fsmpl(k)

RETURN

BODY INCLINATION RESTORING MOMENT ZMP-CONVERTED VALUE OF NORMAL GAIT (ZMPrec)

BODY INCLINATION RESTORING MOMENT ZMP-CONVERTED VALUE OF CURRENT TIME GAIT (ZMPrec)

GAIT PRODUCING DEVICE FOR MOVING ROBOT

TECHNICAL FIELD

The present invention relates to a device for producing desired gaits of a bipedal moving robot or the like.

BACKGROUND ART

As a technology for generating desired gaits of a moving robot, such as a bipedal moving robot, there has been known a technology in which an error of a floor reaction force moment about a desired ZMP or an error of an actual ZMP from the desired ZMP is observed and a gait is corrected to reduce the error, as disclosed in, for example, Japanese Patent No. 3443077 (patent document 1) or in "Realtime walking stabilization control of a biped humanoid robot—Verifying the validity of a walking control module in HRP—"/3P14/ The 18th Annual Conference of the Robotics Society of Japan (non-patent document 1).

However, these technologies do not consider an error of a translational floor reaction force; therefore, if a gait is to be generated for a robot to walk on a road surface having a low friction coefficient or if a gait having a period during which a translational floor reaction force vertical component becomes zero or substantially zero, such as in running, is to be generated, it will be difficult to generate a gait that restrains the robot from slipping.

Thus, technologies disclosed in, for example, Japanese Unexamined Patent Application Publication No. 2002-326173 (patent document 2) and PCT international publication WO/03/057427/A1 (patent document 3) have been proposed by the present applicant. According to the technologies disclosed in these patent documents 2 and 3, an instantaneous desired gait composed of an instantaneous value of a desired motion (instantaneous desired motion) of a robot and an instantaneous value of a desired floor reaction force (instantaneous desired floor reaction force) is sequentially created using a first dynamic model (simplified model), which represents a relationship between motions of the robot (the positions and postures of individual portions) and floor reaction forces, such that a dynamic balance condition (a condition, such as the one in that a translational force component of a floor reaction force takes a desired value or a floor reaction force moment about a certain point takes a desired value) on the first dynamic model is satisfied. Then, the instantaneous desired gait is input to a second dynamic model (full model) wherein a part of the instantaneous desired motion (desired body position/posture, a desired moment about a desired ZMP, or the like) is corrected so as to generate a final instantaneous desired gait in a time series manner.

According to the technology, using a model having high linearity as the first dynamic model (simplified model) makes it possible to efficiently and promptly create a gait that enables a robot to continue a stable motion, and using a model having relatively high dynamic accuracy as a second dynamic model (full model) makes it possible to bring the dynamic accuracy between a motion of a finally generated gait and a floor reaction force closer to the dynamics of an actual robot.

Meantime, according to the technologies disclosed in the aforesaid patent documents 2 and 3, the correction of an instantaneous desired motion (the correction of body position/posture) using the second dynamic model at arbitrary time t is made by using a past value of a moment about a desired ZMP (a correction amount of a moment about a desired ZMP) output from the second dynamic model. More specifically, according to the technologies disclosed in patent documents 2 and 3, a past value of a moment about a desired ZMP output from the second dynamic model is considered to indicate the dynamic error of an instantaneous value of a gait newly created using the first dynamic model and then the instantaneous value of a new gait is corrected on the basis of the past value of the moment. In other words, there is a temporal difference between the motion of a gait that has been finally corrected using the second dynamic model and a floor reaction force (the moment about a desired ZMP) that is referred to when making the correction.

However, the dynamic error of a gait created using the first dynamic model changes, depending on a gait motion pattern, so that the past value of the moment about the desired ZMP output from the second dynamic model does not necessarily indicate a dynamic error of an instantaneous value of a new gait created using the first dynamic model. Further, the second dynamic model has high nonlinearity, so that a motion of a gait created using it tends to diverge. Hence, according to the technologies disclosed in patent documents 2 and 3, it has been necessary to correct a desired ZMP trajectory or to generate a floor reaction force moment about a desired ZMP so as to restrain a desired motion trajectory of a robot from deviating from a motion trajectory of a gait created using the first dynamic model. And in this case, there have been occasions where a correction amount of a desired ZMP trajectory or a floor reaction force moment about a desired ZMP becomes relatively large, which has sometimes led to a difficulty in maintaining a large stability margin. Conversely, if the permissible range of a correction amount of a desired ZMP trajectory or a floor reaction force moment about a desired ZMP is set to be narrow in order to maintain a large stability margin, then the danger of the divergence of a gait has inconveniently increased.

The present invention has been made with a view toward the aforesaid background, and it is an object thereof to provide a gait producing device for a moving robot that is capable of efficiently generating a gait that permits prevention of a slippage of a robot and also capable of successfully securing dynamic accuracy between a motion of the gait and a floor reaction force while ensuring temporal coordination therebetween.

DISCLOSURE OF INVENTION

To fulfill the aforesaid object, according to a first invention of a gait producing device for a moving robot in accordance with the present invention, there is provided a gait producing device that sets a desired value of a floor reaction force moment horizontal component generated by a motion of a moving robot and a permissible range of a translational floor reaction force horizontal component and generates a desired gait that includes at least a desired motion of a moving robot such that the desired value of the floor reaction force moment horizontal component and the permissible range of the translational floor reaction force horizontal component are satisfied, comprising:

a provisional motion creating means that uses a predetermined first dynamic model of the moving robot to create a provisional motion, which is a provisional value of the desired motion, such that the desired value of the floor reaction force moment horizontal component and the permissible range of the translational floor reaction force horizontal component are satisfied on the first dynamic model, and a provisional motion correcting means that corrects the created provisional motion by using the first dynamic model and a predetermined second dynamic model having a dynamic accuracy that is higher than that of the first dynamic model and obtains the corrected motion as the desired motion, wherein provided that, in relation to arbitrary time t of the provisional motion, a difference between the floor reaction force moment horizontal component M2($t$) generated at the time t on the second dynamic model by the provisional motion and the floor reaction force moment horizontal component M1($t$) generated at the time t on the first dynamic model by the provisional motion (M2($t$)−M1($t$)) is defined as a floor reaction force moment horizontal component error Merr(t), and a difference between the translational floor reaction force horizontal component F2($t$) generated at the time t on the second dynamic model by the provisional motion and the translational floor reaction force horizontal component F1($t$) generated at the time t on the first dynamic model by the provisional motion (F2($t$)−F1($t$)) is defined as a translational floor reaction force horizontal component error Ferr(t), then the provisional motion correcting means corrects an instantaneous value of the provisional motion at the time t such that a value obtained by adding either the floor reaction force moment horizontal component error Merr(t) or a first floor reaction force correction amount determined on the basis of at least the floor reaction force moment horizontal component error Merr(t) to the floor reaction force moment horizontal component generated at the time t on the first dynamic model by a motion obtained after correcting the provisional motion agrees with the desired value at the time t, and a value obtained by adding either the translational floor reaction force horizontal component error Ferr(t) or a second floor reaction force correction amount determined on the basis of at least the translational floor reaction force horizontal component error Ferr(t) to the translational floor reaction force horizontal component generated at the time t on the first dynamic model by a motion obtained after correcting the provisional motion satisfies the permissible range at the time t.

Incidentally, in the present invention, the dynamic accuracy of the second dynamic model being higher than that of the first dynamic model means that a floor reaction force generated on the second dynamic model by an arbitrary motion of a robot is closer to an actual floor reaction force (real floor reaction force) acting on the robot when the actual robot performs the motion on a floor assumed for the motion than a floor reaction force generated on the first dynamic model by the motion is. This is not limited to the first invention, but it will apply to any one of second to fourth inventions to be discussed hereinafter.

Further, a desired value of a floor reaction force moment horizontal component on an arbitrary dynamic model being satisfied on an arbitrary motion of a robot means that a floor reaction force moment horizontal component (a moment horizontal component in a floor reaction force wherein dynamics of the dynamic model holds with respect to the motion) generated on the dynamic model about a certain set point of action (e.g., a desired ZMP or a total center-of-gravity point of the robot) by the motion agrees or substantially agrees with a desired value. This is not limited to the first invention, but it will apply also to the second invention to be discussed hereinafter. Furthermore, a permissible range of a translational floor reaction force horizontal component on an arbitrary dynamic model being satisfied on an arbitrary motion of a robot means that a translational floor reaction force horizontal component (a translational force horizontal component in a floor reaction force wherein dynamics of the dynamic model holds with respect to the motion) generated on the dynamic model by the motion falls within the permissible range. This is not limited to the first invention, but it will apply also to the second to the fourth inventions to be discussed hereinafter.

According to the first invention, the provisional motion is temporarily generated by the provisional motion creating means by using the first dynamic model such that the desired value of the floor reaction force moment and the permissible range of the translational floor reaction force horizontal component are satisfied. Then, the provisional motion is corrected by the provisional motion correcting means and the corrected motion is obtained as a desired motion.

At this time, the provisional motion correcting means corrects the instantaneous value of a provisional motion at time t such that a value obtained by adding either the floor reaction force moment horizontal component error Merr(t) or a first floor reaction force correction amount determined on the basis of at least the floor reaction force moment horizontal component error Merr(t) to the floor reaction force moment horizontal component generated at the time t on the first dynamic model by a motion obtained after correcting the provisional motion agrees with the desired value at the time t. At the same time, the provisional motion correcting means corrects an instantaneous value of a provisional motion at the time t such that a value obtained by adding either the translational floor reaction force horizontal component error Ferr(t) or a second floor reaction force correction amount determined on the basis of at least the translational floor reaction force horizontal component error Ferr(t) to the translational floor reaction force horizontal component generated at the time t on the first dynamic model by a motion obtained after correcting the provisional motion satisfies the permissible range at the time t. In this case, the floor reaction force moment horizontal component error Merr(t) at time t is the difference between a floor reaction force moment horizontal component M2($t$) generated at the time t on the second dynamic model by a provisional motion and a floor reaction force moment horizontal component M1($t$) generated at the time t on the first dynamic model by the provisional motion, so that it means an error of a floor reaction force moment horizontal component on the first dynamic model corresponding to a provisional motion at the time t. Similarly, the translational floor reaction force horizontal component error Ferr(t) at time t is the difference between a translational floor reaction force horizontal component F2($t$) generated at the time t on the second dynamic model by a provisional motion and a translational floor reaction force horizontal component F1($t$) generated at the time t on the first dynamic model by the provisional motion, so that it means an error of a translational floor reaction force horizontal component on the first dynamic model corresponding to a provisional motion at the time t.

Thus, a desired motion obtained by correcting a provisional motion as described above is temporally coordinated with a floor reaction force.

Further, a floor reaction force moment horizontal component (referred to as M1'($t$) here) obtained by adding the floor reaction force moment horizontal component error Merr(t) or the first floor reaction force correction amount based on the Merr(t) to a floor reaction force moment horizontal component generated on a first dynamic model by the desired motion approximates a floor reaction force moment horizontal component generated on a second dynamic model by the desired motion, so that M1'($t$) has high dynamic accuracy on a desired motion. Similarly, a translational floor reaction force horizontal component (referred to as F1'($t$) here) obtained by adding the translational floor reaction force horizontal component error Ferr(t) or the second floor reaction force correction amount based on the Ferr(t) to a translational floor reaction force horizontal component generated on a first dynamic model by the desired motion approximates a translational floor reaction force horizontal component generated on a second dynamic model by the desired motion, so that F1'(t) also has high dynamic accuracy on a desired motion. Therefore, determining a desired motion (correcting a provisional motion) such that these M1'(t) and F1'(t) satisfy the desired value and the permissible range, respectively, makes it possible to generate a desired gait having high dynamic accuracy while properly satisfying the desired value and the permissible range.

Further, the aforesaid provisional motion and the correction of this provisional motion (the generation of a desired motion) are performed using the first dynamic model (this usually has higher linearity than that of the second dynamic model), and the second dynamic model is used simply to determine a floor reaction force from a provisional motion. This makes it possible to efficiently and promptly carry out the processing for generating a provisional motion and a desired motion and the processing for calculating a floor reaction force with respect to the provisional motion.

Thus, according to the first invention, it is possible to efficiently generate a gait capable of preventing a robot from slipping and also to successfully secure dynamic accuracy between a motion of the gait and a floor reaction force while ensuring temporal coordination therebetween at the same time.

Further, to fulfill the aforesaid object, according to a second invention of a gait producing device for a moving robot in accordance with the present invention, there is provided a gait producing device that sets a desired value of a floor reaction force moment horizontal component generated by a motion of a moving robot and a permissible range of a translational floor reaction force horizontal component and generates a desired gait that includes at least a desired motion of a moving robot such that the desired value of the floor reaction force moment horizontal component and the permissible range of the translational floor reaction force horizontal component are satisfied, comprising:

a provisional motion creating means that uses a predetermined first dynamic model of the moving robot to create a provisional motion, which is a provisional value of the desired motion, such that the desired value of the floor reaction force moment horizontal component and the permissible range of the translational floor reaction force horizontal component are satisfied on the first dynamic model, and a provisional motion correcting means that corrects the created provisional motion by using the first dynamic model and a predetermined second dynamic model having a dynamic accuracy that is higher than that of the first dynamic model and obtains the corrected motion as the desired motion, wherein provided that, relative to arbitrary time t of the provisional motion, a difference between the floor reaction force moment horizontal component M2(t) generated at the time t on the second dynamic model by the provisional motion and the desired value MT(t) of the floor reaction force moment horizontal component at the time t (M2(t)−MT(t)) is defined as a floor reaction force moment horizontal component error Merr(t), and a difference between the translational floor reaction force horizontal component F2(t) generated at the time t on the second dynamic model by the provisional motion and the translational floor reaction force horizontal component F1(t) generated at the time t on the first dynamic model by the provisional motion (F2(t)−F1(t)) is defined as a translational floor reaction force horizontal component error Ferr(t), then the provisional motion correcting means corrects an instantaneous value of the provisional motion at the time t such that a value obtained by adding either the floor reaction force moment horizontal component error Merr(t) or a first floor reaction force correction amount determined on the basis of at least the floor reaction force moment horizontal component error Merr(t) to the floor reaction force moment horizontal component generated at the time t on the first dynamic model by a motion obtained after correcting the provisional motion agrees with the desired value at the time t, and a value obtained by adding either the translational floor reaction force horizontal component error Ferr(t) or a second floor reaction force correction amount determined on the basis of at least the translational floor reaction force horizontal component error Ferr(t) to the translational floor reaction force horizontal component generated at the time t on the first dynamic model by a motion obtained after correcting the provisional motion satisfies the permissible range at the time t.

The second invention differs from the first invention only in the aspect that the difference between the floor reaction force moment horizontal component M2(t) generated at the time t on the second dynamic model by the provisional motion and the desired value MT(t) of the floor reaction force moment horizontal component at the time t (M2(t)−MT(t)) is defined as the floor reaction force moment horizontal component error Merr(t). In other words, the provisional motion is generated such that a desired value of the floor reaction force moment horizontal component is satisfied, so that the provisional motion causes a floor reaction force moment horizontal component generated on the first dynamic model (a floor reaction force moment horizontal component calculated on the first dynamic model from the provisional motion) to agree or substantially agree with the desired value. Hence, the second invention has been constructed as described above.

According to the second invention, a desired motion obtained by correcting a provisional motion ensures temporal coordination between itself and a floor reaction force, as with the first invention.

Moreover, as with the first invention, a desired gait with high dynamic accuracy can be generated while properly satisfying a desired value and a permissible range at the same time by determining a desired motion (correcting a provisional motion) such that the floor reaction force moment horizontal component M1'(t) obtained by adding either the floor reaction force moment horizontal component error Merr(t) or the first floor reaction force correction amount based on the Merr(t) to a floor reaction force moment horizontal component generated on the first dynamic model by the desired motion satisfies the desired value and also the translational floor reaction force horizontal component F1'(t) obtained by adding either the translational floor reaction force horizontal component error Ferr(t) or the second floor reaction force correction amount based on the Ferr(t) to a translational floor reaction force horizontal component generated on the first dynamic model by the desired motion satisfies the permissible range.

Further, as with the first invention, the aforesaid provisional motion and the correction of this provisional motion (the generation of a desired motion) are performed using the first dynamic model, and the second dynamic model is used simply to determine a floor reaction force from a provisional motion. This makes it possible to efficiently and promptly carry out the processing for generating a provisional motion and a desired motion and the processing for calculating a floor reaction force with respect to the provisional motion.

Thus, according to the second invention, as with the first invention, it is possible to efficiently generate a gait capable of preventing a robot from slipping and also to successfully secure dynamic accuracy between a motion of the gait and a floor reaction force while ensuring temporal coordination therebetween at the same time.

Further, according to a third invention of a gait producing device for a moving robot in accordance with the present invention, there is provided a gait producing device that sets a desired ZMP of a moving robot and a permissible range of a translational floor reaction force horizontal component generated by a motion of the moving robot, and generates a desired gait that includes at least a desired motion of the moving robot such that the desired ZMP and the permissible range of the translational floor reaction force horizontal component are satisfied, comprising:

a provisional motion creating means that uses a predetermined first dynamic model of the moving robot to create a provisional motion, which is a provisional value of the desired motion, such that the desired ZMP and the permissible range of the translational floor reaction force horizontal component are satisfied on the first dynamic model, and a provisional motion correcting means that corrects the created provisional motion by using the first dynamic model and a predetermined second dynamic model having a dynamic accuracy that is higher than that of the first dynamic model and obtains the corrected motion as the desired motion, wherein provided that, in relation to arbitrary time t of the provisional motion, a difference between ZMP2($t$), which is a ZMP calculated at the time t on the second dynamic model from the provisional motion, and ZMP1($t$), which is a ZMP calculated at time t on the first dynamic model from the provisional motion, (ZMP2($t$)−ZMP1($t$)) is defined as a ZMP error ZMPerr(t), and a difference between the translational floor reaction force horizontal component F2($t$) generated at the time t on the second dynamic model by the provisional motion and the translational floor reaction force horizontal component F1($t$) generated at the time t on the first dynamic model by the provisional motion (F2($t$)−F1($t$)) is defined as a translational floor reaction force horizontal component error Ferr(t), then the provisional motion correcting means corrects an instantaneous value of the provisional motion at the time t such that a value obtained by adding either the ZMP error ZMPerr(t) or a ZMP correction amount determined on the basis of at least the ZMP error ZMPerr(t) to a ZMP calculated at the time t on the first dynamic model from a motion obtained after correcting the provisional motion agrees with the desired ZMP at the time t, and a value obtained by adding either the translational floor reaction force horizontal component error Ferr(t) or a floor reaction force correction amount determined on the basis of at least the translational floor reaction force horizontal component error Ferr(t) to the translational floor reaction force horizontal component generated at the time t on the first dynamic model by a motion obtained after correcting the provisional motion satisfies the permissible range at the time t.

Incidentally, in the third invention, satisfying a desired ZMP for an arbitrary motion of a robot on an arbitrary dynamic model means that the horizontal component of a moment generated about the desired ZMP by the resultant force of an inertial force of the robot generated on the dynamic model by the motion (or a floor reaction force moment horizontal component balancing out the moment) and the gravity acting on the robot becomes zero or substantially zero. The same will apply to a fourth invention to be discussed hereinafter.

According to the third invention, the provisional motion creating means temporarily generates the provisional motion by using the first dynamic model such that the desired ZMP and the permissible range of the translational floor reaction force horizontal component are satisfied. Then, the provisional motion is corrected by the provisional motion correcting means and the corrected motion is obtained as a desired motion. Incidentally, the provisional motion will be equivalent to a provisional motion created by the provisional motion creating means in the first invention if the point of action of a floor reaction force moment in the first invention is defined as a desired ZMP.

At this time, the provisional motion correcting means corrects an instantaneous value of a provisional motion at time t such that the value obtained by adding either the ZMP error ZMPerr(t) or a ZMP correction amount determined on the basis of at least the ZMP error ZMPerr(t) to a ZMP calculated at the time t on the first dynamic model by a motion obtained after correcting a provisional motion agrees with the desired ZMP at the time t. This means that a floor reaction force moment horizontal component corresponding to a ZMP error ZMPerr(t) or the ZMP correction amount based thereon is generated about a desired ZMP. At the same time, as with the first invention described above, the provisional motion correcting means corrects an instantaneous value of a provisional motion at time t such that the value obtained by adding either the translational floor reaction force horizontal component error Ferr(t) or a floor reaction force correction amount determined on the basis of at least the translational floor reaction force horizontal component error Ferr(t) to a translational floor reaction force horizontal component generated at the time t on the first dynamic model by a motion obtained after correcting a provisional motion satisfies the permissible range at the time t. In this case, the ZMP error ZMPerr(t) at time t indicates the difference between a ZMP (ZMP2($t$) calculated at the time t on the second dynamic model from a provisional motion and a ZMP (ZMP1($t$)) calculated at the time t on the first dynamic model from the provisional motion, so that it means an error of a ZMP on the first dynamic model corresponding to a provisional motion at the time t. Further, as in the case of the first invention, the translational floor reaction force horizontal component error Ferr(t) at time t means an error of a translational floor reaction force horizontal component on the first dynamic model corresponding to a provisional motion at the time t.

Accordingly, a desired motion obtained by correcting a provisional motion as described above ensures temporal coordination between itself and a floor reaction force. Incidentally, correcting a provisional motion as described above is equivalent to correcting a provisional motion in the first invention when the point of action of a floor reaction force moment in the first invention is defined as a desired ZMP.

Further, a ZMP (referred to as ZMP1'($t$) here) obtained by adding the ZMP error ZMPerr(t) or the ZMP correction amount based on the ZMPerr(t) to a ZMP calculated on the first dynamic model from the desired motion approximates a ZMP calculated on a second dynamic model from the desired motion, so that ZMP1'($t$) has high dynamic accuracy on a desired motion. And, as in the case of the first invention, a translational floor reaction force horizontal component F1'($t$) obtained by adding the translational floor reaction force horizontal component error Ferr(t) or the floor reaction force correction amount based on the Ferr(t) to a translational floor reaction force horizontal component generated on a first dynamic model by the desired motion also has high dynamic accuracy on a desired motion. Therefore, determining a desired motion (correcting a provisional motion) such that these ZMP1'(t) and F1'(t) satisfy the desired ZMP and the permissible range, respectively, makes it possible to generate a desired gait having high dynamic accuracy while properly satisfying the desired ZMP and the permissible range.

Further, as with the first invention, the aforesaid provisional motion and the correction of this provisional motion (the generation of a desired motion) are performed on the first dynamic model, and the second dynamic model is used simply to determine a floor reaction force from a provisional motion. This makes it possible to efficiently and promptly carry out the processing for generating a provisional motion and a desired motion and the processing for calculating a floor reaction force with respect to the provisional motion.

Thus, according to the third invention, it is possible to efficiently generate a gait capable of preventing a robot from slipping and also to successfully secure dynamic accuracy between a motion of the gait and a floor reaction force while ensuring temporal coordination therebetween at the same time.

Further, to fulfill the aforesaid object, according to a fourth invention of a gait producing device for a moving robot in accordance with the present invention, there is provided a gait producing device that sets a desired ZMP of a mobile body and a permissible range of a translational floor reaction force horizontal component generated by a motion of the moving robot and generates a desired gait that includes at least a desired motion of a moving robot such that the desired ZMP and the permissible range of the translational floor reaction force horizontal component are satisfied, comprising:

a provisional motion creating means that uses a predetermined first dynamic model of the moving robot to create a provisional motion, which is a provisional value of the desired motion, such that the desired ZMP and the permissible range of the translational floor reaction force horizontal component are satisfied on the first dynamic model, and a provisional motion correcting means that corrects the created provisional motion by using the first dynamic model and a predetermined second dynamic model having a dynamic accuracy that is higher than that of the first dynamic model and obtains the corrected motion as the desired motion, wherein provided that, in relation to arbitrary time t of the provisional motion, a difference between ZMP2(t), which is ZMP calculated at the time t on the second dynamic model from the provisional motion, and a desired ZMP(t), which is the desired ZMP at the time t (ZMP2(t)-desired ZMP(t)) is defined as a ZMP error ZMPerr(t), and a difference between the translational floor reaction force horizontal component F2(t) generated at the time t on the second dynamic model by the provisional motion and the translational floor reaction force horizontal component F1(t) generated at the time t on the first dynamic model by the provisional motion (F2(t)–F1(t)) is defined as a translational floor reaction force horizontal component error Ferr(t), then the provisional motion correcting means corrects an instantaneous value of the provisional motion at the time t such that a value obtained by adding either the ZMP error ZMPerr(t) or a ZMP correction amount determined on the basis of at least the ZMP error ZMPerr(t) to a ZMP calculated at the time t on the first dynamic model from a motion obtained after correcting the provisional motion agrees with the desired ZMP(t) at the time t, and a value obtained by adding either the translational floor reaction force horizontal component error Ferr(t) or a floor reaction force correction amount determined on the basis of at least the translational floor reaction force horizontal component error Ferr(t) to the translational floor reaction force horizontal component generated at the time t on the first dynamic model by a motion obtained after correcting the provisional motion satisfies the permissible range at the time t.

The fourth invention differs from the third invention only in the aspect that the difference between the ZMP2(t), which is a ZMP calculated at the time t on the second dynamic model from the provisional motion and the desired ZMP(t), which is the desired ZMP at the time t, (ZMP2(t)-desired ZMP(t)) is defined as the ZMP error ZMPerr(t) In other words, the provisional motion is generated such that the desired ZMP is satisfied, so that the provisional motion causes a ZMP calculated on the first dynamic model from the provisional motion to agree or substantially agree with the desired ZMP. Hence, the fourth invention has been constructed as described above.

According to the fourth invention, a desired motion obtained by correcting a provisional motion ensures temporal coordination between itself and a floor reaction force, as with the third invention.

Moreover, as with the third invention, a desired gait with high dynamic accuracy can be generated while properly satisfying a desired value and a permissible range at the same time by determining a desired motion (correcting a provisional motion) such that the ZMP obtained by adding either the ZMP error ZMPerr(t) or the ZMP correction amount based on the ZMPerr(t) to a ZMP calculated on the first dynamic model from the desired motion satisfies the desired ZMP and also the translational floor reaction force horizontal component F1'(t) obtained by adding either the translational floor reaction force horizontal component error Ferr(t) or the floor reaction force correction amount based on the Ferr(t) to a translational floor reaction force horizontal component generated on the first dynamic model by the desired motion satisfies the permissible range.

Further, as with the third invention, the provisional motion and the correction of the provisional motion (the generation of a desired motion) are performed on the first dynamic model, and the second dynamic model is used simply to determine a floor reaction force from a provisional motion. This makes it possible to efficiently and promptly carry out the processing for generating a provisional motion and a desired motion and the processing for calculating a floor reaction force with respect to the provisional motion.

Thus, according to the fourth invention, it is possible to efficiently generate a gait capable of preventing a robot from slipping and also to successfully secure dynamic accuracy between a motion of the gait and a floor reaction force while ensuring temporal coordination therebetween at the same time.

Incidentally, if a desired gait includes a desired floor reaction force in addition to a desired motion in the first to the fourth inventions explained above, then the M1'(t) and F1'(t), for example, may be defined as constituent elements of a desired floor reaction force in the first and the second inventions described above, and the ZMP1'(t) and F1'(t), for example, may be defined as constituent elements of a desired floor reaction force in the third and the fourth inventions described above. Alternatively, M2(t) and F2(t) may be defined as constituent elements of a desired floor reaction force in the first and the second inventions described above, and ZMP2(t) and F2(t) may be defined as constituent elements of a desired floor reaction force in the third and the fourth inventions described above.

Further, in the first to the fourth inventions, desired gaits generated thereby may be further corrected by using a full model (a third dynamic model), as in the aforesaid patent documents 2 and 3. In this case, the desired gaits generated in the first to the fourth inventions have high dynamic accuracy, making gaits in full models resistant to divergence. This makes it possible to prevent a correction amount of a desired ZMP trajectory or a floor reaction force moment about a desired ZMP from becoming excessive and maintain a large stability margin of a robot.

BEST MODE FOR CARRYING OUT THE INVENTION

The following will explain an embodiment of the present invention with reference to the accompanying drawings. In the embodiment in the present description, as a moving robot, a bipedal moving robot will be used as an example of a moving robot.

FIG. 1 is a schematic diagram showing the outline of the entire construction of a bipedal moving robot to which an embodiment of the present invention is applied.

As shown in the figure, a bipedal moving robot (hereinafter referred to as "the robot") 1 is equipped with a pair of right and left leg bodies (leg links) 2, 2 extended downward from a body (a base body of the robot 1) 3. The two leg bodies 2, 2 share the same construction, each having six joints. The six joints are comprised of, in the following order from the body 3 side, joints 10R, 10L for swinging (rotating) a hip (waist) (for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction. In the present description, the symbols R and L mean that they correspond to the right side and the left side, respectively, of the robot 1.

A foot (foot portion) 22R(L) constituting a distal portion of each leg body 2 is attached to the bottoms of the two joints 18R(L) and 20R(L) of the ankle of each leg body 2. The aforesaid body 3 is installed at the uppermost top of the two leg bodies 2, 2 through the intermediary of the three joints 10R(L), 12R(L) and 14R(L) of the hip of each leg body 2. A control unit 60 and the like, which will be discussed in detail hereinafter, is housed in the body 3. For the sake of convenience of illustration, the control unit 60 is shown outside the body 3 in FIG. 1.

In each leg body 2 having the aforesaid construction, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L)

A pair of right and left arm bodies 5, 5 is attached to both sides of an upper portion of the body 3, and a head 4 is disposed at a top end of the body 3. Each arm body 5 is provided with a shoulder joint composed of three joints 30R(L), 32R(L), and 34R(L), an elbow joint composed of a joint 36R(L), a wrist joint composed of a joint 38R(L), and a hand 40R(L) connected to the wrist joint. The links between the shoulder joint and the elbow joint, and between the elbow joint and the wrist joint, respectively, are formed of rigid bodies.

The construction of the robot 1 described above imparts six degrees of freedom to the foot 22R(L) of each leg body 2 relative to the body 3. During a travel, such as walking, of the robot 1, desired motions of the two feet 22R and 22L can be accomplished by driving 6*2=12 joints of the two leg bodies 2, 2 together ("*" in this description denotes multiplication for scalar calculation, while it denotes an outer product in vector calculation) at appropriate angles. This arrangement enables the robot 1 to arbitrarily move in a three-dimensional space. Furthermore, each arm body 5 is capable of performing a motion, such as arm swinging, by rotating the shoulder joint, the elbow joint, and the wrist joint thereof.

As shown in FIG. 1, a publicly known six-axis force sensor 50 is provided under the ankle joints 18R(L), 20R(L) and between the ankle joints and the foot 22R(L) of each leg body 2. The six-axis force sensor 50 detects primarily whether the foot 22R(L) of each leg body 2 is in contact with the ground and a floor reaction force (ground contact load) acting on each leg body 2, and it outputs detection signals of three-direction components Fx, Fy and Fz of a translational force of the floor reaction force and three-direction components Mx, My and Mz of a moment to the control unit 60. Furthermore, the body 3 is equipped with a posture sensor 54 for detecting an inclination angle of the body 3 relative to a Z-axis (vertical direction (gravitational direction)) and an angular velocity thereof, detection signals thereof being output from the posture sensor 54 to the control unit 60. The posture sensor 54 is provided with an accelerometer and a gyro sensor, which are not shown, and the detection signals of these sensors are used to detect posture angles (inclination angles) of the body 3 and angular velocities thereof. Although detailed structures are not shown, each joint of the robot 1 is provided with an electric motor 64 (refer to FIG. 3) for driving the joint and an encoder (rotary encoder) 65 (refer to FIG. 3) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 3) for manipulating the robot 1 is provided on the exterior of the robot 1. The joystick 73 is constructed in such a manner that a request or a restrictive condition on a gait of the robot 1, such as turning the robot 1 that is traveling straight, specifying the moving direction of the robot 1, or specifying a motion mode of the robot 1, such as walking or running, or a frictional condition of a floor surface (road surface condition), is input to the control unit 60 as necessary by operating the joystick 73. Communication between the joystick 73 and the control unit 60 is effected by a wire or wireless means.

FIG. 2 schematically shows the basic construction of the distal portion (including each foot 22R(L)) of each leg body 2 in the present embodiment. As shown in the figure, a spring mechanism 70 is installed between each foot 22R(L) and the aforesaid six-axis force sensor 50, and a foot sole elastic member 71 made of rubber or the like is bonded to a foot sole (the bottom surface of each foot 22R,L). These spring mechanism 70 and the foot sole elastic member 71 constitute a compliance mechanism 72. Although no detailed illustration is given, the spring mechanism 70 is constructed of a square guide member (not shown), which is installed on the upper surface of the foot 22R(L), and a piston-shaped member (not shown) that is installed adjacently to the ankle joint 18R(L) (the ankle joint 20R(L) being omitted in FIG. 2) and the six-axis force sensor 50 and housed in the guide member through the intermediary of an elastic member (rubber or spring) so that it may be moved extremely slightly.

The foot 22R(L) indicated by a solid line in FIG. 2 is in a state wherein it is being subjected to no floor reaction force. When each leg body 2 is subjected to a floor reaction force, the spring mechanism 70 and the foot sole elastic member 71 of the compliance mechanism 72 flex, causing the foot 22R(L) to shift to the position/posture illustrated by a dashed line in the figure. The structure of the compliance mechanism 72 is important not only to ease a landing impact but also to enhance controllability. The details thereof have been explained in, for example, Japanese Unexamined Patent Publication Application No. 5-305584 previously proposed by the present applicant, so that no further explanation will be given in the present description.

FIG. 3 is a block diagram showing the construction of the control unit 60. The control unit 60 is comprised of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg body 2, the posture sensor 54 (an accelerometer and a rate gyro sensor), the joystick 73, etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates a desired gait, calculates a joint angle displacement command (a command value of a displacement angle of each joint or a rotational angle of each electric motor 64), and sends the calculated command to the RAM 84. The second calculator 92 reads the joint angle displacement command and an actual measurement value of a joint angle detected on the basis of an output signal of the encoder 65 from the RAM 84 to calculate a manipulated variable required for driving each joint and outputs the calculated manipulated variable to the electric motor 64 for driving each joint through the intermediary of the D/A converter 96 and a servo amplifier 64a.

FIG. 4 is a block diagram showing major functional construction of the control unit 60 of the robot 1 in an embodiment in the present description. A portion except the "actual robot" in FIG. 4 is constituted of processing functions implemented by the control unit 60 (primarily the functions of the first calculator 90 and the second calculator 92). The processing function is implemented by programs or the like installed in the control unit 60. In the following explanation, the aforesaid symbols R and L will be omitted as long as it is not particularly necessary to discriminate right and left of each portion of the robot 1 (the leg bodies 2, the arm bodies 5, etc.).

An explanation will be given below. The control unit 60 is equipped with a gait producing device 100 that generates and outputs desired gaits freely in real time, as it will be discussed later. The gait producing device 100 implements an embodiment of the present invention by its functions. A desired gait output by the gait producing device 100 is constituted of a corrected desired body posture trajectory (the trajectory of desired postures of the body 3), a corrected desired body position trajectory (the trajectory of desired positions of the body 3), a desired foot position/posture trajectory (the trajectories of desired positions and desired postures of the feet 22), a desired arm posture trajectory (the trajectory of desired postures of each arm body), a desired ZMP (desired total floor reaction force central point) trajectory, the trajectory of corrected desired floor reaction force moments about a desired ZMP, and a desired total floor reaction force trajectory. If a portion (a head or the like) that can be moved relative to the body 3 is provided in addition to the leg bodies 2 and the arm bodies 5, then a desired position/posture trajectory of the movable portion is added to a desired gait.

Here, the definitions and the like of basic terms related to gaits in the present description will be explained. The term "trajectory" in a gait means a temporal change pattern (time series pattern) and it may be referred to as "pattern" in place of "trajectory." Further, a "posture" means a spatial orientation. For example, a body posture is represented by an inclination angle (posture angle) of the body 3 in the roll direction (about the X-axis) relative to the Z-axis (vertical axis) and an inclination angle (posture angle) of the body 3 in the pitch direction (about the Y-axis), and a foot posture is represented by means of a two-axis spatial azimuth fixedly set on each foot 22. In the present description, a body posture may be referred to as a body posture angle. Desired arm postures related to the arm bodies 5 are represented in terms of relative postures with respect to the body 3 in the embodiment in the present description.

The position of the body means the position of a predetermined representative point of the body 3 (a certain fixed point in a local coordinate system arbitrarily and fixedly set relative to the body 3). Similarly, the position of a foot means the position of a predetermined representative point of each foot 22 (a fixed point in a local coordinate system arbitrarily and fixedly set relative to each foot 22). For example, the representative point of each foot 22 is set on the bottom surface of each foot 22 (more specifically, for example, a point at which a perpendicular line from the center of the ankle joint of each leg body 2 to the bottom surface of each foot 22 intersects with the bottom surface).

The aforesaid corrected desired body posture and corrected desired body position related to the body 3 are obtained by correcting a certain desired body posture (provisional desired body posture) and a desired body position (provisional desired body position) that provide references. In the embodiment in the present description, the desired body position/posture determined by a simplified model gait generator, which will be discussed later (the desired body position/posture determined in S032 of FIG. 10, which will be discussed later), correspond to the desired body position/posture that provide references.

In the explanation hereinafter, the term "desired" will be frequently omitted if there is no danger of misunderstanding.

In a gait, the constituent elements except those related to a floor reaction force, namely, the constituent elements related to the position/posture of each portion of the robot 1, such as foot position/posture and body position/posture, will be referred generically to "motions." Further, a floor reaction force acting on each foot 22 (a floor reaction force composed of a translational force and a moment) will be referred to as "the floor reaction force of each foot," and the resultant force of "the floor reaction forces of individual feet" related to all (two) feet 22R and 22L of the robot 1 will be referred to as "the total floor reaction force." However, in the following explanation, the floor reaction force of each foot will be hardly referred to, so that "the floor reaction force" will be handled as synonymous with "the total floor reaction force" unless otherwise specified.

A desired floor reaction force is generally represented in terms of a point of action and a translational force and moment acting on the point. The point of action can be set anywhere, so that innumerable expressions are conceivable for the same desired floor reaction force; if, however, a desired floor reaction force is represented using, in particular, a desired floor reaction force central point (the desired position of the central point of a total floor reaction force) as the point of action, then the moment component of the desired floor reaction force except for a vertical component (the moment component about a vertical axis (Z-axis)) will be zero. In other words, a horizontal component (the moment about horizontal axes (X-axis and Y-axis)) of the moment of the desired floor reaction force about the desired floor reaction force central point will be zero.

In a gait that satisfies a dynamic balance condition, the ZMP calculated from a desired motion trajectory of the robot 1 (the point at which a moment excluding its vertical component becomes zero, the moment acting about the point due to the resultant force of the inertial force calculated from the desired motion trajectory and the gravity) coincides with the desired floor reaction force central point. This is, therefore, equivalent to providing a desired ZMP trajectory in place of a desired floor reaction force central point trajectory.

Here, when walking of the robot 1 is performed, the vertical component of a translational floor reaction force is subordinately determined when the vertical position of the body 3 (body height) of the robot 1 is determined by the technique for determining a body height previously proposed in, for example, Japanese Unexamined Patent Application Publication No. 10-86080 by the present applicant. Furthermore, the horizontal component of the translational floor reaction force is also subordinately determined when the body horizontal position trajectory (or the position trajectory of the total center-of-gravity) of the robot 1 is determined such that the horizontal component of the moment generated about a desired ZMP by the resultant force of an inertial force attributable to a motion of a desired gait and gravity becomes zero. For this reason, when performing the walking of the robot 1, only the desired ZMP may be set as the physical amount to be explicitly set in relation to a floor reaction force of the desired gait.

Meanwhile, if a travel of the robot 1, e.g., running of the robot 1, is performed with a gait that includes a period during which a floor reaction force becomes zero or substantially zero, then a translational floor reaction force vertical component is also important in controlling the operation of the robot 1. Hence, it is preferred to explicitly set the desired trajectory of the translational floor reaction force vertical component and then to determine the trajectory of a desired body vertical position or the like of the robot 1. Also, when walking of the robot 1 is performed, if the robot 1 is to travel on a floor surface with a low friction coefficient (on a low-μ road), it is preferred to explicitly set a desired trajectory of a translational floor reaction force vertical component to prevent slippage or the like of the robot 1, because the translational floor reaction force vertical component (more precisely, a component of the translational floor reaction force that is perpendicular to the floor surface) influences a frictional force. Furthermore, according to the embodiment of the present invention, in a desired gait finally output by the gait producing device 100, a corrected desired floor reaction force moment (a moment whose horizontal component is not necessarily zero) is generated about a desired ZMP.

Thus, in the embodiment of the present description, the constituent elements related to the floor reaction forces of desired gaits output from the gait producing device 100 include a corrected desired floor reaction force moment about a desired ZMP and a desired translational floor reaction force vertical component in addition to a desired ZMP trajectory.

And, in the present description, a desired gait output by the gait producing device 100 is used to mean "a set of a desired motion trajectory and a desired floor reaction force trajectory in the period of one step or a plurality of steps" in a broad sense, and to mean "a set of a desired motion trajectory and a desired floor reaction force trajectory that includes a desired ZMP, a corrected desired floor reaction force moment and a desired translational floor reaction force vertical component in the period of one step" in a narrow sense.

However, according to the embodiment of the present description, in a desired gait (provisional desired gait) prepared in the process before a final desired gait (a desired gait output from the gait producing device 100) is determined, a gait obtained by removing a corrected desired floor reaction force moment from the desired gait in the aforesaid narrow sense is used to mean a desired gait. Supplementally, according to the embodiment in the present description, a desired gait (a provisional desired gait) prepared in the process before a final desired gait (a desired gait output by the gait producing device 100) is determined is closely associated with the present invention. Hence, the majority of a desired gait appearing in the following explanation will be used to mean a gait obtained by removing a corrected desired floor reaction force moment from a desired gait in the aforesaid narrow sense.

In the following explanation, "a floor reaction force vertical component" will mean "a translational floor reaction force vertical component," and the vertical component (a component about a vertical axis) of the moment in a floor reaction force will use the term "moment" to distinguish it from "a floor reaction force vertical component." Similarly, "a floor reaction force horizontal component" will mean "a translational floor reaction force horizontal component." A translational floor reaction force will sometimes be referred to as a floor reaction force translational force component.

"One step" of a desired gait will be used to mean a period from the moment one leg body 2 of the robot 1 lands to the moment the other leg body 2 lands.

A two-leg supporting period in a gait refers to a period during which the robot 1 supports its own weight by the two leg bodies 2, 2, a one-leg supporting period refers to a period during which the robot 1 supports its own weight only by one leg body 2, and a floating period refers to a period during which both leg bodies 2, 2 are apart from a floor (floating in the air). In the one-leg supporting period, the leg body 2 not supporting the self-weight of the robot 1 is referred to as a free leg. A running gait of the robot 1, in which the one-leg supporting period and the floating period are alternately repeated, does not have the two-leg supporting period. In this case, during the floating period, both leg bodies 2, 2 do not support the self-weight of the robot 1; however, for the sake of convenience, the leg body 2 that was a free leg and the leg body 2 that was a supporting leg during a one-leg supporting period immediately before the floating period will be referred to as a free leg and a supporting leg, respectively, even in the floating period.

The trajectory of a desired gait is described using a global coordinate system (a coordinate system fixed to a floor). As a global coordinate system, a supporting leg coordinate system defined, for example, on the basis of landing position/posture of the foot 22 of a supporting leg is used. This supporting leg coordinate system is, for example, a coordinate system in which the point at which a perpendicular line extended to a floor surface from the center of the ankle joint to which the foot 22 is connected intersects with the floor, while substantially the entire bottom surface of the foot 22 of the supporting leg is in contact with the floor, is defined as the origin, and when the foot 22 of the supporting leg is projected onto a horizontal plane that passes the origin, the longitudinal direction of the foot 22 is defined as the X-axis direction and the lateral direction is defined as the Y-axis direction (the Z-axis direction being the vertical direction). In the following explanation, the X, Y, Z coordinates will mean the coordinates in this supporting leg coordinate system unless otherwise specified.

FIG. 5 is a block diagram showing the details of the gait producing device 100. Referring to this FIG. 5, more specific overview of the processing of the gait producing device 100 will be explained below.

As illustrated, the gait producing device 100 is equipped with a gait parameter determiner 100a. The gait parameter determiner 100a determines the values of gait parameters or a time series table that defines a desired gait.

According to the embodiment of the present description, a gait parameter determined by the gait parameter determiner 100a includes the parameters that define a desired foot position/posture trajectory, a desired arm posture trajectory, a desired ZMP trajectory, and a desired floor reaction force vertical component trajectory, respectively, of a desired gait.

When the gait producing device 100 generates a desired gait, expected landing position/posture and expected landing time of the free leg foot 22, or basic required values (required parameters) for generating a gait, such as the length of a step and moving velocity, are supplied to the gait producing device 100 from the aforesaid joystick 73 or an action planner (a device for preparing action plans of the robot 1), which is not shown. Alternatively, the gait producing device 100 reads the required parameters from a storage medium in which the aforesaid required parameters have been stored beforehand and retained. Then, the gait parameter determiner 100a of the gait producing device 100 determines a gait parameter on the basis of the required parameters.

In the embodiment of the present description, the gait parameter determined by the gait parameter determiner 100a also includes parameters that define a reference body posture trajectory, a ZMP permissible range, and a floor reaction force horizontal component permissible range, respectively.

Although the aforesaid reference body posture trajectory is not the one finally output from the gait producing device 100, it is referred to when determining a desired gait. The reference body posture trajectory is supplied in relation to the body posture of the robot 1 from the joystick 73 or the action planner, or it is a body posture trajectory generated directly on the basis of a requirement (a requirement for retaining a body posture at a vertical posture, or the like) that has been set in advance. A desired body posture (hereinafter, "body posture" with no "reference" attached thereto will indicate a desired body posture) is generated such that it follows or coincides with a reference body posture for a long time.

To add a supplemental explanation regarding the aforesaid ZMP permissible range, in the embodiment in the present description, a desired gait is corrected so as to generate a corrected desired floor reaction force moment (this generally being not zero) about a desired ZMP. Therefore, the desired ZMP will be a point having a different definition from an original definition (the definition in that it is a point with zero floor reaction force moment horizontal component), and a ZMP that satisfies the original definition (hereinafter referred to as true ZMP) moves to a position shifted from the desired ZMP by a value obtained by dividing the corrected desired floor reaction force moment by a desired floor reaction force vertical component.

The true ZMP of a corrected gait (the desired gait finally output from the gait producing device 100) must fall within a range wherein at least ZMP can exist (a so-called supporting polygon: a range wherein a floor reaction force point of action (ZMP) can exist when it is assumed that no adhesive force acts between a floor and the bottom surface of the foot 22). Further, in order to secure a sufficient stability margin of the robot 1, the true ZMP of a corrected gait preferably falls within a range near the center in the range wherein the ZMP can exist. Hence, in the embodiment in the present description, a permissible range wherein a true ZMP of a corrected gait can exist is set. This range is called a ZMP permissible range. The ZMP permissible range is set to coincide with a range wherein a ZMP can exist or to be included in a range wherein a ZMP can exist.

As described above, the value obtained by dividing a corrected desired floor reaction force moment about a desired ZMP by a desired floor reaction force vertical component indicates the amount of positional deviation of a true ZMP from the desired ZMP; therefore, the amount of positional deviation of the true ZMP from the desired ZMP (a ZMP-converted value of a corrected desired floor reaction force moment) may be set instead of setting the corrected desired floor reaction force moment about the desired ZMP. Moreover, a ZMP permissible range can be converted into a permissible range of a corrected desired floor reaction force moment by multiplying the position of its boundary by a desired floor reaction force vertical component, and the permissible range of the corrected desired floor reaction force moment may be set in place of a ZMP permissible range.

The aforesaid floor reaction force horizontal component permissible range is the permissible range of a floor reaction force horizontal component that makes it possible to generate a frictional force of a magnitude that prevents the foot 22 from slipping on the surface of foot 22 of the robot 1 that is in contact with a floor. According to the embodiment in the present description, at least a motion of a desired gait (a desired motion) finally output from the gait producing device 100 is generated such that a floor reaction force horizontal component balancing out the horizontal component of an inertial force of the robot 1 that is produced thereby falls within a floor reaction force horizontal component permissible range (such that a floor reaction force horizontal component permissible range is satisfied).

The floor reaction force horizontal component permissible range set in the embodiment in the present description comes in one for normal gaits set by the processing of S022 to be discussed hereinafter, one for standard gaits set by the processing of S026, and one for gait corrections (for full-model corrections) set in S030. However, these floor reaction force horizontal component permissible ranges do not necessarily have to differ from each other; they may be the same. Meanwhile, the ZMP permissible range is only the one for gait corrections (for full-model corrections) set by the processing of S030.

Supplementally, a gait parameter for generating a desired gait includes parameters in addition to the aforesaid parameters. They are determined in the gait parameter determiner 100a such that they satisfy predetermined boundary conditions.

The gait parameter determined by the gait parameter determiner 100a is input to a desired instantaneous value generator 100b. Based on the input gait parameter, the desired instantaneous value generator 100b sequentially calculates (generates) the instantaneous values (values for each predetermined control processing cycle of the aforesaid control unit 60) of the constituent elements of a part of a desired gait (excluding desired body position/posture), such as a reference body posture, desired foot position/posture, a desired ZMP, a desired floor reaction force vertical component, a ZMP permissible range, and a floor reaction force horizontal component permissible range. Furthermore, the desired instantaneous value generator 100b also outputs a translational floor reaction force (a translational force component of a floor reaction force) error trajectory (specifically, a time series of the instantaneous values of errors of a translational floor reaction force horizontal component) and a floor reaction force moment error trajectory (specifically, a time series of the instantaneous values of errors of the horizontal component of a floor reaction force moment about a desired ZMP). These error trajectories correspond to the time series patterns of errors of a floor reaction force generated on a simplified model (a first dynamic model), which will be discussed later, with respect to a floor reaction force generated by a semi-full model (a second dynamic model), which will be discussed later, by a motion of a gait.

The desired instantaneous values calculated by the desired instantaneous value generator 100b are input to a simplified model gait generator 100c. Based on the input desired instantaneous values, the simplified model gait generator 100c calculates the instantaneous values of desired body position/posture (provisional desired body position/posture for a full-model corrector, which will be discussed hereinafter) by using a simplified model (the first dynamic model) and a semi-full model (a second dynamic model), which will be discussed hereinafter, as the dynamic models approximately expressing a relationship between a motion of the robot 1 and a floor reaction force. The simplified model used here is the same as that used by the desired instantaneous value generator 100b. The simplified model gait generator 100c calculates the instantaneous values of the desired body position/posture such that a predetermined dynamic condition related to a floor reaction force moment about a desired ZMP and a translational floor reaction force is satisfied. The dynamic condition is a condition that a floor reaction force moment horizontal component obtained by correcting a floor reaction force moment horizontal component about a desired ZMP that is generated on the simplified model by a motion of a gait on the basis of a floor reaction force moment error agrees or substantially agrees with a desired floor reaction force moment horizontal component(=0), which is an original desired value of the floor reaction force moment horizontal component about the desired ZMP, and a translational floor reaction force horizontal component obtained by correcting a translational floor reaction force horizontal component generated on the simplified model by the motion of the gait on the basis of the translational floor reaction force error satisfies a floor reaction force horizontal component permissible range. Supplementally, in the embodiment of the present description, a desired floor reaction force vertical component trajectory is explicitly set, so that the instantaneous values of desired body position/posture are determined such that a dynamic condition in that the translational force vertical component of the resultant force of an inertial force produced by a desired motion and gravity (in other words, the resultant force of an inertial force and gravity involved in a translational motion in the vertical direction of the total center-of-gravity of the robot 1) balances out a desired floor reaction force vertical component is also satisfied.

The calculation processing of the simplified model gait generator 100c sequentially determines the instantaneous values of a desired gait (provisional desired gait) including desired body position/posture. Hereinafter, a desired gait having the desired body position/posture determined in the simplified model gait generator 100c as constituent elements will be referred to as a simplified model gait.

The simplified model gait including the desired body position/posture determined by the simplified model gait generator 100c is input to a full-model corrector 100d. The full-model corrector 100d calculates a corrected desired body position/posture obtained by correcting the desired body position/posture of the simplified model gait by using a full model as a dynamic model having high dynamic accuracy, and also calculates a corrected desired floor reaction force moment, which is a desired value of a floor reaction force moment horizontal component about a desired ZMP.

More generally, the full-model corrector 100d carries out processing of E1 or E2 to satisfy the following conditions D1 to D3. Specifically, the full-model corrector 100d:

E1) corrects the body position/posture of a simplified model gait, or

E2) corrects the body position/posture of the simplified model gait and also outputs a corrected desired floor reaction force moment about a desired ZMP (corrects a desired floor reaction force) in order to satisfy the following conditions:

D1) A dynamic balance condition is satisfied with accuracy that is higher than a gait obtained by correcting a gait generated by using a simplified model (a simplified model gait) by using a displacement-dimension correction model (hereinafter referred to as a displacement-dimension corrected gait);

D2) A true ZMP (a ZMP satisfying the original definition that has been corrected by generating a corrected desired floor reaction force moment about a desired ZMP) falls within a ZMP permissible range (a permissible range that allows a sufficient stability margin to be maintained); and D3) A floor reaction force horizontal component falls within a floor reaction force horizontal component permissible range.

In the embodiment in the present description, the processing of E2 is carried out to satisfy the conditions D1 to D3. The processing by the full-model corrector 100d in the embodiment in the present description is the same as that explained in detail in, for example, PCT international publication WO/03/057427/A1 previously proposed by the present applicant (specifically, the processing of S038 shown in FIG. 13 of the publication). Hence, detailed explanation of the processing by the full-model corrector 100d will be omitted in the present description.

Further, in the embodiment in the present description, a correction is made by the full-model corrector 100d. Alternatively, however, such a correction may be omitted, and the instantaneous value of a simplified model gait may be directly output from the gait producing device 100.

Supplementally, in the embodiment in t he present description, the gait parameter determiner 100a, the desired instantaneous value generator 100b, and the simplified model gait generator 100c carry out the processing related to the core of the present invention.

Referring back to FIG. 4, the instantaneous values of a desired gait, including the instantaneous values of corrected desired body position/posture, a corrected desired floor reaction force moment about a desired ZMP, and desired foot position/posture determined as described above, are supplied to a composite-compliance control unit 101 (the portion enclosed by the dashed line in FIG. 4). The composite-compliance control unit 101 controls a joint actuator (an electric motor 64) so as to follow a desired gait, while maintaining the balance of the robot 1. More specific processing of the composite-compliance control unit 101 will be discussed later.

The embodiment of the present invention will now be explained further specifically. According to the present embodiment, for each control processing cycle of the control unit 60, the gait producing device 100 determines instantaneous values of a desired gait by using a simplified model as the first dynamic model and a semi-full model as a second dynamic model, which will be explained in detail below.

A body motion mode and dynamic models used for generating gaits in the present embodiment will now be explained.

In a gait that includes a floating period, such as a running gait, or walking on a low-friction floor surface, there are cases where a dynamic balance condition cannot be satisfied while the floor reaction force horizontal component of a desired gait being within a permissible range (or within friction limits) simply by adjusting a body horizontal acceleration. Hence, in the present embodiment, two motion modes (a body translation mode and a body rotation mode) of the body 3 explained below are compositively generated so as to satisfy the dynamic balance condition while the floor reaction force horizontal component of a desired gait being within a permissible range (or within friction limits).

As shown in FIG. 6(a), if only a body horizontal acceleration is perturbed from a certain motion state, then the total center-of-gravity horizontal acceleration and the angular momentum about the total center-of-gravity are perturbed. More specifically, in the perturbation of the body horizontal acceleration, the floor reaction force moment about a desired ZMP (excluding a component about a vertical axis) and a floor reaction force horizontal component (to be precise, a translational floor reaction force horizontal component) are perturbed without perturbing a floor reaction force vertical component (that dynamically balances out the resultant force of the inertial force generated thereby and gravity). This motion mode is referred to as the body translation mode.

In other words, a motion in which the horizontal component of a floor reaction force moment about a desired ZMP and a floor reaction force horizontal component (translational floor reaction force horizontal component) are changed without changing a floor reaction force vertical component is referred to as the body translation mode.

A change in the floor reaction force moment component per unit acceleration at that time is denoted by $\Delta Mp$ and a change in the floor reaction force horizontal component per unit acceleration is denoted by $\Delta Fp$. If the body 3 in the state shown in FIG. 6(a) is horizontally accelerated forward, then $\Delta Mp$ and $\Delta Fp$ act in the directions of the arrows shown in FIG. 6(a).

For the ease of sensory perception, a floor reaction force balancing out the resultant force of an inertial force generated by a motion and gravity has been used for the expression; however, an expression using the resultant force of the inertial force and gravity is theoretically accurate. Incidentally, the aforesaid resultant force and floor reaction force have the same magnitude but are in the opposite directions.

Meanwhile, if a body posture angular acceleration is perturbed about a certain point Pr from a certain motion state as shown in FIG. 6(b), then the angular momentum about the total center-of-gravity is perturbed without the total center-of-gravity being perturbed. This means that the body posture angular acceleration perturbation about the point Pr perturbs a horizontal component of a floor reaction force moment about a desired ZMP without causing a floor reaction force vertical component and a floor reaction force horizontal component (strictly speaking, a translational floor reaction force vertical component and a translational floor reaction force horizontal component) to be perturbed. This motion mode is referred to as the body rotation mode.

In other words, the motion for changing a horizontal component of a floor reaction force moment about a desired ZMP without causing a change in a floor reaction force vertical component and a floor reaction force horizontal component is referred to as the body rotation mode.

A change in the floor reaction force moment component per unit angular acceleration at that time is denoted by $\Delta Mr$ and a change in the floor reaction force horizontal component per unit angular acceleration is denoted by $\Delta Fr$. $\Delta Fr$ is zero. If an angular acceleration is applied such that the body inclines forward in the state shown in FIG. 6(b), then $\Delta Mr$ acts in the direction of an arrow shown in FIG. 6(b).

The motions of the body 3 include a body vertical movement mode in addition to the body translation mode and the body rotation mode. This is a motion for moving the body 3 in the vertical direction.

In the present embodiment, the simplified model gait generator 100c uses a simplified model and the processing of the gait parameter determiner 100a and the desired instantaneous value generator 100b uses a simplified model and a semi-full model. The following will explain these dynamic models.

FIG. 7 shows an example of the structure of the simplified model. As illustrated, the simplified model is a model composed of a total of three mass points, namely, two mass points (foot mass points) 2m, 2m corresponding to the individual leg bodies 2 of the robot 1 and a mass point corresponding to the body 3 (body mass point) 24m, and a flywheel FH that has inertia but no mass. This simplified model is a dynamic model illustrated in, for example, PCT international publication WO/03/057427/A1 previously proposed by the present applicant. Hence, detailed explanation will be omitted in the present description. The dynamics of the simplified model is represented by expressions 1a to 1c when variables are defined as follows. Here, for easy understanding of the present description, only the dynamic equations (kinetic equations) on a sagittal plane (plane including a longitudinal axis (X axis) and a vertical axis (Z axis)) will be described, and the dynamic equations on a lateral plane (plane including a lateral axis (Y axis) and the vertical axis (Z axis)) will be omitted.

Zsup: Vertical position of supporting leg mass point; Zswg: Vertical position of free leg mass point; Zb: Vertical position of body mass point; ZGtotal: Vertical position of the total center-of-gravity; Xsup: Horizontal position of supporting leg mass point; Xswg: Horizontal position of free leg mass point; Xb: Horizontal position of body mass point; XGtotal: Horizontal position of total center-of-gravity; Oby: Body posture angle about Y-axis relative to vertical direction (inclination angle); mb: Mass of body mass point; msup: Mass of supporting leg mass point; mswg: Mass of free leg mass point; mtotal: Total mass of robot (=mb+msup+mswg); J: Body inertial moment (Equivalent inertial moment in the body rotation mode); Fx: Floor reaction force horizontal component (specifically, a component in the longitudinal direction (X axis) of a translational floor reaction force); Fz: Floor reaction force vertical component (specifically, a component in the vertical direction (Z axis) of a translational floor reaction force); My: Floor reaction force moment about a desired ZMP (specifically, a component about a lateral axis (Y axis) of a floor reaction force moment); and g: Gravitational acceleration. For an arbitrary variable X, d2X/dt2 means a second-order differential value of X.

$$Fz = mb*(g + d2Zb/dt2) + msup* \\ (g + d2Zsup/dt2) + \\ mswg*(g + d2Zswg/dt2)$$ Expression 1a $$Fx = mb*d2Xb/dt2 + msup*d2Xsup/dt2 + \\ mswg*d2Xswg/dt2$$ Expression 1b -continued $$My = -mb*(Xb - Xzmp) + (g + d2Zb/dt2) +$$
$$mb*(Zb - Zzmp)*d2Xb/dt2 -$$
$$msup*(Xsup - Xzmp)*(g + d2Zsup/dt2) +$$
$$msup*(Zsup - Zzmp)*d2Xsup/dt2 -$$
$$mswg*(Xswg - Xzmp)*(g + d2Zswg/dt2) +$$
$$mswg*(Zswg - Zzmp)*(d2Xswg/dt2) +$$
$$J*d2\theta by/dt2$$

Expression 1c

The following relational expression holds for the position of the total center-of-gravity of a robot:

Expression 1d $$ZGtotal = \left( \frac{mb*Zb + msup*}{Zsup + mswg*Zswg} \right) / mtotal$$

$$XGtotal = \left( \frac{mb*Xb + msup*}{Xsup + mswg*Xswg} \right) / mtotal$$

Expression 1e

The simplified model is constructed such that the dynamics of the leg bodies 2, 2 (the dynamics of the mass points 2m, 2m) and the dynamics of the body 3 (the dynamics of the mass point 24m and the flywheel FH) do not interfere with each other, the dynamics of the entire robot 1 being expressed by the linear combinations thereof. Further, the relationship between the motions of the body 3 and floor reaction forces is divided into the relationship between translational motions of the body 3 (the body translation mode) and floor reaction forces and the relationship between rotational motions of the body 3 (the body rotation mode) and floor reaction forces. To be specific, a floor reaction force generated by a horizontal motion of the body mass point 24m corresponds to a floor reaction force generated by a horizontal translational motion of the body 3 (the body translation mode), and a floor reaction force generated by a rotational motion of the flywheel corresponds to a floor reaction force generated by a rotational motion of the body 3 (the body rotation mode), that is, a posture changing motion of the body 3.

The mass of the arm bodies of the robot 1 is included in the body mass point 24m, and the body mass point 24m has the mass that includes the mass of the arm bodies. In the present embodiment, as it will be discussed later, the motions of the arm bodies (arm swinging motion) in a desired gait are performed such that the relative position of the total center-of-gravity of both arm bodies in relation to the body 3 remains unchanged while canceling the moment of an inertial force about the vertical axis that is generated in the robot 1 by a motion other than the arm swinging of the robot 1; therefore, the influences exerted on a floor reaction force moment and the influences exerted on a floor reaction force horizontal component by the arm swinging motions of the arm bodies (excluding a component about the vertical axis) are ignored.

FIG. 8 illustrates a structure of a semi-full model. As shown in the figure, the semi-full model is a model that has corresponding mass points in the body 3, each foot 22, and in the portion near the knee joint of each leg body 2 (the portion adjacent to the knee joint of a thigh link), respectively, the body 3 having an inertia (inertial moment) Ib about the body mass point. In the semi-full model, the relationship between the motions of the robot 1 and floor reaction forces is described as the relationship between the translational motions of the mass points and the posture changing motions of the body 3 and floor reaction forces (the translational floor reaction forces and the floor reaction force moments about desired ZMPs), as with the aforesaid simplified model, although the dynamic equations will be omitted. The semi-full model has dynamic accuracy that is higher than that of the aforesaid simplified model. To be more specific, the fact that the dynamic accuracy of the semi-full model is higher than that of the simplified model means that a floor reaction force generated on the semi-full model by an arbitrary desired motion of the robot 1 will agree more closely with an actual floor reaction force that actually acts on the robot 1 when the actual robot 1 carries out the desired motion on a supposed floor surface than a floor reaction force generated on the simplified model by the desired motion will.

The full model used in the full-model corrector 100d is a multi-mass-point model having a mass point in each link of the robot 1, as shown in, for example, FIG. 9. In this case, the each link of the robot 1 may have inertia about the mass point corresponding thereto.

Supplementally, the semi-full model may have the same structure as that of the full model.

Next, regarding the present embodiment, the processing of the gait producing device 100 will be explained in more detail.

The gait producing device 100 in the present embodiment defines, as the unit, the desired gait (the desired gait in the aforesaid narrow sense) for the period of one step from the moment one leg body 2 of the robot 1 lands to the moment the other leg body 2 lands, and generates desired gaits for the period of the one step in order. Here, the desired gait to be newly generated is referred to as "the current time's gait," the next desired gait is referred to as "the next time's gait," and the further next desired gait is referred to as "the next but one time's gait." Further, the desired gait generated immediately before "the current time's gait" is referred to as "the last time's gait."

When the gait producing device 100 newly generates a current time's gait, the expected landing positions/postures and the required values (requests) of the expected landing time of the foot 22 of a free leg of the robot 1 for two steps ahead are input as required parameters for the gait to the gait producing device 100 (or the gait producing device 100 reads the required parameters from storage). Based on these required parameters, the gait producing device 100 generates a corrected desired body position/posture trajectory, a desired foot position/posture trajectory, a desired ZMP trajectory, a desired floor reaction force vertical component trajectory, a desired arm posture trajectory, a corrected desired floor reaction force moment trajectory, and the like.

The details of the gait generation processing of the gait producing device 100 will be given below with reference to FIG. 10 to FIG. 21. FIG. 10 is a flowchart (structured flowchart) showing the main routine of the gait generation processing executed by the gait producing device 100. The procedure of the main routine processing itself is the same as that in, for example, the aforesaid PCT international publication WO/03/057427/A1 (hereinafter referred to as "publication document 1") by the present applicant except for subroutine processing, which is a part thereof.

First, in S010, various types of initializations are performed, including the initialization of time t to zero. This processing is performed when the gait producing device 100 is started up or the like. Subsequently, the procedure advances to S014 via S012, and the gait producing device 100 waits for a timer interrupt for each control cycle (the calculation processing cycle in the flowchart in FIG. 10). The control cycle is denoted by Δt.

Subsequently, the procedure proceeds to S016 wherein it is determined whether the gait is changing, and if the gait is changing, then the procedure proceeds to S018, or if the gait is not changing, then the procedure proceeds to S030. Here, the aforesaid "the change of a gait" means the timing at which the generation of a current time's gait is begun after the generation of the last time's gait has been completed. For example, a control cycle following the control cycle in which the generation of the last time's gait has been completed is the timing of a gait change.

When the procedure proceeds to S018, time t is initialized to zero, then it proceeds to S020 wherein a next time's gait supporting leg coordinate system, a next but one gait supporting leg coordinate system, a current time's gait cycle, and a next time's gait cycle are read. These supporting leg coordinate systems and gait cycles are decided by the aforesaid required parameters. More specifically, in the present embodiment, the required parameters supplied from a joystick 44 or the like to the gait producing device 100 include the required values of the expected landing positions/postures of the foot 22 of a free leg (the foot positions/postures in a state wherein, after landing, the foot 22 is rotated without a slippage such that substantially the entire sole thereof is in contact with a floor surface) for two steps ahead and expected landing time. The required value of the first step and the required value of the second step are supplied as the ones corresponding to the current time's gait and the next time current, respectively, to the gait producing device 100 before the generation of the current time's gait begins (at the gait change timing of the aforesaid S016). Incidentally, these required values can be changed in the middle of the generation of the current time's gait.

Then, the next time's gait supporting leg coordinate system is decided on the basis of the required values of the expected landing position/posture of the first-step foot 22 of the free leg (the foot 22 of the free leg in the current time's gait) in the aforesaid required parameters. Further, the next but one time's gait supporting leg coordinate system is decided on the basis of the required values of the expected landing positions/postures of the foot 22 of the second-step free leg. Further, the current time's gait cycle is defined as the time from the expected landing time (required value) of the foot 22 of the supporting leg of the current time's gait to the expected landing time (required value) of the foot 22 of the free leg of the first step (the current time's gait), and the next time's gait cycle is defined as the time from the expected landing time (required value) of the first-step foot 22 of the free leg to the expected landing time (required value) of the second-step foot 22 of the free leg.

The processing of S020 is the same as the processing of S020 of FIG. 13 in the aforesaid publication document 1, so that no further explanation will be given in the present description.

Subsequently, the procedure proceeds to S022 wherein the gait producing device 100 determines the gait parameter of a normal gait (normal gait parameter) as a virtual cyclic gait that follows the current time's gait. As the gait parameter determined here, there are a foot trajectory parameter that defines a desired foot position/posture trajectory in the normal gait, a reference body posture trajectory parameter that defines the body posture trajectory providing a reference, an arm posture trajectory parameter that defines a desired arm posture trajectory, a ZMP trajectory parameter that defines a desired ZMP trajectory, a floor reaction force vertical component trajectory parameter that defines a desired floor reaction force vertical component trajectory, and a parameter that defines a desired floor reaction force horizontal component permissible range.

The "normal gait" in the present description is used to mean a cyclic gait that does not develop discontinuity in the motion states (the states of foot position/posture, body position/posture, and the like) of the robot 1 at the boundaries of gaits when the gait is repeated. The "normal gait" includes, of course, a cyclic gait for making the robot 1 advance straight and also includes a cyclic gait for making the robot 1 turn. In this case, setting the turning rate to zero means advancing straight; therefore, "turning" includes advancing straight in a broad sense. For this reason, the "normal gait" may be frequently referred to as "normal turning gait" in the embodiment in the present description.

The normal turning gait is explained in detail in, for example, the aforesaid publication document 1 and Japanese Patent Application No. 2000-352011, so that no detailed explanation thereof in the present description will be omitted. The outline thereof is given below.

In the present embodiment, the normal turning gait, which is a cyclic gait, is a gait for two steps of the robot 1. In other words, a gait composed of a first turning gait following the current time's gait and a second turning gait following the first turning gait is defined as the gait for one cycle of the normal turning gait, and the gait for one cycle is repeated. If the current time's gait to be generated is, for example, a running gait for the robot 1 to run (a gait having a one-leg supporting period and a floating period), then the first turning gait and the second turning gait of the normal turning gait are also running gaits, while if it is a walking gait for the robot 1 to walk (a gait having a one-leg supporting period and a two-leg supporting period), then the first turning gait and the second turning gait of the normal turning gait are also walking gaits. This means that the basic gait mode of the first turning gait and the second turning gait are the same as that of the current time's gait.

In the following explanation, unless otherwise specified, running gaits will be taken as examples of the gaits to be generated.

Normal turning gaits are provisionally prepared to determine motion states of the robot 1, such as a divergence component, body vertical position/velocity, a body posture angle and the angular velocity thereof, at the terminating end of the current time's gait in the gait producing device 100, and they are not directly output from the gait producing device 100.

Incidentally, "divergence" means that the position of the body 3 of the robot 1 is undesirably shifted to a position that is far apart from the positions of both feet 22 and 22. The value of a divergence component is a numeric value that indicates how far the position of the body 3 of the robot 1 is apart from the positions of both feet 22 and 22 (more specifically, the origin of the global coordinate system (supporting leg coordinate system) set on the ground contact surface of the foot 22 of a supporting leg). For instance, in the embodiment in the present description, a divergence component relative to each dynamic model described above is determined by the following expression.

Divergence component=Body mass point horizontal position+Body mass point horizontal velocity/$\omega 0$   Expression 2

$\omega 0$ in this expression 2 denotes a predetermined value. In the present embodiment, a divergence component in a gait is determined using a body horizontal position and a body horizontal velocity in place of the body mass point horizontal position and the body mass point horizontal velocity in expression 2.

In the embodiment in the present description, gaits (current time's gaits) are generated using divergence components as indicators such that desired gaits are continuously generated without causing the aforesaid divergence. More specifically, a current time's gait is generated such that a normal gait (more precisely, a normal gait parameter) following a current time's gait to be generated is set on the basis of the required parameters or the like related to the aforesaid current time's gait, an initial divergence component of the normal gait is determined, and then the terminal divergence component of the current time's gait is made to agree with the initial divergence component of the normal gait (more generally, the current time's gait is made to continuously follow or approach the normal gait).

Returning to the main subject, in S022, a gait parameter of a normal gait (a parameter that defines a normal gait) is determined according to the flowchart of the subroutine processing shown in FIG. 11. More specifically, the foot trajectory parameter, the reference body posture trajectory parameter, the arm trajectory parameter, the ZMP trajectory parameter, the floor reaction force vertical component trajectory parameter, and the parameter defining the desired floor reaction force horizontal component permissible range related to the normal gait described above are individually determined by the processing of S100 to S110. Then, in S112, initial time Ts of the normal gait and a one-step period (the time for one cycle of the normal gait) Tcyc are redefined. The processing is the same as the processing of the flowchart of FIG. 15 in the aforesaid publication document 1, so that detailed explanation thereof will be omitted. The parameters of the normal gait determined in S100 to S110 are the parameters that are determined such that the requirements related to the gait, which are represented primarily by the required parameters described above, are satisfied while the trajectories specified by the individual parameters satisfy the periodicity of the normal gait at the same time. For example, as explained in conjunction with the flowchart of FIG. 15 in the aforesaid publication document 1, the foot trajectory parameter of the normal gait is determined such that the expected landing position/posture of the foot 22 of a free leg of the first turning gait following the current time's gait (the expected landing position/posture observed in the aforesaid next time's gait supporting leg coordinate system) agrees with the expected landing position/posture (required values) of the second step described above, and the expected landing position/posture of the foot 22 of the free leg of the second turning gait (the expected landing position/posture observed in the aforesaid next but one time's gait supporting leg coordinate system) agrees with the expected landing position/posture (required values) of the foot 22 of the free leg of the current time's gait. The ZMP trajectory parameter is determined on the basis of a foot trajectory parameter such that a desired ZMP is positioned substantially near the center of the ground contact surface of the foot 22 of a supporting leg and continuously changes over the entire period of the normal gait.

The initial time Ts of the normal gait redefined in S112 of FIG. 13 means the time of the start point when creating gaits for one cycle of the normal gait, as will be described later (this differs from the time of the terminating end of the current time's gait in the present embodiment), and it is the time immediately before the start of the floating period (the timing when a desired floor reaction force vertical component becomes zero) of the first turning gait. Further, the one-step period Tcyc of the normal gait is the period of the total time of the first turning gait and the second turning gait of the normal gait. The normal gait is a gait whose state at arbitrary time Tx (the state of the position/posture of each portion of the robot 1 and the changing velocities thereof) becomes the same as the state at time Tx+Tcyc due to the periodicity thereof. The normal gait is a cyclic gait having the gait for two steps as one cycle; therefore, in the present description, the total time of the one-cycle period (the first turning gait and the second turning gait) is regarded as one-step period of the normal gait.

Supplementally, the parameters of the normal gait determined by the processing of S100 to S110 are not all the parameters specifying the normal gait parameter. In the present embodiment, the gait parameter defining the normal gait (normal gait parameter) includes the position and velocity of the body 3 and the posture angle of the body 3 and the angular velocity thereof at the starting end (the start time of the period) or the terminating end (the end time of the period) of the one-cycle period of the normal gait and the peak value of a body inclination restoring moment ZMP-converted value, which will be discussed hereinafter, in addition to the parameters determined in S022. Of these parameters, the horizontal position and horizontal velocity of the body 3, the angular velocity of a posture angle of the body 3, and the peak value of the body inclination restoring moment ZMP-converted value are determined in an exploratory manner by the processing of S024, which will be discussed later. The normal gait parameter is a gait parameter that allows a normal gait to be uniquely generated using the values of the parameters constituting the normal gait parameter and the aforesaid simplified model.

Subsequently, the procedure proceeds to S024 wherein the initial state of the normal gait is calculated. The initial state to be calculated here includes the initial body horizontal position/velocity (the initial body position and the initial body velocity in the horizontal direction), the initial body vertical position/velocity (the initial body position and the initial body velocity in the vertical direction), the initial divergence component, and the initial body posture angle and its angular velocity of the normal gait. The calculation of the initial state is performed using the simplified model and the semi-full model according to the flowchart of the subroutine processing of FIG. 12.

The processing shown in FIG. 12 will be schematically explained. Taking the initial body horizontal position, the initial body horizontal velocity, the initial body posture angular velocity, and the body inclination restoring moment ZMP-converted value peak value of the robot 1 at time Ts (the initial time of the normal gait) as search objects, and the initial state of the normal gait including these search objects is provisionally determined. From this initial state, gaits up to the terminating end of the normal gait (time Ts+Tcyc) are generated using dynamic models (the simplified model and the semi-full model). Then, it is determined whether the generated normal gaits satisfy a boundary condition (the states at the initial end and the terminating end (the body horizontal position, the body horizontal velocity, the body posture angle, and the body posture angular velocity in the present embodiment) agree with each other), and if they do not satisfy the boundary condition, then the values of the search objects are changed. This is repeated so as to eventually determine an initial state that allows the boundary condition to be satisfied.

Supplementally, the basic concept (approach) of the processing shown in FIG. 12 is the same as the processing shown in FIG. 20 of the aforesaid publication document 1. However, in the embodiment of the present description, the search objects include a body posture angular velocity and the peak value of a body inclination restoring moment ZMP-converted value, which makes the embodiment different from the processing shown in FIG. 20 of the publication document 1. In addition, a part of detailed processing (subroutine processing) of the processing of S208 differs from that in the publication document 1.

A body inclination restoring moment ZMP-converted value peak value ZMPrecpeak determined in the processing of the flowchart shown in FIG. 12 indicates the peak value of a ZMP-converted value ZMPrec of a floor reaction force moment required for a body posture to approach a reference body posture (the amount of deviation from a desired ZMP providing a reference (a desired ZMP defined by a ZMP trajectory parameter determined in S022)) in a one-leg supporting period of the robot 1 (more specifically, the period from the moment immediately after the start of the one-leg supporting period to the moment immediately before the end thereof; hereinafter, it will be referred to as "the body inclination angle restoring period"), an example thereof being shown in FIG. 19. ZMPrec takes a trapezoidal pattern, as shown in the figure, the peak value thereof (the height of the trapezoid) being denoted by ZMPrecpeak.

The following will specifically explain the processing shown in FIG. 12. First, in S200, foot position/posture, a body posture angle θbs and the initial state of an arm posture (the state at initial time Ts of a normal turning gait) are determined on the basis of the normal gait parameter (the parameter determined in S022). Incidentally, these initial states are the states observed in the supporting leg coordinate system of a first turning gait (the aforesaid next time's gait supporting leg coordinate system). In this processing, the initial states of the foot position/posture are determined to be the positions/postures of the individual feet 22 at time Ts in the foot position/posture trajectories calculated using a finite-duration setting filter on the basis of the foot trajectory parameters determined in the aforesaid S022. The finite-duration setting filter is explained in the aforesaid publication document 1 and the like, so that an explanation thereof will be omitted. Furthermore, the initial state of the body posture angle θbs is determined to be the same as a reference body posture angle at time Ts determined on the basis of the reference body posture trajectory parameter determined in S022, and the initial state of an arm posture is determined to be the same as the state at time Ts determined on the basis of the arm posture trajectory parameters determined in S022.

Subsequently, in S202, an initial (time Ts) body horizontal position, an initial body horizontal velocity, an initial body posture angular velocity, and the peak value of a body inclination restoring moment ZMP-converted value on the simplified model are taken as search objects, and the candidates (Xs, Vx, ωbs, ZMPrecpeak) of these search objects are provisionally determined (the initial values of candidate values of the search objects are determined). In this case, the provisionally determined candidate values may be basically arbitrary, and they may be determined on the basis of, for example, the initial states of a normal gait determined when the last time's gait was generated. Incidentally, these values provisionally determined are the values observed in the supporting leg coordinate system of the first turning gait (the aforesaid next time's gait supporting leg coordinate system).

Subsequently, the loop processing of S206 to S218 is carried out. To schematically explain the processing, a gait from the starting end (time Ts) to the terminating end (time Ts+Tcyc) of a normal gait is generated using the normal gait parameter including the search objects provisionally determined as described above and the simplified model. Then, it is determined whether the generated normal gait satisfies the boundary condition (the condition in that the states (a body horizontal position, a body horizontal velocity, a body posture angle, and a body posture angular velocity in the present embodiment) at the beginning end and the terminating end substantially agree with each other), and if it does not satisfy the boundary condition, then the values of the search objects are changed. This is repeated so as to finally determine the initial states of the normal gait that can satisfy the boundary condition of the normal gait on the simplified model.

The following will explain the processing of S206 to S218 more specifically. In S206, the body vertical position and the body vertical velocity (Zs, Vzs) at the beginning (time Ts) of a normal gait on the simplified model are determined. In this case, they are determined such that the resultant force of the inertial force in the vertical direction of the total center-of-gravity of the robot 1 and gravity on the simplified model balances out a desired floor reaction force vertical component, and the vertical position of the total center-of-gravity satisfies the boundary condition of the normal gait. This processing is carried out in the same manner as that of the processing of S206 shown in FIG. 20 in the aforesaid publication document 1. Incidentally, (Zs, Vzs) depend upon the values (candidate values) of Xsl, Vxsl, θbsl, and ωsl determined or provisionally determined as described above.

Subsequently, in S208, a gait (a provisional normal gait) is generated using the simplified model up to the time Ts+Tcyc (the terminating end of the normal gait) on the basis of the normal gait parameter that includes the candidate values of current search objects, the vertical position and the vertical velocity of the body 3, and ZMPrecpeak. This processing will be described hereinafter.

Subsequently, in S210, the body horizontal position, the body horizontal velocity, and the body posture angle and its angular velocity at the terminating end of the gait generated in S208 are converted into the values observed from the supporting leg coordinate system of the next one step of the gait (the supporting leg coordinate system of the first turning gait following the second turning gait of the normal gait generated in S208), and the obtained values are denoted by (Xe, Vxe, θbe, ωbe).

Then, in S212, the differences between the values of the current (Xs, Vxs, θbs, ωbs) and the values of (Xel, Vxel, θbel, ωbel) are determined as boundary condition errors (errx, errv, errθ, errω) of the normal gait (the provisional normal gait generated in S208). To satisfy the boundary condition of the normal gait, the boundary condition errors must be substantially zero. The boundary condition errors indicate the degree of deviation of the gait created in S208 from the boundary condition.

Subsequently, in S214, it is determined whether all of errx, errv, errθ, and errω fall within a sufficiently small (in the vicinity of zero) predetermined permissible range, and if the determination result is YES, then the procedure terminates the loop processing of S206 to S218 and proceeds to S220. In this case, it means that the gait generated in S208 satisfies the boundary condition of a normal gait, so that the gait will be an original normal gait to be in connection with the current time's gait.

Meanwhile, if the determination result of S214 is NO, then the candidates of a plurality of (four in the present embodiment) search objects obtained by changing the values of Xs, Vx, ωbs, and ZMPrecpeak by predetermined extremely small amounts ΔXs, ΔVx, Δωbs, and ΔZMPrecpeak are determined in the vicinity of the candidate values of the current search objects (Xs, Vx, ωbs, ZMPrecpeak), and the same processing as that of S208 to S212 is carried out to determine the boundary condition errors corresponding to the candidates of the individual search objects on the basis of the normal gait parameter that includes the candidates of the individual search objects (the normal gait parameter having the search objects of the normal gait parameter corrected to the newly determined candidates).

Subsequently, in S218, the new candidates of the search objects (Xs, Vx, ωbs, ZMPrecpeak) are determined by an exploratory technique, such as the steepest descent method or the simplex method, on the basis of the current (Xs, Vx, ωbs, ZMPrecpeak) and the boundary condition errors corresponding to the individual candidates of the search objects in the vicinity thereof. Then, the processing from S206 is repeated again.

In S220 after completing the loop processing of S206 to S218, on the basis of the normal gait lastly generated in S208 of the loop processing (the gait that satisfies the boundary condition of the normal gait), an initial body horizontal position X0, an initial body horizontal velocity Vx0, an initial body posture angle θb0 and an angular velocity thereof ωb0, an initial body vertical position Z0, and an initial body vertical velocity Vz0, which indicate a motion state of the body 3 of the normal gait at an original initial time 0 (the terminating time of the current time's gait), are determined. Further, in S222, according to the definitional expression of the initial divergence component q mentioned above, a normal turning initial divergence component q[0], which is a divergence component of the normal turning gait at the original initial time 0, is determined. The value determined in S222 is the value observed in the supporting leg coordinate system of the first turning gait of the normal turning gait that follows the current time's gait. Then, in S224, q", which denotes the value indicating the normal turning initial divergence component q[0] observed from the supporting leg coordinate system of the current time's gait, and (Z0",Vz0"), which denote the initial (time 0) body vertical position and velocity observed from the supporting leg coordinate system of the current time's gait, are determined.

As described above, the values of (Xs, Vx, ωbs, ZMPrecpeak), which are the search objects, are determined such that the boundary condition of the normal gait is satisfied, and the values of the search objects are used to determine the initial state (including an initial divergence component), which is a state (the motion state of the body 3) at the original initial time (time 0).

The processing of S208 in the processing shown in FIG. 12, the explanation of which has been deferred, is carried out by the subroutine processing shown by the flowchart of FIG. 13, and the processing of S306 and S322 of this FIG. 13 is carried out by the subroutine processing shown by the flowchart of FIG. 14. Further, the processing of S412 of FIG. 14 is carried out by the subroutine processing shown by the flowchart of FIG. 15. These processing will be explained below.

The processing shown in FIG. 13 will be schematically explained. First, the processing of S300 to S310 provisionally creates a normal gait such that a desired ZMP is satisfied on a simplified model and a floor reaction force component permissible range is satisfied at each time k (the time at every predetermined time width Δk) from the initial time Ts to the terminating time Ts+Tcyc of the normal gait. At this time, a time series of a floor reaction force moment error Merr_p(k) as an error of a floor reaction force moment horizontal component about a desired ZMP generated on a simplified model by a motion of the provisionally created gait (provisional motion) and a times series of a translational floor reaction force error Ferr_p(k) as an error of a translational floor reaction force horizontal component generated on the simplified model by the motion are determined. The processing shown in FIG. 13 includes processing for not only creating a normal gait but also for determining these errors Merr_p(k) and Ferr_p(k).

Here, the floor reaction force moment error Merr_p(k) is determined, at each time k of a gait provisionally created using a simplified model, as the difference between a floor reaction force moment horizontal component about a desired ZMP generated on a semi-full model by a motion of the gait and a floor reaction force moment horizontal component generated by the motion on the simplified model or a desired value thereof (=0). Further, the translational floor reaction force error Ferr_p(k) is determined, at each time k of a provisionally created gait, as the difference between a translational floor reaction force horizontal component generated on a semi-full model by a motion of the gait and a translational floor reaction force horizontal component generated by the motion on the simplified model.

Subsequently, the processing of S318 to S324 creates a normal gait by correcting a motion of the aforesaid provisionally created gait by using errors Merr_p(k) and Ferr_p(k). At this time, at each time k from the starting end to the terminating end of the normal gait, the moment obtained by adding a floor reaction force moment error Merr_p(k) to a floor reaction force moment about a desired ZMP generated on a simplified model by a motion of the gait (the normal gait to be created) is regarded as a true floor reaction force moment about the desired ZMP, and the normal gait is created such that the true floor reaction force moment becomes zero (such that the original definition of the desired ZMP is satisfied). At the same time, at each time k from the starting end to the terminating end of the normal gait, the moment obtained by adding a translational floor reaction force error Ferr_p(k) to a translational floor reaction force horizontal component generated on a simplified model by a motion of the gait (the normal gait to be created) is regarded as a true translational floor reaction force horizontal component, and the normal gait is created such that the true floor reaction force horizontal component satisfies a floor reaction force horizontal component permissible range. In this case, a floor reaction force generated on a semi-full model is used as a true value of a floor reaction force that provides the reference of the errors Merr_p(k) and Ferr_p(k). Supplementally, creating a gait such that a moment obtained by adding a floor reaction force moment error Merr_p(k) to a floor reaction force moment about a desired ZMP generated on a simplified model becomes zero is equivalent to creating a gait such that the floor reaction force moment horizontal component (=−Merr_p(k)) obtained by subtracting the floor reaction force moment error Merr_p(k) from an original desired value (=0) of a floor reaction force moment horizontal component about a desired ZMP is generated about the desired ZMP on a simplified model.

The following will specifically explain the processing of FIG. 13. First, in S300, as the initial state (the state at time Ts) of a motion of the body 3, values (current candidate values) (Xs, Vxs, θbs, ωs, Zs, Vzs) provisionally determined in the processing of FIG. 12 are set.

Subsequently, in S302, each value of the time series of the floor reaction force moment error Merr_p(k) and the translational floor reaction force error Ferr_p(k) is initialized to zero. The Merr_p(k) and Ferr_p(k) are initialized to zero here to create a gait that satisfies a desired ZMP on a simplified model and to satisfy a floor reaction force horizontal component permissible range in S306 to be discussed later.

Via S304 following the aforesaid S302, the processing of S306 to S310 is implemented at each time from the initial time Ts to the terminating time Ts+Tcyc of the normal gait. In S306, using the time series of the error Merr_p(k) and Ferr_p(k) initialized in S302, a time series of an instantaneous value of a normal gait is created such that −Merr_p(k) is generated about a desired ZMP (a desired ZMP defined by a ZMP trajectory parameter determined in S022) at time k on a simplified model and a value obtained by adding Ferr_p(k) to a translational floor reaction force horizontal component (a translational floor reaction force that balances out an inertial force involved in a translational acceleration horizontal component of a total center-of-gravity of a gait on the simplified model) falls within a floor reaction force horizontal component permissible range (the floor reaction force horizontal component permissible range defined by the parameters determined in S022) at time k. In this case, Merr_p(k)=0 and Ferr_p(k)=0 in S306, so that a gait created (provisionally created) in S306 will eventually be a gait that satisfies a desired ZMP on the simplified model and also satisfies the floor reaction force horizontal component permissible range. More specific processing of S306 will be described later. During the processing of S306, at each time k, a difference Merr(k) between a floor reaction force moment horizontal component about a desired ZMP generated on a semi-full model by a motion of a gait that is being provisionally created and a floor reaction force moment horizontal component about a desired ZMP generated on the semi-full model by the motion is determined, and a difference Ferr(k) between a translational floor reaction force horizontal component generated on the semi-full model by the motion and a translational floor reaction force horizontal component generated on the simplified model by the motion is determined.

Subsequently, in S308, the Merr(k) and the Ferr(k) determined as described above are set as new values of Merr_p(k) and Ferr_p(k), respectively. Further, time k is updated to k+Δk in S310. The processing of S306 to S310 described above is repeated until k=Ts+Tcyc. This provisionally creates the time series of instantaneous value of a gait that satisfies a desired ZMP on the simplified model and also satisfies the floor reaction force horizontal component permissible range, and time series of Merr_p(k) and Ferr_p(k) corresponding thereto are determined. The Merr_p(k) and Ferr_p(k) determined as described above indicate errors of a floor reaction force generated on the simplified model by a motion (provisional motion) of a normal gait created in S306.

Subsequently, in S318, the initial state of the body 3 is set in the same manner as that in S300. Further, via S320, the processing of S322 and S324 is carried out at each time from the initial time Ts to the terminating time Ts+Tcyc of the normal gait. The processing of these S322 and S324 is the same as the processing of the aforesaid S306 and S310, respectively. However, in the processing of S322, the time series of Merr_p(k) and Ferr_p(k) used in the processing is not the value (=0) initialized in the aforesaid S302, but it is the latest time series, that is, the time series of Merr_p(k) and Ferr_p(k) determined in the aforesaid S308 (these are generally non-zero).

This completes the processing of FIG. 13, and the normal gait created by the processing of S320 to S324 is obtained as the normal gait to be created in S208 of FIG. 12.

The processing of S306 and S322 of FIG. 13 (the processing for creating the time series of instantaneous values of the normal gait) is implemented by the subroutine processing shown by the flowchart of FIG. 14.

In this processing of FIG. 14, first, the processing of S400 to S410 determines the instantaneous values of a desired floor reaction force vertical component, a desired ZMP, desired positions/postures of both feet, a reference body posture, a desired arm posture, a desired body vertical position, and a floor reaction force horizontal component permissible range on the basis of the parameters of the normal gait determined in the aforesaid S022. This processing of S400 to S410 is the same as the processing of S400 to S410 of FIG. 22 in the aforesaid publication document 1, so that detailed explanation will be omitted here.

Subsequently, the instantaneous values of a body horizontal acceleration and a body posture angular acceleration are determined by the processing of S412 such that the conditions described in the figure are satisfied. In this case, if Merr_p(k) is regarded as the error of a floor reaction force moment horizontal component about a desired ZMP generated on a simplified model at time k by a motion of a gait that is being created, then it is considered that determining the motion of the gait such that −Merr_p(k) is generated about a desired ZMP (the desired ZMP determined in S402) on the simplified model causes a true floor reaction force moment horizontal component about the desired ZMP generated by the actual robot 1 by the determined motion (strictly speaking, the floor reaction force moment horizontal component about a desired ZMP generated on the semi-full model) to become substantially zero (an original desired value of the floor reaction force moment horizontal component about the desired ZMP). Hence, in S412, the body horizontal acceleration and the body posture angular acceleration are determined such that −Merr_p(k) is produced about the desired ZMP on the simplified model. Incidentally, this is equivalent to determining the body horizontal acceleration and the body posture angular acceleration such that the result obtained by adding the error Merr_p(k) to a floor reaction force moment horizontal component about the desired ZMP generated on the simplified model by the motion of the gait to be created (≈−Merr_p(k)) becomes zero, which is the original desired value of the floor reaction force moment horizontal component about the desired ZMP.

Further, if Ferr_p(k) is regarded as the error of a translational floor reaction force horizontal component generated on a simplified model at time k by a motion of a gait that is being created, then it is considered that determining the motion of the gait such that the result obtained by adding Ferr_p(k) to the translational floor reaction force horizontal component produced by the motion of the gait on the simplified model does not exceed the floor reaction force horizontal component permissible range (the permissible range determined in S410) on the simplified model causes a translational floor reaction force horizontal component acting on the actual robot 1 by the determined motion (strictly speaking, the translational floor reaction force horizontal component generated on the semi-full model) to fall within the floor reaction force horizontal component permissible range. Hence, in S412, the body horizontal acceleration and the body posture angular acceleration are determined such that the result obtained by adding Ferr_p(k) to the translational floor reaction force horizontal component produced on the simplified model by the motion of the gait to be created does not exceed the floor reaction force horizontal component permissible range (the permissible range at current time k determined in S410).

More specific description of the processing of S412 will be given later.

Subsequently, by the processing of S414, the body horizontal acceleration and the body posture angular acceleration determined in S412 as described above are subjected to second-order integration to determine instantaneous values of the body horizontal position and the body posture angle. By this time, the instantaneous values of the body vertical position, the foot position/posture, and the arm posture have already been determined (refer to S404 and S408), meaning that the instantaneous value of the motion of the robot 1 (the instantaneous value of the desired motion of the normal gait) composed of the aforesaid instantaneous values and the instantaneous values of the body horizontal position and the body posture angle have been determined. Supplementally, each of the leg bodies 2 of the robot 1 of the present embodiment has six degrees of freedom; therefore, once the instantaneous value of the desired position/posture of each foot 22 and the instantaneous value of the desired position/posture of the body 3 are determined, the displacement amount of each joint of each leg body 2 of the robot 1 is uniquely determined.

Further, the processing of S415 following S414 calculates a floor reaction force moment horizontal component Msmpl(k) about the desired ZMP and a translational floor reaction force horizontal component Fsmpl(k) at time k (current time) generated on the simplified model by the desired motion of the normal gait determined as described above.

In this case, the floor reaction force moment horizontal component Msmpl(k) about the desired ZMP and the translational floor reaction force horizontal component Fsmpl(k) may be calculated by using the simplified model on the basis of the determined desired motion composed of the foot position/posture, the body position and velocity, and the body posture angle and angular velocity. In other words, the Msmpl(k) is calculated as the value with a reversed sign of the instantaneous value (the value at each time k) of the horizontal component of the moment generated about the desired ZMP by the resultant force of each inertial force produced by a motion of each element (the mass points and the flywheel in the present embodiment) of the simplified model and the gravity acting on the total center-of-gravity of the simplified model, which is determined in association with the desired motion. Further, the Fsmpl(k) is calculated as the value with a reversed sign of the value (the horizontal component of an inertial force produced by a motion of the total center-of-gravity) obtained by multiplying the instantaneous value (the value at each time k) of the horizontal component of the translational acceleration of the total center-of-gravity of the simplified model in association with the desired motion by the total mass of the simplified model.

Alternatively, the Msmpl(k) and the Fsmpl(k) may be determined according to the following expressions instead of performing the calculation of the simplified model as described above.

$Msmpl(k)=0-Merr\_p(k)$  Expression 3a $Fsmpl(k)=Fx'(k)-Ferr\_p(k)$  Expression 3b More specifically, the gait created by the processing from S410 to S414 is created such that $-Merr\_p(k)$ is generated about a desired ZMP (more precisely, the value obtained by subtracting $Merr\_p(k)$ from an original desired floor reaction force moment horizontal component (=0) about the desired ZMP), so that the floor reaction force moment Msmpl(k) about the desired ZMP generated on the simplified model by a motion of the gait agrees or substantially agrees with $-Merr\_p(k)$. Hence, Msmpl(k) may be determined according to the aforesaid expression 3a. Incidentally, "0" n expression 3a may be of course omitted.

Further, $Fx'(k)$ in expression 3b is obtained by adding a translational floor reaction force error (a translational floor reaction force horizontal component error) $Ferr\_p(k)$ to the translational floor reaction force horizontal component Fsmpl(k) produced on the simplified model by a motion of a gait created by the processing from S410 to S414, and it is determined such that it satisfies a floor reaction force horizontal component permissible range in the processing of S412 to be discussed later (more specifically, it is determined as the desired value (the desired value that satisfies a floor reaction force horizontal component permissible range) of a floor reaction force horizontal component (Fsmpl(k)+ Ferr_p(k)) when a body horizontal acceleration is determined). Thus, the translational floor reaction force horizontal component Fsmpl(k) produced on the simplified model by a motion of the gait created by the processing from S410 to S414 agrees or substantially agrees with the value of the right side of expression 3b, so that Fsmpl(k) may be determined according to expression 3b by using the value of $Fx'(k)$ determined in the processing of S412.

The Msmpl(k) and Fsmpl(k) may be determined using expression 3a and expression 3b as described above. The same applies to the processing for creating a current time's gait, which will be described later (the processing of S028 or the processing of S032 to be described later).

Subsequently, the processing of S416 following S415 calculates an instantaneous value Msemifull(k) of a floor reaction force moment horizontal component about a desired ZMP and an instantaneous value Fsemifull(k) of a translational floor reaction force horizontal component generated on the aforesaid semi-full model on the basis of the desired motion of the gait determined as described above. The method for the calculation is the same as that for calculating the instantaneous values Msmpl(k) and Fsmpl(k) on the simplified model in the aforesaid S415. In this case, however, the Msemifull(k) and Fsemifull(k) cannot be determined by the same technique as the aforesaid expressions 3a and 3b, so that actual calculation processing of the semi-full model need to be carried out. These Msemifull(k) and Fsemifull(k) correspond to the true values of a floor reaction force moment horizontal component and a translational floor reaction force horizontal component, respectively, acting on the robot 1 when a motion of the actual robot 1 is performed on the basis of a desired motion.

Subsequently, in the processing of S418, new floor reaction force moment error Merr(k) and translational floor reaction force error Ferr(k) are calculated according to the following expressions 3c and 3d.

$Merr(k)=Msemifull(k)-Msmpl(k)$  Expression 3c $Ferr(k)=Fsemifull(k)-Fsmpl(k)$  Expression 3d Supplementally, it is unnecessary to perform the processing of S415 to S418 of FIG. 14 during the processing of S322 of FIG. 13. In the present embodiment, the subroutine processing of S306 and S322 of FIG. 13 is the same; hence, the processing of S415 to S418 is carried out in both S306 and S322. If the subroutine processing of S306 and S322 is to be separately constructed, then an algorithm may be constructed on the assumption that $Merr\_p(k)=0$ and $Ferr\_p(k)=0$ from the beginning in the processing of S306, and in such a case, the processing of S302 of FIG. 13 is unnecessary. Further, in this case, the processing of S415 to S418 may be deleted from the beginning in the processing of S322. Further, when applying the aforesaid expression 3a in S415 in the processing of S306, Msmpl(k) is always zero, so that the processing of S415 may be omitted in the processing of S322. The same supplemental particular explained above applies to the processing for creating a current time's gait to be discussed later (the processing of S028 to be discussed later).

The subroutine processing of S412 of FIG. 14 is carried out as shown by the flowchart of FIG. 15.

In the processing of FIG. 15, first, times Tm, Ts2, and Tm2 that define a body inclination angle restoring period of a normal gait are determined. These times define the period during which the aforesaid body inclination restoring moment ZMP-converted value ZMPrec is generated, as shown in FIG. 19. More specifically, the time immediately following the start of a first one-leg supporting period after the initial time Ts of a normal gait is determined as Tm, the time immediately following the end of the one-leg supporting period is determined as Ts2, and the time immediately following the start of the next one-leg supporting period is determined as Tm2. And, a period [Tm, Ts2] and a period [Tm2, Te] are respectively defined as the periods during which ZMPrec is generated (the body inclination angle restoring period in a normal gait). This is the same as the processing of S500 of FIG. 23 in the aforesaid publication document 1.

Subsequently, in S502, it is determined whether the current time k at which an instantaneous value of a normal gait is to be created (the time in the normal gait that is being created) is in the body inclination angle restoring period. And, if the current time k is not time within the aforesaid body inclination angle restoring period, that is, if the current time k is in a period from an instant immediately before the end of a one-leg supporting period to an instant immediately after the start of the next one-leg supporting period (a period during which a desired floor reaction force vertical component is zero or in the vicinity of zero), then the processing of S504 to S518 is carried out. In these processing, first, a body horizontal acceleration $\alpha$tmp attributable to a motion of the aforesaid body translational mode is calculated such that a floor reaction force moment horizontal component $-\text{Merr\_p}(k)$ obtained by subtracting a current value $\text{Merr\_p}(k)$ of a floor reaction force moment error (a floor reaction force moment horizontal component error) from an original desired floor reaction force moment horizontal component (=0) about a desired ZMP is generated on a simplified model (S504). $\alpha$tmp denotes a provisional value of a body horizontal acceleration in a gait that is being created. Then, a translational floor reaction force horizontal component Fxtmp' obtained by adding a current value $\text{Ferr\_p}(k)$ of a translational floor reaction force error (a translational floor reaction force horizontal component error) to a translational floor reaction force horizontal component Fxtmp that balances out an inertial force attributable to a horizontal acceleration of the total center-of-gravity of the simplified model (=Fxtmp+Ferr\_p(k)) when the body horizontal acceleration is denoted by $\alpha$tmp is compared with a floor reaction force horizontal component permissible range (S506 to S510). If this comparison reveals that Fxtmp' deviates from the floor reaction force horizontal component permissible range, then a translational floor reaction force horizontal component Fx' to be generated by a motion of the gait that is being created (this Fx' means a desired value of the component obtained by adding Ferr\_p(k) to a translational floor reaction force horizontal component generated on the simplified model by the motion of the gait that is being created) is restricted to an upper limit value Fxmax or a lower limit value Fxmin of the floor reaction force horizontal component permissible range, or if Fxtmp' falls within the floor reaction force horizontal component permissible range, then Fxtmp is directly determined as Fx' (S512 to S514).

Then, a body horizontal acceleration $\alpha$ of the aforesaid body translational mode is determined such that a translational floor reaction force horizontal component obtained by adding the current value Ferr\_p(k) of a translational floor reaction force error (a translational floor reaction force horizontal component error) to a translational floor reaction force horizontal component Fx generated on the simplified model by a motion of a gait that is being created (=Fx+Ferr\_p(k)) agrees with the Fx' determined as described above, and a body angular velocity $\beta$ of the body rotation mode is determined such that a floor reaction force moment horizontal component about a desired ZMP becomes $-\text{Merr\_p}(k)$ on the simplified model by a motion of the body translational mode of the body horizontal acceleration $\alpha$ and a motion of the body rotation mode (S518).

Thus, the body horizontal acceleration $\alpha$ of the body translational mode and the body angular acceleration $\beta$ of the body rotation mode are determined such that $-\text{Merr\_p}(k)$ is generated about the desired ZMP on the simplified model (the value obtained by adding the current value Merr(k) of a floor reaction force moment error to a floor reaction force moment horizontal component generated about the desired ZMP on the simplified model by a motion of the gait that is being created becomes zero, which is the original desired value about the desired ZMP), and the translational floor reaction force horizontal component Fx' obtained by adding the current value Ferr\_p(k) of a translational floor reaction force error to the floor reaction force horizontal component Fx that balances out an inertial force attributable to a horizontal acceleration of the total center-of-gravity (this corresponds to a translational floor reaction force horizontal component truly generated by the motion of the gait that is being created) on the simplified model falls within a floor reaction force horizontal component permissible range.

Further, if the current time k (time within a normal gait that is being created) is time within the aforesaid body inclination angle restoring period, then the processing of S520 to S530 is carried out. In these processing, first, the body angular acceleration $\beta$ is determined such that a floor reaction force moment based on an instantaneous value of a body inclination restoring moment ZMP-converted value pattern (this is determined on the basis of a body inclination restoring moment ZMP-converted value peak value (a latest candidate value) provisionally determined during the processing of the aforesaid S12 and the current time k. Refer to FIG. 19) is generated about a desired ZMP on the simplified model (S520 and S522). Further, the body horizontal acceleration $\alpha$ is determined as a difference between the body horizontal acceleration $\alpha$tmp for a floor reaction force moment about a desired ZMP generated by a motion of a body translational mode on the simplified model to agree with a floor reaction force moment horizontal component $-\text{Merr\_p}(k)$ obtained by subtracting the current value Merr\_p(k) of a floor reaction force moment error from an original desired floor reaction force moment horizontal component (=0) and a body horizontal acceleration that generates a floor reaction force moment equivalent to a floor reaction force moment by the body angular acceleration $\beta$ previously determined (S524 and S526).

Thus, the body angular acceleration $\beta$ and the body horizontal acceleration $\alpha$ are determined such that $-\text{Merr\_p}(k)$ is generated about a desired ZMP while restoring the body posture toward a reference body posture on the simplified model. At the same time, if the body horizontal acceleration is the acceleration $\alpha$ determined as described above, then the translational floor reaction force horizontal component Fx' obtained by adding the current value Ferr\_p(k) of a translational floor reaction force error to the floor reaction force horizontal component Fx that balances out an inertial force attributable to a horizontal acceleration of a total center-of-gravity on the simplified model is determined as a translational floor reaction force horizontal component truly generated by a motion of a gait that is being created. If the current time k is time within the aforesaid body inclination angle restoring period, then a floor reaction force horizontal component permissible range is sufficiently wide, so that the translational floor reaction force horizontal component Fx' determined as described above will not deviate from the permissible range. For this reason, Fx' is not compared with a floor reaction force horizontal component permissible range in the processing of S520 to S530.

Supplementally, the basic concept (approach) of the processing shown in FIG. 15 is the same as the processing shown in FIG. 22 of the aforesaid publication document 1. However, in the processing in the publication document 1, a body horizontal acceleration and a body posture angular acceleration are determined such that they satisfy a desired ZMP (a floor reaction force moment horizontal component about the desired ZMP becomes zero) on the simplified model and also satisfy a floor reaction force horizontal component permissible range on the simplified model. In comparison with this, the processing shown in FIG. 15 of the present embodiment determines a body horizontal acceleration and a body posture angular acceleration such that the floor reaction force moment horizontal component −Merr_p(k) obtained by subtracting the current value Merr_p(k) of a floor reaction force moment error from an original desired floor reaction force moment horizontal component (=0) about a desired ZMP is produced on the simplified model (in other words, the value obtained by adding the current value Merr_p(k) of a floor reaction force moment error to a floor reaction force moment horizontal component produced about the desired ZMP by a motion of the robot 1 on the simplified model becomes zero, which indicates an original desired floor reaction force moment horizontal component about the desired ZMP), and the translational floor reaction force horizontal component Fx' obtained by adding the current value Ferr_p(k) of a translational floor reaction force error to the floor reaction force horizontal component Fx that balances out an inertial force attributable to a horizontal acceleration of a total center-of-gravity satisfies a floor reaction force horizontal component permissible range (falls within the permissible range) on the simplified model.

In the present embodiment, it has been arranged such that the translational floor reaction force horizontal component Fx' obtained by adding the current value Ferr_p(k) of a translational floor reaction force error to the floor reaction force horizontal component Fx that balances out an inertial force attributable to a horizontal acceleration of a total center-of-gravity satisfies a floor reaction force horizontal component permissible range (falls within the permissible range) on the simplified model. Alternatively, however, a body horizontal acceleration and a body posture angular acceleration may be determined such that Fx satisfies a permissible range obtained by subtracting the current value Ferr_p(k) of a translational floor reaction force error from the upper limit value and the lower limit value, respectively, of a floor reaction force horizontal component permissible range. This is equivalent to the original method.

In the present embodiment, a normal gait is generated as described above, so that the normal gait lastly generated in S024 is determined such that a floor reaction force produced on a semi-full model by the motion thereof (this accurately agrees with a floor reaction force acting on the actual robot 1 attributable to the motion) satisfies a desired ZMP and a floor reaction force horizontal component permissible range. At this time, the normal gait is generated on the basis of the dynamics of a simplified model with high linearity, taking into account the error Merr_p(k) and Ferr_p(k) of a floor reaction force produced on the simplified model in response to a motion of the gait. Further, an instantaneous value of the normal gait at each time k is generated by adding a correction based on Merr_p(k) and Ferr_p(k) at that time. This makes it possible to promptly and efficiently determine the initial state of the normal gait in an exploratory manner without causing a motion of the gait to diverge. In addition, the semi-full model is used only to calculate a floor reaction force (a floor reaction force horizontal component and a translational floor reaction force horizontal component) produced by a motion of a gait created using the simplified model; therefore, the calculation does not require exploratory processing or the like and it can be accomplished promptly and easily.

Returning to the explanation of FIG. 10, after the processing of S024 is carried out as explained above, gait parameters of a current time's gait is determined (some are provisionally determined) in S026. This processing is carried out according to the flowchart of FIG. 16. The gait parameters determined here include the parameters that define a foot position/posture trajectory (the position/posture trajectory of each foot 22), a reference body posture trajectory, an arm posture trajectory, a floor reaction force vertical component trajectory, a floor reaction force horizontal component permissible range, and a ZMP trajectory in the current time's gait, and these individual parameters are determined by the processing from S600 to S610. Then, in S612, a body inclination angle restoring period [Ta, Tb] in the current time's gait is set. This processing is the same as the processing of a flowchart of FIG. 33 in the aforesaid publication document 1, so that detailed explanation will be omitted here, but the gait parameters defining the individual trajectories are determined such that the aforesaid trajectories are connected from the terminal states of a last time's gait (the initial states of a current time's gait) to a normal gait while satisfying the aforesaid requirements related to the current time's gait. For example, the foot trajectory parameter related to the foot 22 of a free leg of the current time's gait is determined such that the expected landing position/posture and time of the foot 22 of the free leg of the current time's gait satisfy the required values thereof and the position/posture of the foot 22 of the free leg at the end of the current time's gait agree at the beginning of a normal gait (at the time of the end of the current time's gait).

Supplementally, the ZMP trajectory parameter determined in S610 is a provisional value, an example of the ZMP trajectory defined by the provisional value (an example of the trajectory in the X-axis direction) being shown at the top in FIG. 21. The ZMP trajectory parameter is determined such that a desired ZMP is positioned near substantially the center of the ground contact surface of the foot 22 of a supporting leg in the one-leg supporting period of the current time's gait and that the desired ZMP continuously changes until the initial ZMP of the normal gait at the end of the current time's gait in a floating period following the one-leg supporting period. Further, the body inclination angle restoring period set in S612 of FIG. 16 is the period from time Ta to time Tb in FIG. 21 and it is the period from the point immediately after the start of the one-leg supporting period of the current time's gait to the point immediately before the end thereof.

The parameters of the current time's gait determined by the processing from S600 to S610 are not all the parameters constituting a current time's gait parameter. In the present embodiment, the gait parameter defining the current time's gait (the current time's gait parameter) includes, in addition to the parameters determined in S026, a ZMP correcting parameter for correcting a ZMP trajectory defined by a ZMP trajectory parameter and a peak value of a body inclination restoring moment ZMP-converted value (two types of peak values in this case). These parameters are determined in the exploratory manner in the processing of S028 explained below.

Subsequently, the procedure proceeds to S028 wherein the gait parameter (the ZMP trajectory parameter) of the current time's gait is corrected. In this processing, the gait parameter of the current time's gait is corrected such that the divergence component at the end of the current time's gait agrees with the initial divergence component of the normal turning gait determined in S024 (more specifically, such that a body position/ posture trajectory is connected to or brought close to a normal gait), thereby determining a final current time's gait parameter (more specifically, determining a ZMP correcting parameter and two types of peak values of a body inclination restoring moment ZMP-converted value).

This processing is carried out according to the subroutine processing shown by the flowchart of FIG. 17.

The processing shown in FIG. 17 will be schematically explained. A ZMP correcting parameter "a", which is the parameter defining a ZMP correction amount, and a first peak value ZMPrecpeaka and a second peak value ZMPrecpeakb of the body inclination restoring moment ZMP-converted value are determined in the exploratory manner such that the terminal divergence component of the current time's gait agrees or substantially agrees with the initial divergence component of a normal gait (such that the current time's gait connects to the normal gait) on the simplified model. Here, the first peak value ZMPrecpeaka and a second peak value ZMPrecpeakb of the body inclination restoring moment ZMP-converted value determined in the processing of FIG. 17 indicate two peak values of a pattern of a ZMP-converted value of a floor reaction force moment required to bring a body posture close to a reference body posture in the body inclination angle restoring period [Ta, Tb] of the current time's gait, an example thereof being shown in FIG. 20. There has been only one peak value of a body inclination restoring moment ZMP-converted value in the case of a normal gait; in the present embodiment, however, the first peak value ZMPrecpeaka and the second peak value ZMPrecpeakb are used as two adjustable parameters of the body inclination restoring moment ZMP-converted value in order to make the body posture angle and the angular velocity thereof at the end of the current time's gait agree with the initial body posture angle and the angular velocity thereof, respectively, of a normal gait. In the present embodiment, as shown in FIG. 20, the body inclination restoring moment ZMP-converted value in the current time's gait takes a pattern having a shape combining a trapezoidal pattern in the first half of a one-leg supporting period and another trapezoidal pattern in the latter half thereof, the peak value of the trapezoidal pattern of the first half being the first peak value ZMPrecpeaka and the peak value of the trapezoidal pattern of the latter half being the second peak value ZMPrecpeakb.

Further, the ZMP correcting parameter "a" determined in the processing of FIG. 17 is a parameter defining the correction amount of a desired ZMP for connecting the current time's gait to the normal gait (for making the terminal divergence component of the current time's gait substantially agree with the initial divergence component q" of the normal gait), an example thereof being shown at the middle in FIG. 21. As illustrated, the ZMP correction amount defined by the ZMP correcting parameter "a" has a trapezoidal pattern produced from a point immediately after the start of a one-leg supporting period to a point immediately before the end thereof, and the peak value "a" is used as the ZMP correcting parameter.

The processing of FIG. 17 will be explained in more detail. First, in S700, the initial candidates of the values of "a", ZMPrecpeaka and ZMPrecpeakb, which are search objects, on the simplified model are provisionally determined. In this case, the initial candidates may be basically arbitrary or they may be determined, for example, on the basis of the values of "a", ZMPrecpeaka and ZMPrecpeakb or the like that have been finally determined when creating a last time's gait.

Subsequently, the loop processing of S704 to S714 is carried out. The processing will be schematically explained. First, in S704, a current time's gait (provisional current time's gait) is calculated using the current candidate values of "a", ZMPrecpeaka, and ZMPrecpeakb, which are search objects, and the simplified model. More specifically, the provisional current time's gait is calculated using a current time's gait parameter composed of a ZMP trajectory parameter that has been corrected on the basis of the current value of the ZMP correcting parameter "a", the current values of ZMPrecpeaka and ZMPrecpeakb, and parameters other than the ZMP trajectory parameter determined in S026 (a foot trajectory parameter, a floor reaction force vertical component trajectory parameter, etc.), and the simplified model. More specific processing of S704 will be discussed hereinafter.

Then, in S706 to S716, the difference between the divergence component at the terminating end of the provisional current time's gait calculated in S704 (the time at which the foot of a free leg of the current time's gait is expected to land) and the initial divergence component q" of a normal gait (the component finally calculated in the aforesaid S024), the difference between the body posture angle at the terminating end of the provisional current time's gait and the initial body posture angle of the normal gait (the posture angle finally calculated in the aforesaid S024), and the difference between the angular velocity of the body posture angle at the terminating end of the provisional current time's gait and the initial posture angular velocity of the normal gait (the angular velocity finally calculated in the aforesaid in the aforesaid S024) are determined. Then, it is determined whether all the values of these differences satisfy a condition in that they fall within permissible ranges (whether they are in the vicinity of zero), and if they do not satisfy the condition, then the values of the search objects are changed. This is repeated to eventually determine "a", ZMPrecpeaka and ZMPrecpeakb as the corrected values of a gait parameter that allows the provisional current time's gait to connect to the normal gait on the simplified model.

The processing of S706 to S716 will be explained in more detail. In S706, a terminal divergence component q0[k] of the provisional current time's gait is calculated according to the aforesaid definitional expression of divergence components from body position and velocity (Xe, Ve) at the terminating end of the provisional current time's gait.

Subsequently, in S708, the difference between the terminal divergence component q0[k] and the initial divergence component q" of a normal turning gait is determined as a terminal divergence component error errq.

Further, in S710, the difference between the initial body posture angle of the normal gait and the terminal body posture angle of the provisional current time's gait created in S704 is determined as a terminal body posture angle error θberr, and the difference between the initial body posture angular velocity of the normal gait and the terminal body posture angular velocity of the provisional current time's gait created in S704 is determined as a terminal body posture angular velocity error oberr.

The errors errq, θberr, and oberr determined as described above indicate a degree of deviation of the provisional current time's gait created in S704 from a boundary condition (a condition in that the current time's gait connects, at its terminating end, to the normal gait).

Subsequently, in S712, it is determined whether all of the errq, θberr, and oberr determined as described above fall within predetermined permissible ranges in the vicinity of zero, and the determination result is YES, then the loop processing of S704 to S716 is terminated. In this case, a current time's gait parameter that includes current candidate values of search objects is obtained as the current time's gait parameter that makes it possible to generate a gait connecting to a normal gait on the simplified model.

Meanwhile, if the determination result in S712 is NO, then the candidates of a plurality of (three in the present embodiment) search objects obtained by changing the values of the individual parameters by predetermined extremely small amounts Δa, ΔZMPrecpeaka, and ΔZMPrecpeakb are determined in the vicinity of the candidate values of the current search objects ("a", ZMPrecpeaka, ZMPrecpeakb), and the same processing as that of S704 to S710 is carried out on the basis of the current time's gait parameters, which include the candidates of the individual search objects, to determine a set of errors (errq, θberr, ωberr) associated with each search object candidate.

Subsequently, in S716, the new candidates of the search objects ("a", ZMPrecpeaka, ZMPrecpeakb) are determined by an exploratory technique, such as the steepest descent method or the simplex method, on the basis of the current candidates of the search objects ("a", ZMPrecpeaka, ZMPrecpeakb) and the sets of errors (errq, θberr, ωberr) associated with the candidates of the search objects in the vicinity thereof. Then, the processing from S704 is repeated again.

As described above, the current time's gait parameter is determined in the exploratory manner such that a current time's gait connects to a normal gait, ("a", ZMPrecpeaka, ZMPrecpeakb) being the search objects.

The processing of S704 in the processing of FIG. 17 is implemented by the subroutine processing shown by the flowchart of FIG. 18.

This processing of FIG. 18 is the processing for determining a floor reaction force moment error about a desired ZMP and a translational floor reaction force error and for sequentially creating, in time series, the instantaneous value of a current time's gait (provisional current time's gait) from the start to the end thereof, as with the aforesaid processing of FIG. 13 related to the creation of a normal gait. In this case, the difference from the processing for generating a normal gait in FIG. 13 is only the initial state of the gait and the gait generation period. More specifically, regarding this different aspect, in the processing of FIG. 18, the terminal state of a last time's gait (specifically, the terminal state of the current time's gait observed in the supporting leg coordinate system) is set as the initial state of the current time's gait (the provisional current time's gait) in S800 and S818. Further, the period during which the processing of S804 to S810 and the processing of S820 to S824 are carried out is the period from start time (k=0) of the current time's gait to end time Tcurr (the time at which the foot 22 of a free leg of the current time's gait is expected to land) of the current time's gait (refer to S804 and S820). The processing other than this is the same as the processing of FIG. 13. In this case, the processing of S800 to S810 corresponds to the processing of S300 to S310 of FIG. 13, and the processing of S818 to S824 corresponds to the processing of S318 to S324 of FIG. 13. Thus, the processing of S806 and S822 of FIG. 18 is implemented by the aforesaid subroutine processing of FIG. 14, and the processing of S412 of FIG. 14 is implemented by the subroutine processing of FIG. 15. However, in the processing of S806 and S822 of FIG. 18, the processing of S500 is omitted in the processing of FIG. 15, which is the subroutine processing of S412 of FIG. 14. This is because the body inclination angle restoring period of the current time's gait is the period [Ta, Tb] set in S612 of FIG. 16.

In the present embodiment, the provisional current time's gait is generated in S028 as explained above. In this case, as in the case of creating a normal gait, the processing of S800 to S810 of FIG. 18 provisionally creates the current time's gait such that a desired ZMP (a desired ZMP obtained by correcting the desired ZMP defined by a ZMP trajectory parameter determined in S026 by a ZMP correcting parameter "a" provisionally determined in the processing of FIG. 17 (the latest candidate value)) is satisfied and that a floor reaction force horizontal component permissible range (the permissible range defined by the parameters determined in S026) is satisfied on the simplified model from the start to the end of the current time's gait. Then, based on a motion (provisional motion) of the provisionally created gait, the time series of the floor reaction force moment error (floor reaction force moment horizontal component error) Merr_p(k) and the translational floor reaction force error Ferr_p(k) are determined using the simplified model and the semi-full model. Furthermore, the processing of S818 to S824 of FIG. 18 creates the time series of instantaneous values of the provisional current time's gait such that a floor reaction force moment horizontal component produced about the aforesaid desired ZMP on the simplified model becomes −Merr_p(k) (the value obtained by adding the current value Merr(k) of a floor reaction force moment error to a floor reaction force moment horizontal component generated about the desired ZMP on the simplified model by a motion of a gait that is being created becomes zero, which is the original desired value about the desired ZMP) and that the value obtained by adding Ferr_p(k) to a translational floor reaction force horizontal component generated on the simplified model falls within a floor reaction force horizontal component permissible range related to the current time's gait at each time k of the current time's gait.

Accordingly, the provisional current time's gait lastly generated in S028 will be a gait that connects to a normal gait (satisfy the boundary condition of the current time's gait) while satisfying a desired ZMP and a floor reaction force horizontal component permissible range on a semi-full model. At this time, the provisional current time's gait is generated on the basis of the dynamics of the simplified model, taking into account the error Merr_p(k) and Ferr_p(k) of a floor reaction force on the simplified model. Further, an instantaneous value of the current time's gait at each time k is generated by adding a correction based on Merr_p(k) and Ferr_p(k) at that time. This makes it possible to promptly and efficiently determine the gait parameters ("a", ZMPrecpeaka, and ZMPrecpeakb) of the current time's gait in an exploratory manner without causing a motion of the gait to diverge.

Returning to the explanation of FIG. 10, after the processing of S028 is carried out as explained above, the procedure proceeds to S030 wherein the parameters defining a ZMP permissible range and a floor reaction force horizontal component permissible range for full-model correction are determined.

This processing is the same as the processing of S030 of FIG. 13 in the aforesaid publication document 1, so that the explanation thereof will be omitted herein.

The processing up to S018 to S030 explained above is the processing carried out by the aforesaid gait parameter determiner 100a. Supplementally, the time series of Merr_p(k) related to the provisional current time's gait lastly generated in S028 is the aforesaid floor reaction force moment error trajectory (refer to FIG. 5) and the time series of Ferr_p(k) related to the provisional current time's gait is the aforesaid translational floor reaction force error trajectory (refer to FIG. 5).

After the processing of S030 is carried out or if the determination result of S016 is NO, then the procedure proceeds to S032 wherein an instantaneous value of the current time's gait is sequentially determined. The subroutine processing of this processing is the same as the aforesaid processing of the flowchart shown in FIG. 14. However, in this case, the values lastly determined in S028 of FIG. 10 described above are used as the values of the time series of Merr_p(k) and Ferr_p(k) used in S412. The processing of S416 and S418 is omitted. The time width (the value of the aforesaid Δk) of the time series of the instantaneous values of the current time's gait is defined as the control cycle Δt of the control unit 60.

Subsequently, the procedure proceeds to S034 wherein the operations of the arm bodies to cancel a spin (the rotation about a vertical axis) of the robot 1 is determined. This processing is for determining the postures of the arm bodies such that a floor reaction force moment in the opposite direction from the vertical component of the floor reaction force moment, which would be generated about a desired ZMP if the robot 1 were operated according to a desired gait without swinging the arms of the robot 1, is generated by the arm swings of the arm bodies (a motion of swinging both arm back and forth in the opposite directions from each other). This is performed in the same manner as that in S034 of FIG. 13 in the aforesaid publication document 1. The details thereof are described in the publication document 1, so that no further explanation will be given herein.

Supplementally, the processing of S412 and S414 in S032 and the processing of S034 are the processing carried out by the aforesaid simplified model gait generator 100c.

Subsequently, the procedure proceeds to S036 wherein the instantaneous value of the ZMP permissible range and the instantaneous value of the floor reaction force horizontal component permissible range for full-model correction (for the processing of the aforesaid full-model corrector 100e) are determined. In this processing, they are determined on the basis of the gait parameters that define the ZMP permissible range and the floor reaction force horizontal component permissible range determined in S030 described above.

Supplementally, the processing of S032 to S036 (excluding the processing of S412 and S414 in S032 and the processing of S034) is the processing carried out by the aforesaid desired instantaneous value generator 100b.

Subsequently, the procedure proceeds to S038 wherein a corrected gait using the full-model is generated. This processing is the processing carried out by the aforesaid full-model corrector 100c. In this case, the processing is the same as the processing of S038 of FIG. 13 in the aforesaid publication document 1, and it is carried out exactly as described in the publication document 1. Hence, detailed explanation will be omitted in the present description. This processing determines corrected desired body position/posture obtained by further correcting desired body position/posture (the body position/posture of the aforesaid displacement-dimension corrected gait) and a corrected desired floor reaction force moment.

The above is the gait generation processing of the gait producing device 100 in the present embodiment.

Here, the correspondence relationship between the gait generation processing of the gait producing device 100 in the present embodiment and the present invention will be explained.

In the present embodiment, the normal gait lastly generated in the processing of S024 in FIG. 10 corresponds to the desired gait in the first invention or the second invention described above. In this case, in association with the final normal gait, the motion of the normal gait created by the processing of S300 to S310 of FIG. 13 in the processing of S024 corresponds to the provisional motion in the first or the second invention, and the processing of S300 to S310 corresponds to the provisional motion creating means in the first invention or the second invention described above. And, the processing of S318 to S324 of FIG. 13 corresponds to the provisional motion correcting means in the first invention or the second invention. More specifically, in S415 of FIG. 14 in the processing of S322, the embodiment in which the floor reaction force moment horizontal component Msmpl(k) about a desired ZMP generated on the simplified model by a desired motion is actually calculated by the computation of the simplified model corresponds to the first invention, while the embodiment in which the aforesaid expression 3a is used to determine the Msmpl(k) corresponds to the second invention.

Similarly, the current time's gait lastly generated by the processing of S028 of FIG. 10 or the current time's gait generated by the processing of S032 corresponds to the desired gait in the first invention or the second invention described above. In this case, in association with the final normal gait, the motion of the normal gait created by the processing of S800 to S810 of FIG. 18 in the processing of S028 corresponds to the provisional motion in the first or the second invention, and the processing of S800 to S810 corresponds to the provisional motion creating means in the first invention or the second invention described above. And, the processing of S818 to S824 of FIG. 18 corresponds to the provisional motion correcting means in the first invention or the second invention. More specifically, in S415 of FIG. 14 in the processing of S822, the embodiment in which the floor reaction force moment horizontal component Msmpl(k) about a desired ZMP generated on the simplified model by a desired motion is actually calculated by the computation of the simplified model corresponds to the first invention, while the embodiment in which the aforesaid expression 3a is used to determine the Msmpl(k) corresponds to the second invention.

The operation of the composite-compliance control unit 101 will now be explained with reference to FIG. 4. Incidentally, the operation of the composite-compliance control unit 101 is described in detail in Japanese Unexamined Patent Application Publication No. H10-277969 and the like previously applied by the present applicant; therefore, only schematic explanation will be given in the present description. In the gait producing device 100, the corrected desired body position/posture (trajectory) and the desired arm posture (trajectory) out of the desired gait generated as described above are sent out to a robot geometric model (inverse kinematics calculator) 102.

Further, the desired foot position/posture (trajectory), the desired ZMP trajectory (the desired total floor reaction force central point trajectory), and the desired total floor reaction force (trajectory)(the corrected desired floor reaction force moment and the desired floor reaction force vertical component) are sent to a composite-compliance operation determiner 104 and also to a desired floor reaction force distributor 106. Then, in the desired floor reaction force distributor 106, the floor reaction force is distributed to each foot 22 and the desired floor reaction force central point of each foot and the desired floor reaction force of each foot are determined. The determined desired floor reaction force central point of each foot and the desired floor reaction force of each foot are sent to the composite-compliance operation determiner 104.

Corrected desired foot position/posture (trajectory) with deformation compensation is sent from the composite-compliance operation determiner 104 to the robot geometric model 102. Upon receipt of the desired body position/posture (trajectory) and the corrected desired foot position/posture (trajectory) with deformation compensation, the robot geometric model 102 calculates the joint displacement commands (values) of the twelve joints of the leg bodies 2, 2 that satisfy them and sends them to a displacement controller 108. The displacement controller 108 carries out follow-up control of the displacements of the twelve joints of the robot 1, using the joint displacement commands (values) calculated by the robot geometric model 102 as the desired values. Further, the robot geometric model 102 calculates the displacement commands (values) of arm joints that satisfy desired arm postures and sends them to the displacement controller 108. The displacement controller 108 carries out follow-up control of the displacements of the twelve joints of the arm bodies of the robot 1, using the joint displacement commands (values) calculated by the robot geometric model 102 as the desired values.

The floor reaction forces (specifically, the actual floor reaction force of each foot) generated in the robot 1 are detected by the six-axis force sensor 50. The detected values are sent to the aforesaid composite-compliance operation determiner 104. Further, the posture inclination errors θerrx and θerry (specifically, the errors of actual posture angles relative to the desired body posture angle, the posture angle error in the roll direction (about the X-axis) being denoted by θerrx and the posture angle error in the pitch direction (about the Y-axis) being denoted by θerry) generated in the robot 1 are detected through the intermediary of the posture sensor 54, and the detected values are sent to a posture stabilization control calculator 112. The posture stabilization control calculator 112 calculates the compensating total floor reaction force moment about the desired total floor reaction force central point (the desired ZMP) for restoring the body posture angle of the robot 1 to the desired body posture angle and the calculation result is sent to the composite-compliance operation determiner 104. The composite-compliance operation determiner 104 corrects the desired floor reaction force on the basis of the input value. To be specific, the desired floor reaction force is corrected such that the compensating total floor reaction force moment or the sum of the compensating total floor reaction force moment and the corrected desired floor reaction force moment acts about the desired total floor reaction force central point (the desired ZMP).

The composite-compliance operation determiner 104 determines the aforesaid corrected desired foot position/posture (trajectory) with deformation compensation so as to make the states of the actual robot and the floor reaction force calculated from sensor-detected values and the like coincide with the desired floor reaction force that has been corrected. In this case, the corrected desired foot position/posture with deformation compensation considers the mechanical deformation of the aforesaid compliance mechanism 72 or the like. However, it is virtually impossible to make all states agree with desired values, so that a trade-off relationship is imparted among them to make them compromisingly agree as much as possible. More specifically, a control error for each desired value is weighted in conducting control so that the weighted average of the control error (or the square of the control error) is minimized. Thus, actual foot position/posture and total floor reaction force are controlled so as to approximately follow the desired foot position/posture and the desired total floor reaction force.

Several modifications of the embodiment explained above will now be explained. The modifications explained below are applicable to cases where either normal gaits or current time's gaits are generated.

In the embodiment described above, the body acceleration and the body posture angular acceleration have been determined (and the desired gait (the normal gait or the current time's gait) has eventually been determined) such that the floor reaction force moment about the desired ZMP becomes the floor reaction force moment horizontal component $-\text{Merr}\_p(k)$ obtained by subtracting the current value $\text{Merr}\_p(k)$ of the floor reaction force moment error from the original desired floor reaction force moment horizontal component ($=0$) at each time k from the start to the end of the gait (the normal gait or the current time's gait). Alternatively, however, the body acceleration and the body posture angular acceleration may be determined, taking the floor reaction force moment horizontal component obtained by subtracting the value acquired by multiplying the current value $\text{Merr}\_p(k)$ of the floor reaction force moment error by a predetermined coefficient (e.g., a positive number of 1 or less) from a desired floor reaction force moment horizontal component as the desired value of a floor reaction force moment about a desired ZMP on the simplified model. This means that the body acceleration and the body posture angular acceleration are determined such that the floor reaction force moment horizontal component acquired by adding the value obtained by multiplying the current value $\text{Merr}\_p(k)$ of the floor reaction force moment error by a predetermined coefficient (e.g., a positive number of 1 or less) (this corresponding to a first floor reaction force correction amount in the present invention) to the floor reaction force moment horizontal component produced about the desired ZMP on the simplified model by a motion of a gait (desired gait) that includes the body acceleration and the body posture angular acceleration to be determined agrees with the original desired floor reaction force moment horizontal component. Thus, a motion of a gait may be determined such that the floor reaction force moment horizontal component obtained by adding the floor reaction force correction amount determined on the basis of $\text{Merr}\_p(k)$ to the floor reaction force moment horizontal component generated about the desired ZMP on the simplified model by a motion of a gait (desired gait) that includes the body acceleration and the body posture angular acceleration to be determined agrees with the original desired floor reaction force moment horizontal component. The aforesaid floor reaction force correction amount may be determined from $\text{Merr}\_p(k)$ by using a monotone increasing nonlinear function.

Based on the same concept, the body acceleration and the body posture angular acceleration may be determined such that the translational floor reaction force horizontal component acquired by adding the value obtained by multiplying the current value $\text{Ferr}\_p(k)$ of the translational floor reaction force error by a predetermined coefficient (e.g., a positive number of 1 or less) (this corresponding to a second floor reaction force correction amount in the present invention) to the floor reaction force horizontal component Fx balancing out an inertial force attributable to a horizontal acceleration of the total center-of-gravity (the horizontal acceleration of the total center-of-gravity attributable to the motion of a gait (desired gait) that includes the body horizontal acceleration and the body posture angular acceleration to be determined) on the simplified model satisfies a floor reaction force horizontal component permissible range. Thus, a motion of a gait may be determined such that the translational floor reaction force horizontal component obtained by adding the floor reaction force correction amount determined on the basis of $\text{Ferr}\_p(k)$ to the floor reaction force horizontal component Fx balancing out an inertial force attributable to a motion of a gait (desired gait) that includes the body horizontal acceleration and the body posture angular acceleration to be determined satisfies a floor reaction force horizontal component permissible range. Incidentally, the aforesaid floor reaction force correction amount may be determined from Ferr_p(k) by using a monotone increasing nonlinear function.

Further, after completion of the processing of S300 to S310 in FIG. 13, it is determined, before carrying out the processing of S318 to S324 in FIG. 13, whether the time series of the errors Merr_p(k) and Ferr_p(k) determined by the processing of S304 to S310 take values that are sufficiently close to zero, and the processing of S318 to S324 may be omitted, depending upon the determination result. More specifically, if the determination result is YES, it means that the dynamic accuracy of a floor reaction force produced on the simplified model by a motion of a gait generated by the processing of S304 to S310 is adequately secured (the floor reaction force approximates a true value). In such a case, therefore, the processing of S318 to S324 may be omitted and the gait generated by the processing of S304 to S310 may be defined as the desired gait to be lastly obtained by the processing shown in FIG. 13. The same applies to the processing shown in FIG. 18 for creating a current time's gait. Determining whether the time series of the errors Merr_p(k) and Ferr_p(k) respectively take values approximating zero can be of course accomplished by determining whether the values of the time series of Merr_p(k) and Ferr_p(k) fall within permissible ranges in the vicinity of zero; alternatively, however, it may be determined whether a particular characterizing amount of the time series pattern of each of Merr_p(k) and Ferr_p(k)(e.g., the maximum value of an absolute value of each value of the times series or the effective value of the absolute value, or the difference between a maximum value and a minimum value of the time series pattern) falls within a permissible range in the vicinity of zero.

Further, in the aforesaid embodiment, the error Merr_p(k) related to the floor reaction force moment horizontal component about the desired ZMP has been used; alternatively, however, a point of action different from the point of a desired ZMP may be set, and an error (denoted by Merr_p'(k) here) related to a floor reaction force moment horizontal component about the point of action may be used. In this case, in the processing of S412 in FIG. 14, determining the body horizontal acceleration and the body posture angular acceleration such that a value obtained by subtracting the error Merr_p'(k) from the desired value of a floor reaction force moment horizontal component about the point of action (the desired value that causes the floor reaction force moment horizontal component about the desired ZMP to become zero) is produced will be equivalent to determining the body horizontal acceleration and the body posture angular acceleration (eventually determining the instantaneous value of a motion of a desired gait) such that −Merr_p(k) is produced about the desired ZMP.

Further, the explanation has been given, taking the case where running of the robot 1 is performed as an example in the embodiment described above; however, the present invention can be applied also to a case where walking of the robot 1 is performed. In this case, the floor reaction force vertical component trajectory (or a parameter defining it) may be set as shown in, for example, FIG. 40 in the aforesaid publication document 1. The body inclination angle restoring period may be set to, for example, the two-leg supporting period. Alternatively, if the friction coefficient of a floor assumed in generating a gait is large and the floor reaction force horizontal component permissible range is sufficiently wide over the whole period of one step of the gait (if a translational floor reaction force horizontal component produced by a motion of the gait to be generated will securely fall within the floor reaction force horizontal component permissible range), then the whole period may be set to the body inclination angle restoring period. Incidentally, in this case, a body inclination restoring moment ZMP-converted value may be zero.

Further, in the aforesaid embodiment, the floor reaction force moment error Merr_p(k) has been used. The value obtained by dividing the Merr_p(k) by a desired floor reaction force vertical component at each time k of a gait will correspond to the amount of deviation (error) of the ZMP at time k (the point on a floor surface at which the moment horizontal component of the resultant force of the inertial force produced by a motion of a gait of the robot 1 and the gravity becomes zero) from a desired ZMP. Hence, the error of a ZMP from a desired ZMP (this is denoted by ZMPerr_p(k) here) may be used in place of the floor reaction force moment error Merr_p(k). In this case, in the processing of S412 in FIG. 14, determining the body horizontal acceleration and the body posture angular acceleration such that the horizontal component of a floor reaction force moment acting, due to the resultant force of the inertial force produced by a motion of a gait of the robot 1 and the gravity, about a point shifted in the opposite direction from a desired ZMP by the error ZMPerr_p(k) (the value obtained by converting Merr_p(k) into the amount of deviation of a ZMP from a desired ZMP) or by a value obtained by multiplying the error ZMPerr_p(k) by a predetermined coefficient (e.g., a positive number of 1 or less)(the point whose position has been shifted from the desired ZMP by −ZMPerr_p(k) or the point whose position has been shifted by the value resulting from multiplying −ZMPerr_p(k) by a predetermined coefficient) becomes zero will be equivalent to determining the body horizontal acceleration and the body posture angular acceleration (eventually determining an instantaneous value of a motion of a desired gait) such that −Merr_p(k) or a floor reaction force moment horizontal component obtained by multiplying −Merr_p(k) by a predetermined coefficient is produced about the desired ZMP. This is equivalent to determining the body horizontal acceleration and the body posture angular acceleration (eventually determining an instantaneous value of a motion of a desired gait) such that the result obtained by adding ZMPerr_p(k) or the value obtained by multiplying ZMPerr_p(k) by a predetermined coefficient to the position of ZMP calculated on the simplified model from a motion of the gait to be created agrees with the position of a desired ZMP.

Using the error ZMPerr_p(k) in place of Merr_p(k) in the aforesaid embodiment constitutes the embodiments of the third invention or the fourth invention described above. In this case, to be more specific, in the processing of S306 in FIG. 13 or S806 in FIG. 18, Merr(k) determined in S418 in FIG. 14 may be divided by an instantaneous value of a floor reaction force vertical component at the appropriate time k and the result may be determined as the error ZMPerr_p(k). At this time, in S414 of FIG. 14, if the floor reaction force moment Msmpl(k) produced about the desired ZMP on the simplified model is calculated by actual computing of the simplified model, then the error ZMPerr_p(k) determined as described above means the difference between the ZMP calculated on a semi-full model from a motion (a provisional motion) of a gait that is being created by the processing of S306 in FIG. 13 or S806 in FIG. 18 and the ZMP calculated on the simplified model from the motion. Hence, the embodiment in this case corresponds to an embodiment of the aforesaid third invention.

Further, in S414 of FIG. 14, if the floor reaction force moment Msmpl(k) generated about a desired ZMP on the simplified model is calculated as the difference between a desired value (=0) of a floor reaction force moment horizontal component about the desired ZMP according to the aforesaid expression 3a and Merr_p(k), then the error ZMPerr_p(k)

determined as described above means the difference between a ZMP calculated on a semi-full model from a motion (a provisional motion) of a gait that is being created by the processing of S306 in FIG. 13 or S806 in FIG. 18 and the desired ZMP. Hence, the embodiment in this case corresponds to an embodiment of the aforesaid fourth invention.

Using the error ZMPerr_p(k) in place of Merr_p(k) in the aforesaid embodiment constitutes the embodiment of the third invention or the fourth invention described above. However, when generating a gait having a floating period, a floor reaction force vertical component becomes zero with a resultant unstable ZMP in the floating period; therefore, it is preferred to use a floor reaction force moment error as in the aforesaid embodiments. When generating a walking gait of the robot 1, no floating period will be included, so that ZMPerr_p(k) can be used throughout the period of the gait. Further, in these embodiments also, in place of the floor reaction force moment horizontal component error Merr(t) and the translational floor reaction force horizontal component error Ferr(t), floor reaction force correction amounts determined on the basis of their values may be used, as explained in relation to the modification of the first invention or the second invention described above.

Further, in the aforesaid embodiments, the processing in FIG. 13 or FIG. 18 generates gaits that satisfy a desired ZMP and a floor reaction force horizontal component permissible range from the start to the end thereof, and then generates a gait (a normal gait or a current time's gait), to which corrections of the floor reaction force moment error Merr_p(k) and the translational floor reaction force Ferr_p(k) have been added, from the start to the end thereof; alternatively, however, the generation of an instantaneous value of a gait that satisfies a desired ZMP and a floor reaction force horizontal component permissible range and the generation of an instantaneous value of a gait to which corrections of the floor reaction force moment error Merr_p(k) and the translational floor reaction force Ferr_p(k) determined on the basis of a motion (provisional motion) of the gait have been added may be sequentially performed at each time k from the start to the end of the gait.

Further, as previously described, the aforesaid semi-full model may be the same as a full model for full-model correction. In this case, to promptly and efficiently implement the processing for determining a gait parameter in the exploratory manner (the processing of S024 and S028 in FIG. 10), the floor reaction force horizontal component permissible range for a semi-full model is preferably set to be wider than the floor reaction force horizontal component permissible range for a full model.

Further, in the aforesaid embodiments, only the permissible range of the translational floor reaction force horizontal component about a desired ZMP has been set, excluding the processing for correcting a gait by the full model; alternatively, however, the permissible range of a floor reaction force moment vertical component about the desired ZMP may be also set in order to prevent the robot 1 from spinning. In this case, regarding a floor reaction force moment error, an error of a floor reaction force moment vertical component may be also determined instead of determining only an error of a floor reaction force moment horizontal component on a motion of a gait created on the simplified model such that the desired ZMP, the floor reaction force horizontal component permissible range, and the permissible range of a floor reaction force moment vertical component are satisfied, and then a motion of a desired gait may be generated such that the moment composed of a floor reaction force moment vertical component produced on the simplified model and an error relative to the vertical component satisfies the permissible range for the vertical component.

Further, in the processing of S306 in FIG. 13 or S806 in FIG. 18, an error of a translational floor reaction force vertical component may be also determined, and then a motion of a desired gait may be generated such that the value composed of a translational floor reaction force vertical component produced on the simplified model and an error thereof satisfies a desired value of the translational floor reaction force vertical component.

INDUSTRIAL APPLICABILITY

As is obvious from the above explanation, the gait producing device for a moving robot in accordance with the present invention is useful in that it is capable of efficiently generating a gait that makes it possible to prevent the robot from slipping and to successfully secure dynamic accuracy between a motion of the gait and a floor reaction force while accomplishing temporal coordination between them at the same time, and also capable of generating a gait of a moving robot, such as a biped moving robot in particular, which inherently has low stability, while securing the stability of the moving robot.

BRIEF DESCRIPTION OF THE DRAWINGS

FIG. 12 is a flowchart showing the subroutine processing of FIG. 10.

FIG. 14 is a flowchart showing the subroutine processing of FIG. 13.

Figure 1:
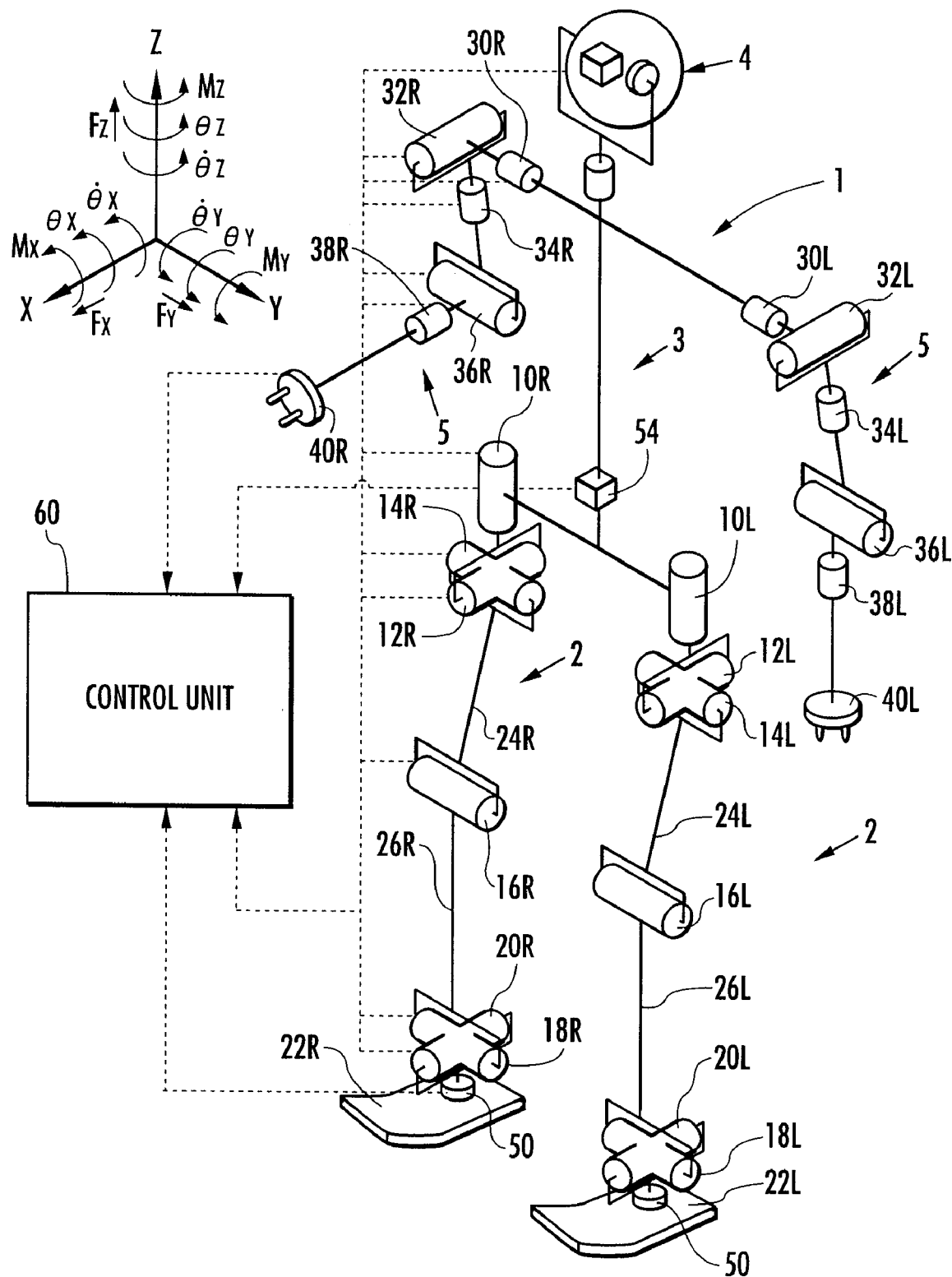
FIG. 1 is a diagram showing the overview of the entire construction of a moving robot (a bipedal walking robot) to which the embodiments of the present invention are applied.
Figure 2:
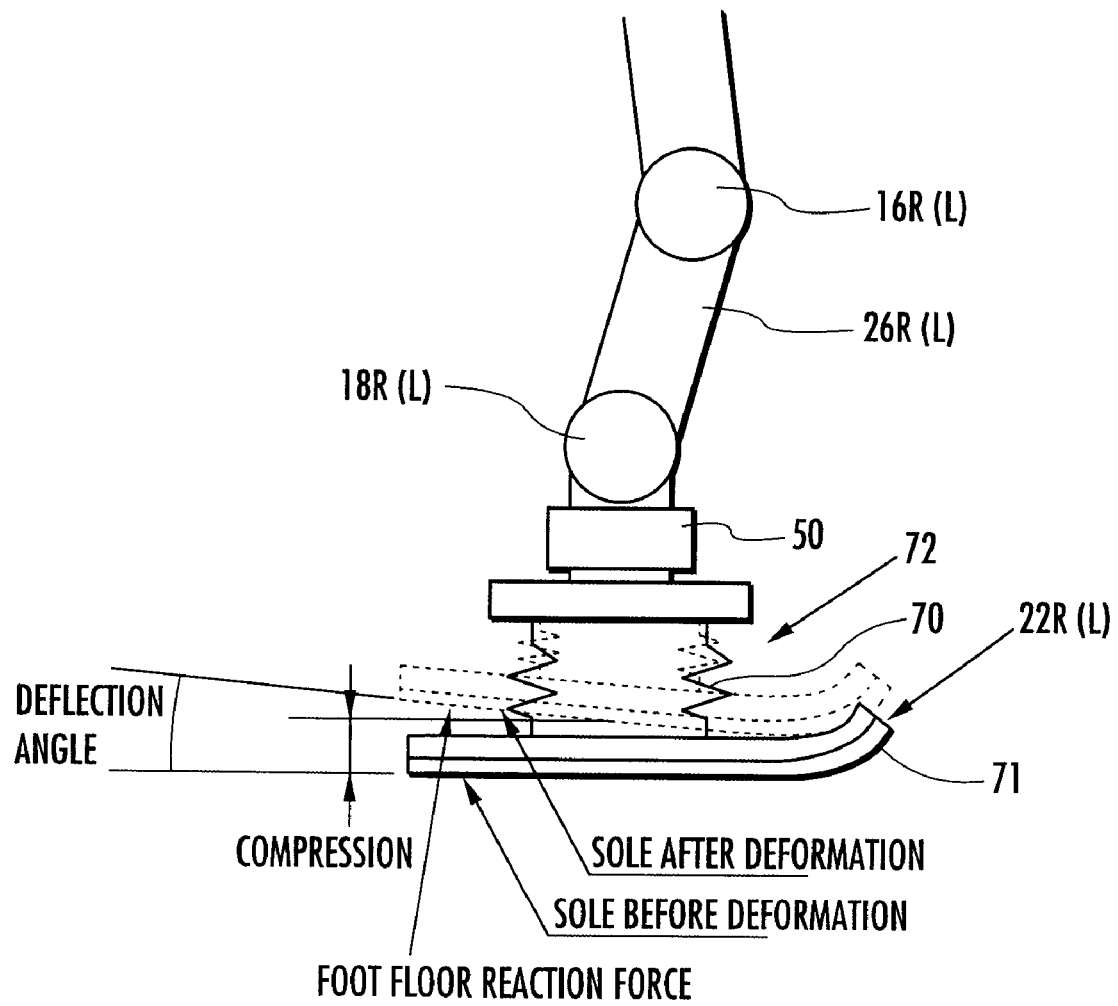
FIG. 2 is a side view showing the construction of a foot portion of each leg body of the robot shown in FIG. 1.
Figure 3:
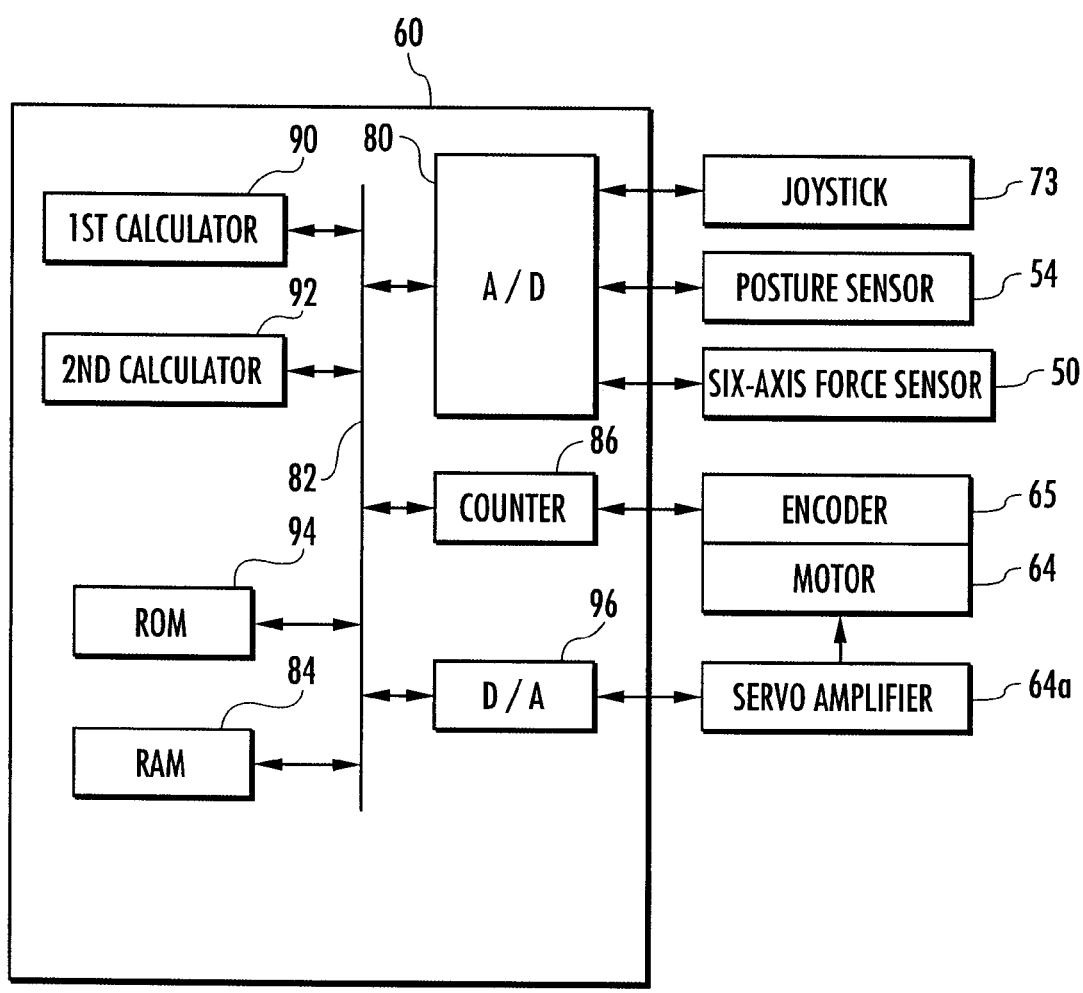
FIG. 3 is a block diagram showing the construction of a control unit provided in the robot shown in FIG. 1.
Figure 4:
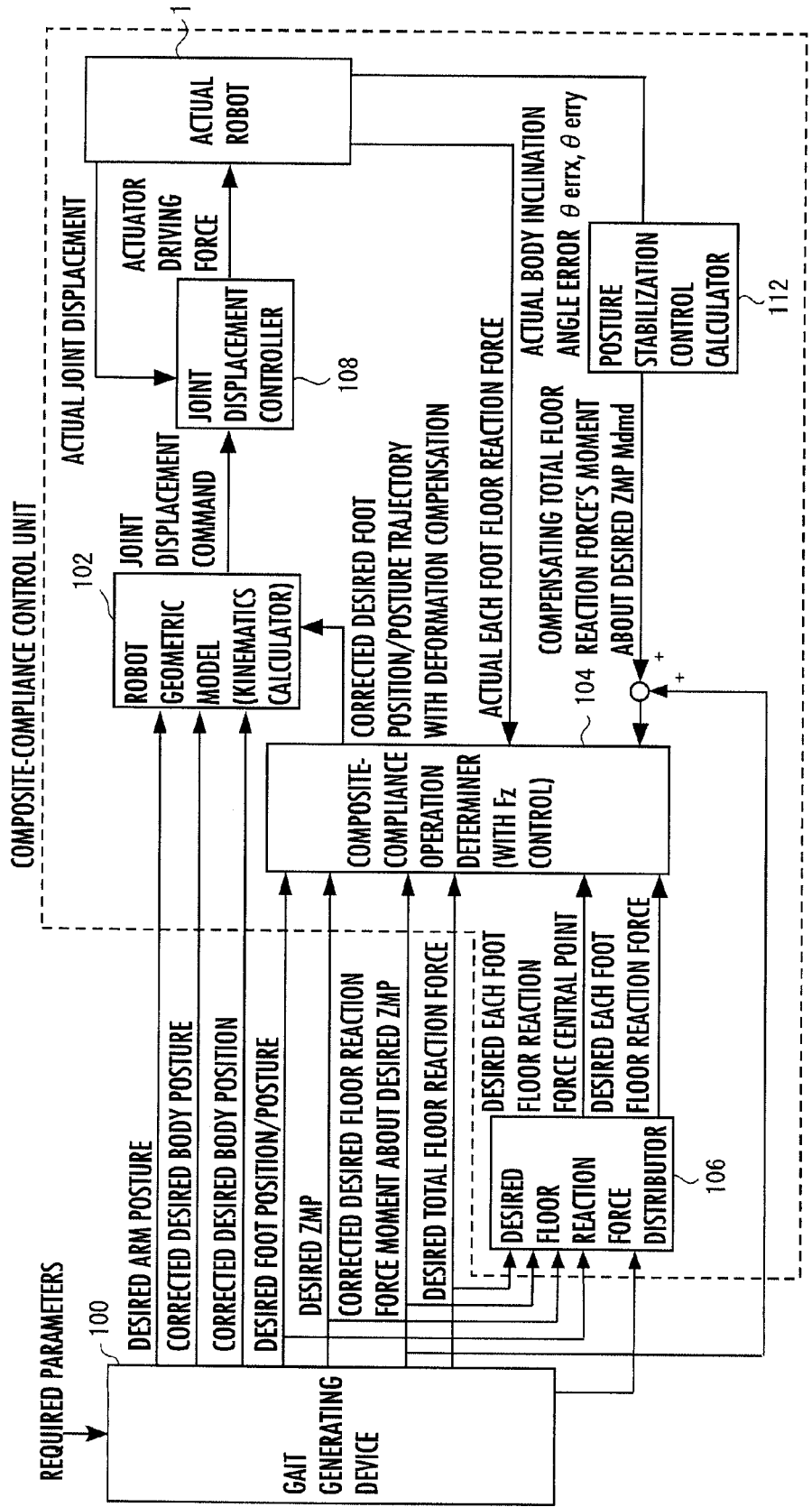
FIG. 4 is a block diagram showing the functional construction of the control unit shown in FIG. 3.
Figure 5:
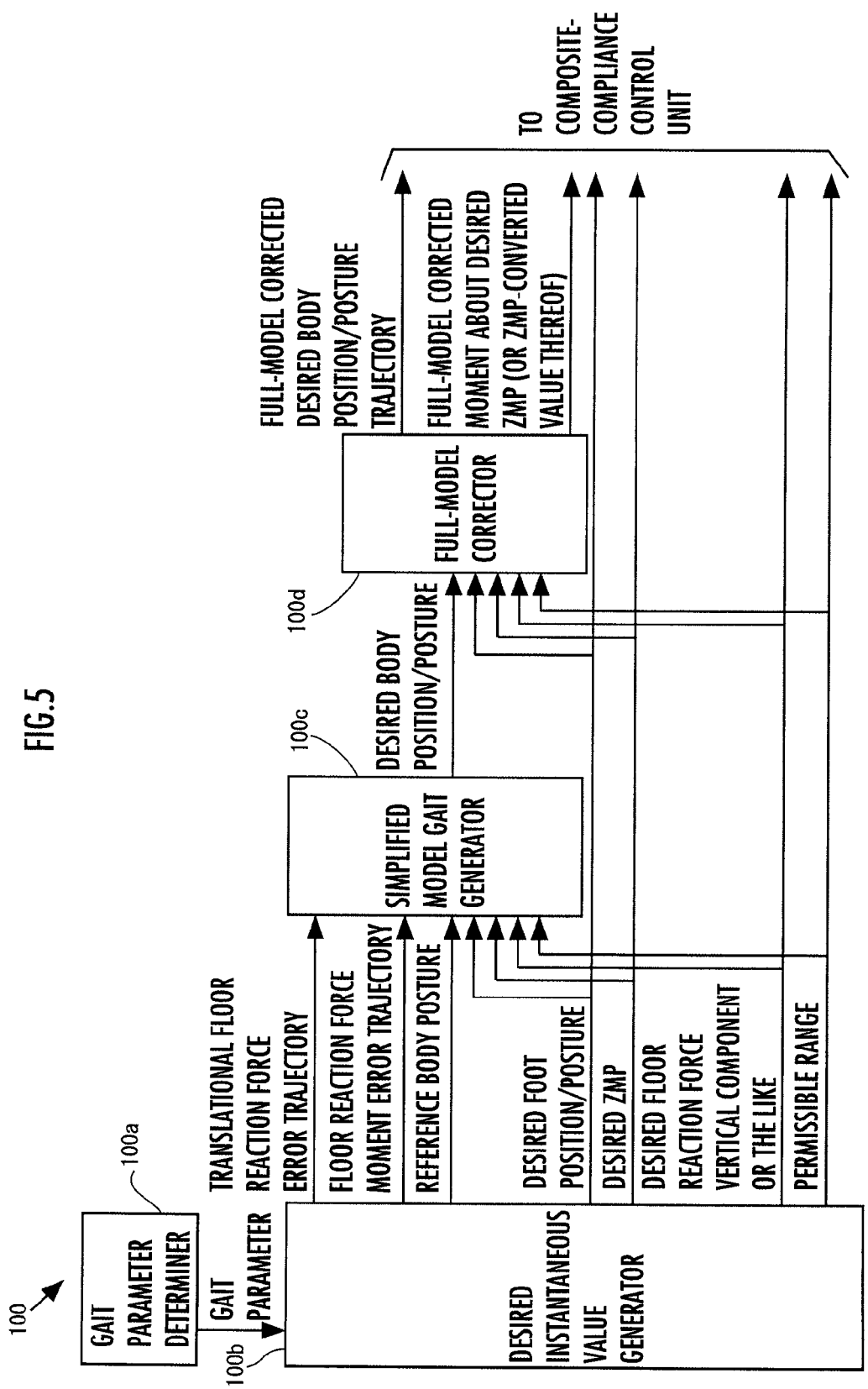
FIG. 5 is a block diagram showing the functions of a gait generating device shown in FIG. 4.
Figure 6A:
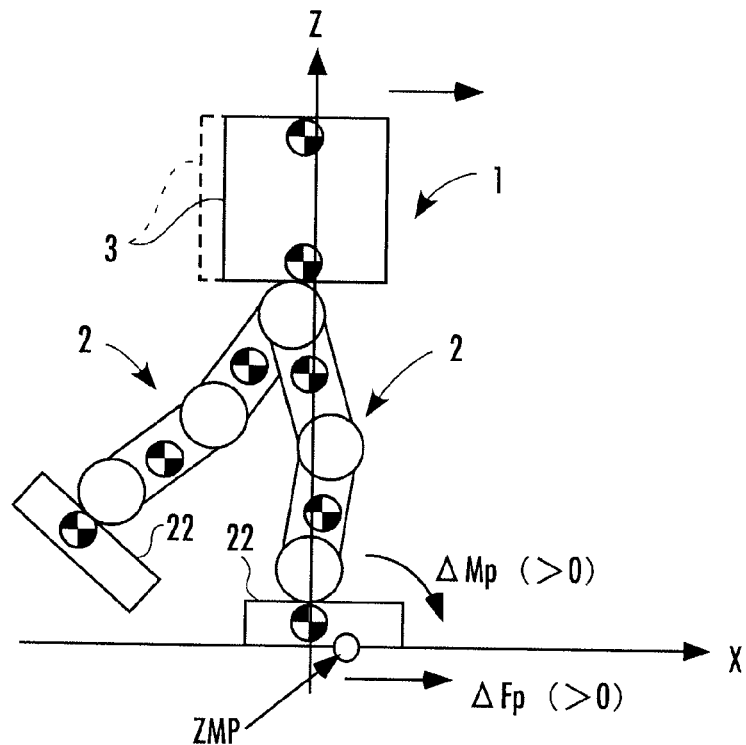
FIGS. 6(a) and (b) are diagrams for explaining the motion modes (a body translational mode and a body rotation mode), respectively, of the robot.
Figure 6B:
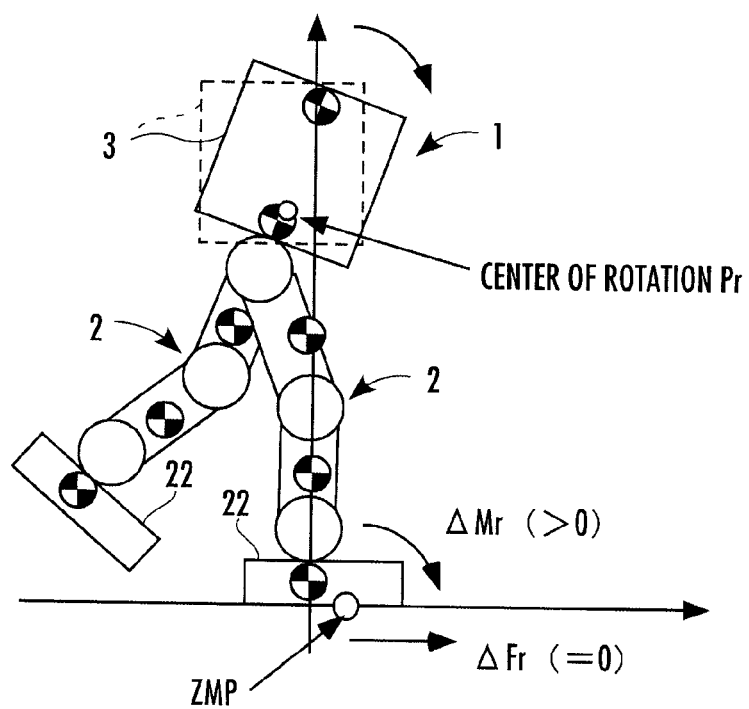
Figure 7:
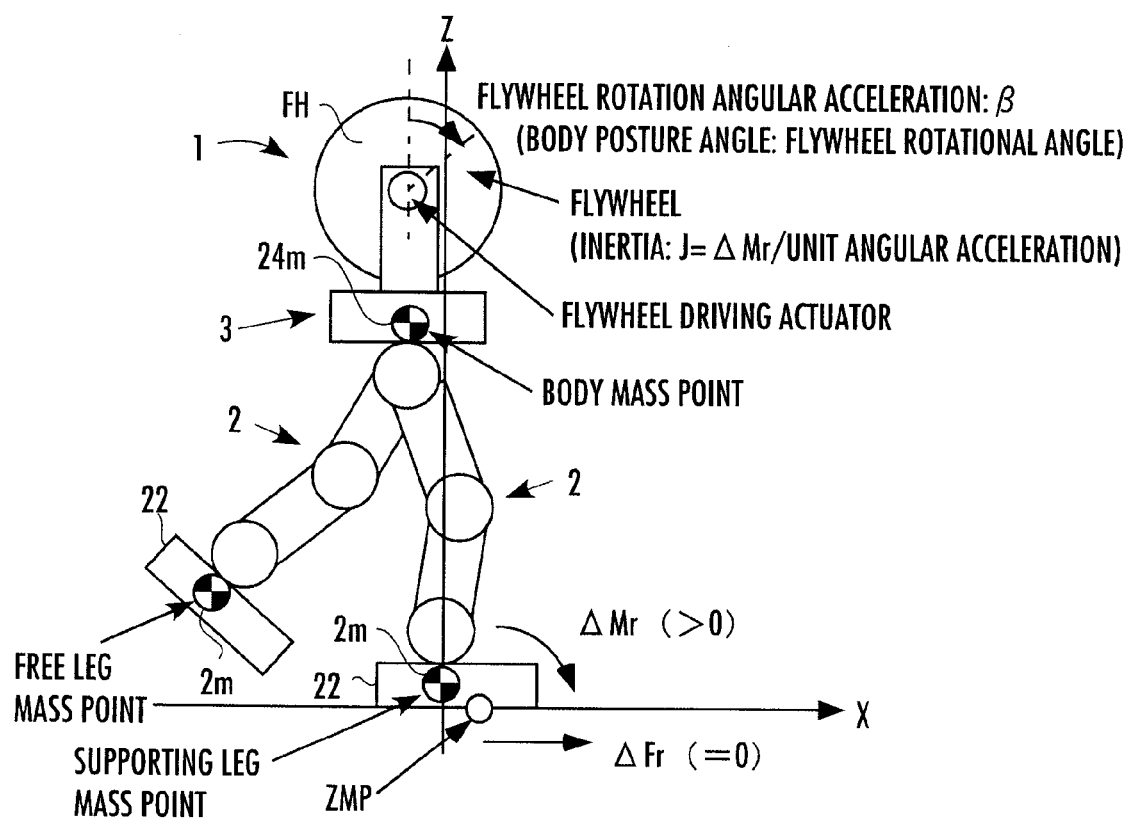
FIG. 7 is a diagram showing the structure of a first dynamic model (a simplified model) used for generating gaits.
Figure 8:
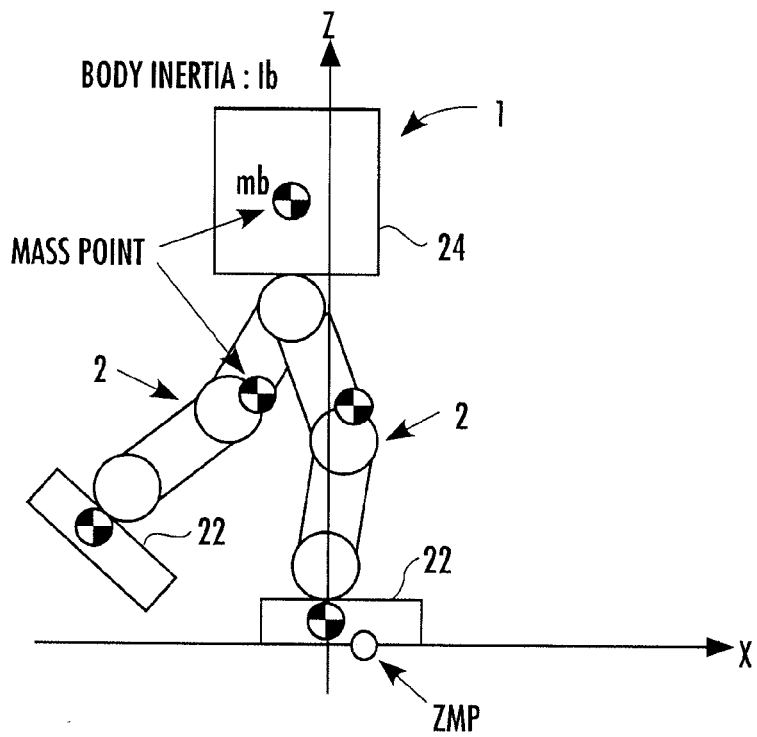
FIG. 8 is a diagram showing the structure of a second dynamic model (a semi-full model) used for generating gaits.
Figure 9:
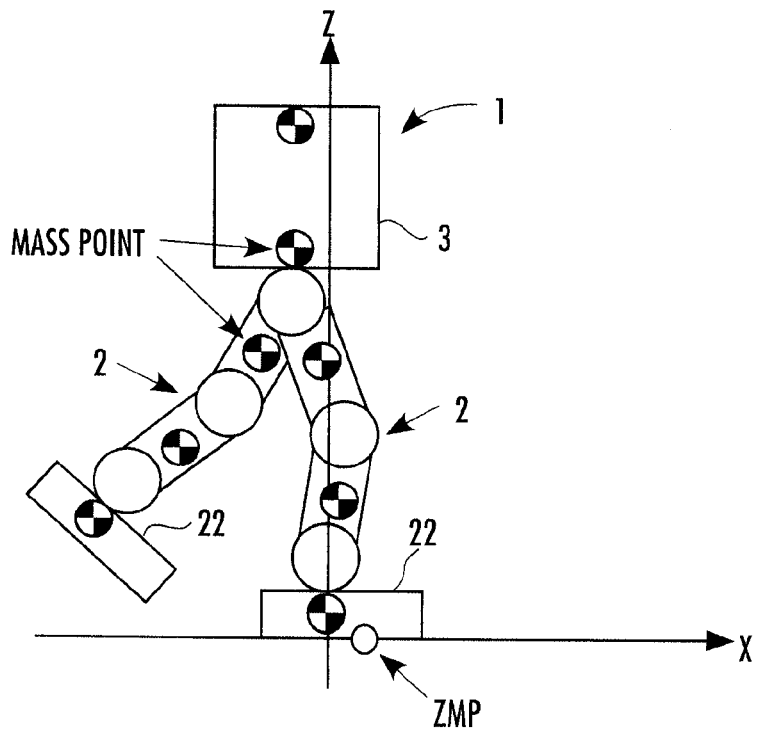
FIG. 9 is a diagram showing the structure of a full model used for generating gaits.
Figure 10:
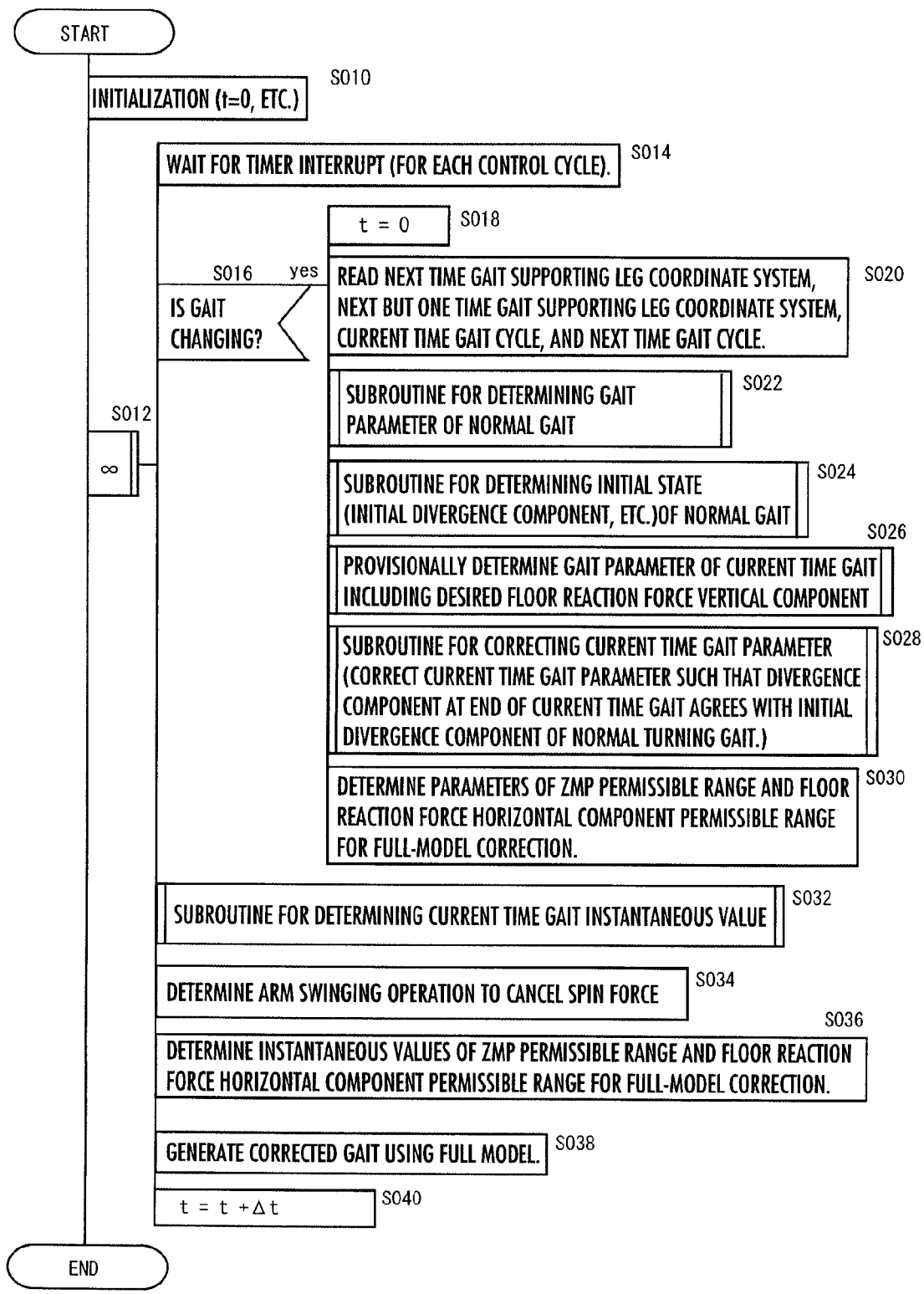
FIG. 10 is a flowchart showing the main routine processing of the gait generating device in an embodiment.
Figure 11:
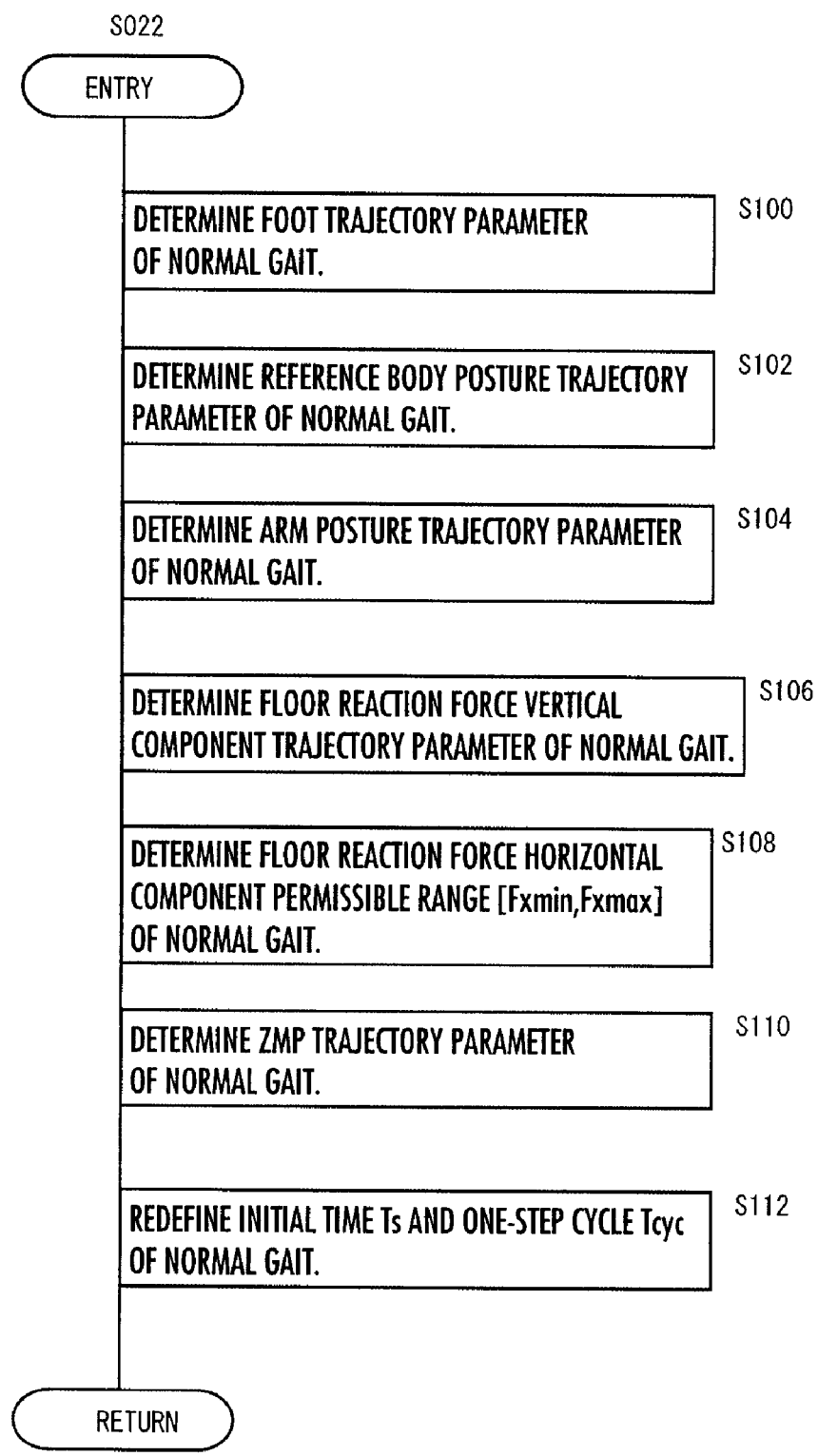
FIG. 11 is a flowchart showing the subroutine processing of FIG. 10.
Figure 13:
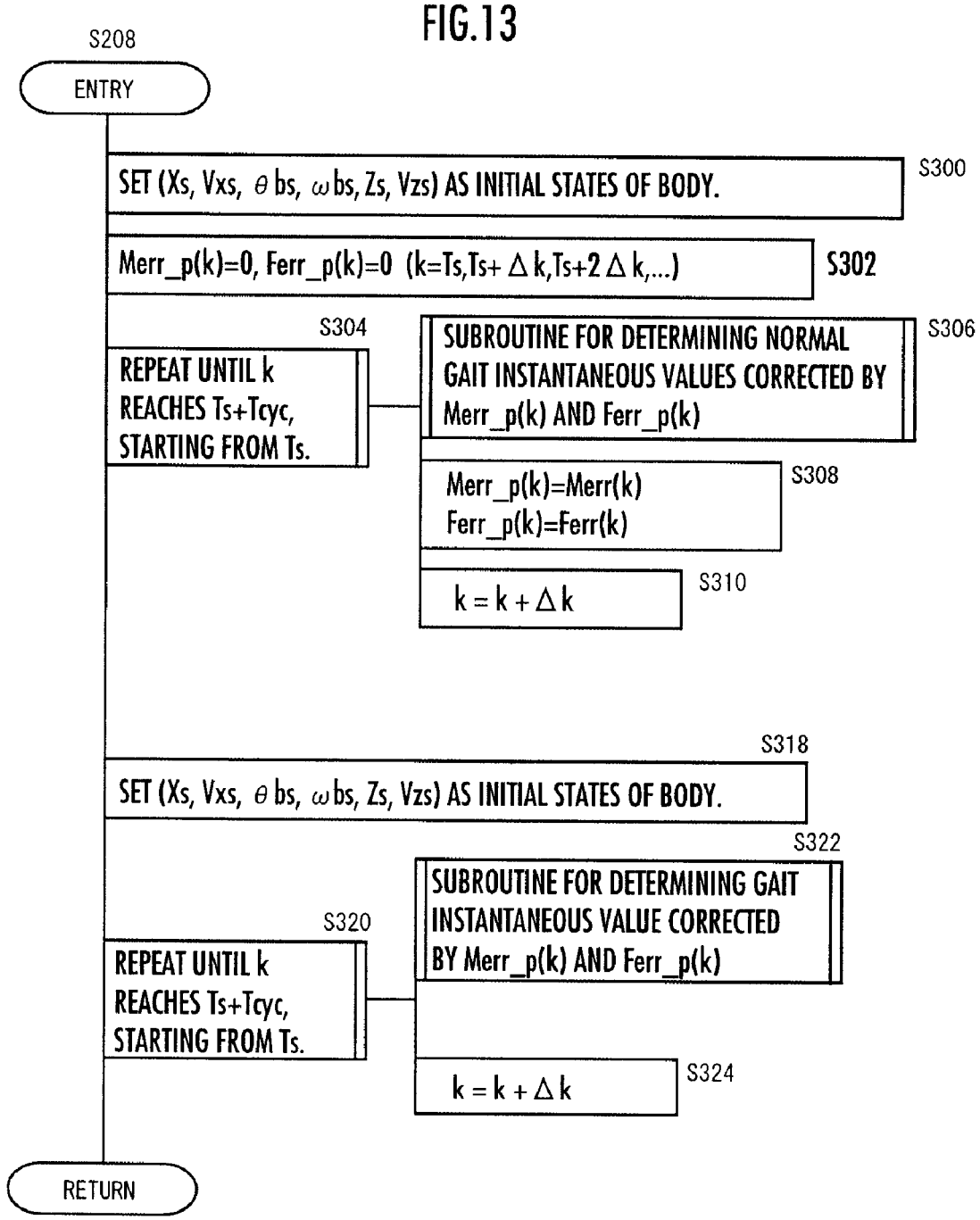
FIG. 13 is a flowchart showing the subroutine processing of FIG. 12.
Figure 15:
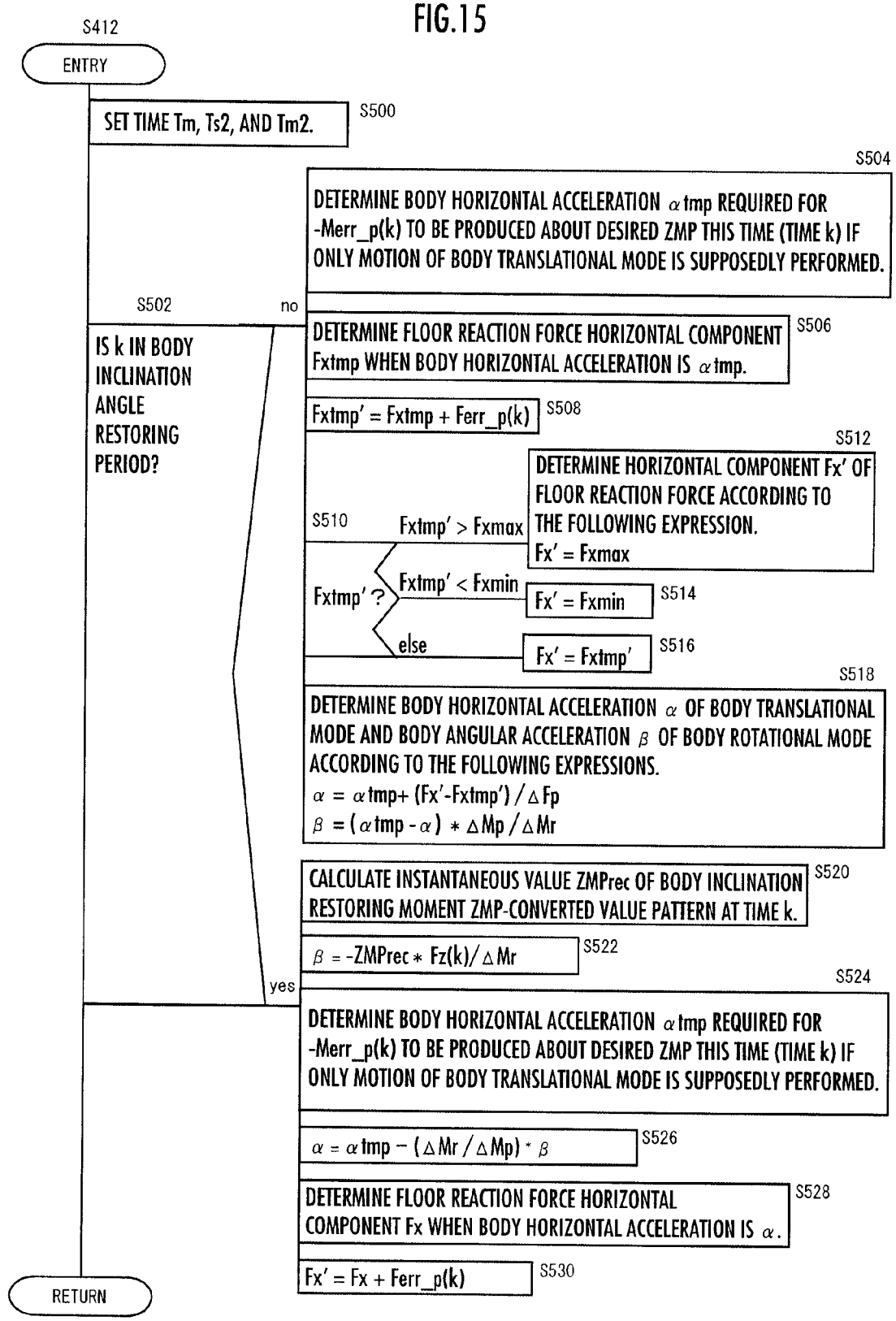
FIG. 15 is a flowchart showing the subroutine processing of FIG. 14.
Figure 16:
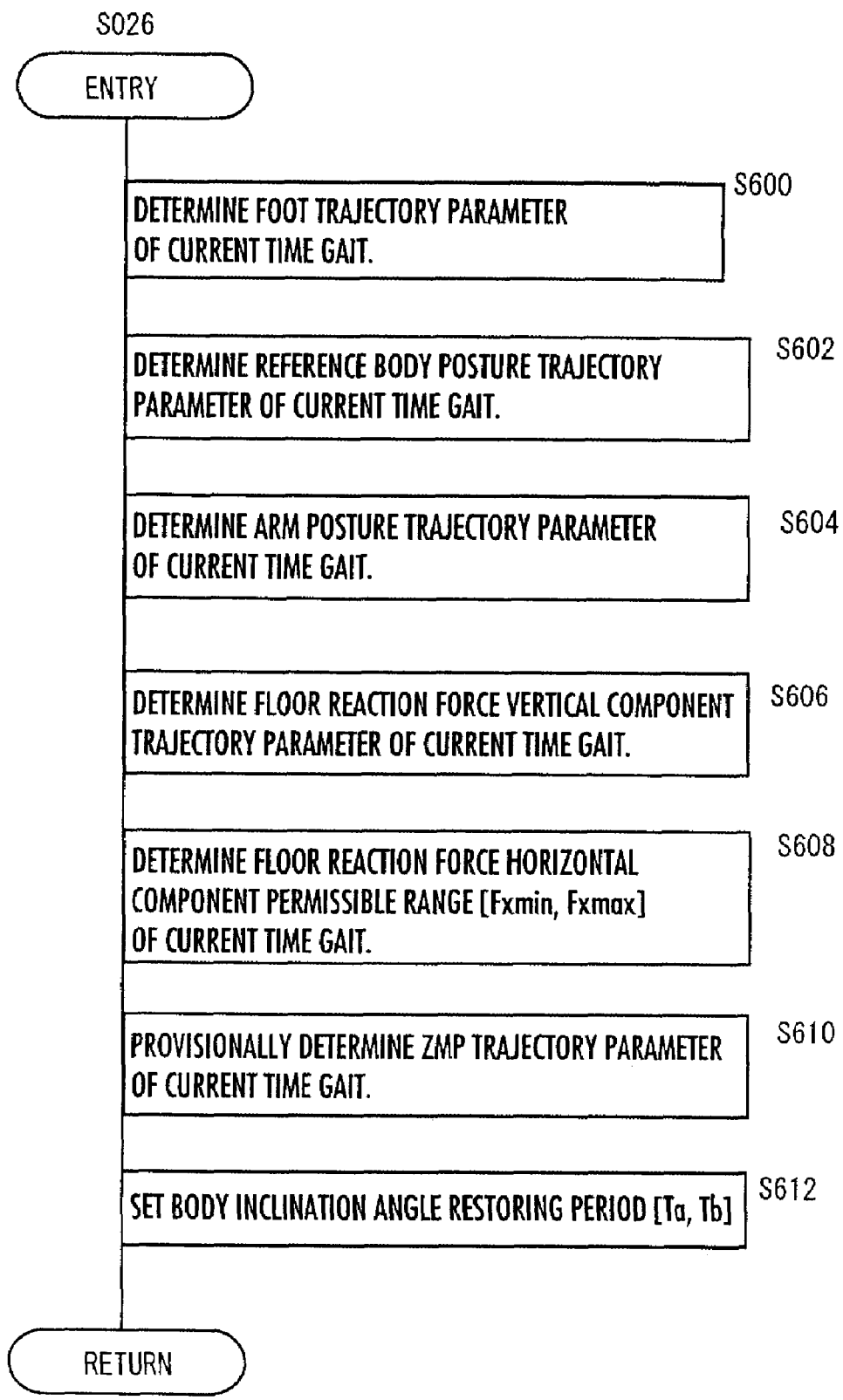
FIG. 16 is a flowchart showing the subroutine processing of FIG. 10.
Figure 17:
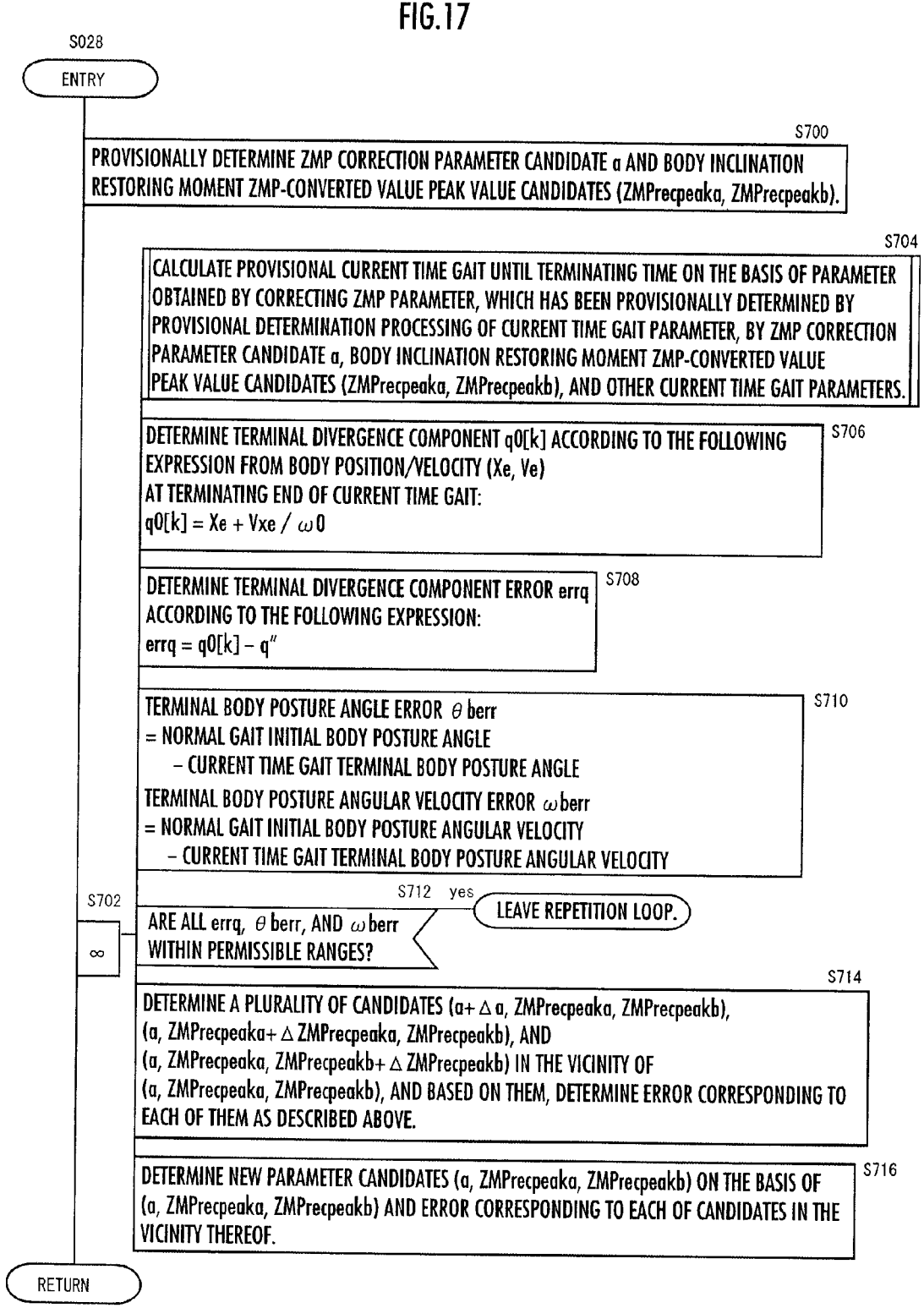
FIG. 17 is a flowchart showing the subroutine processing of FIG. 10.
Figure 18:
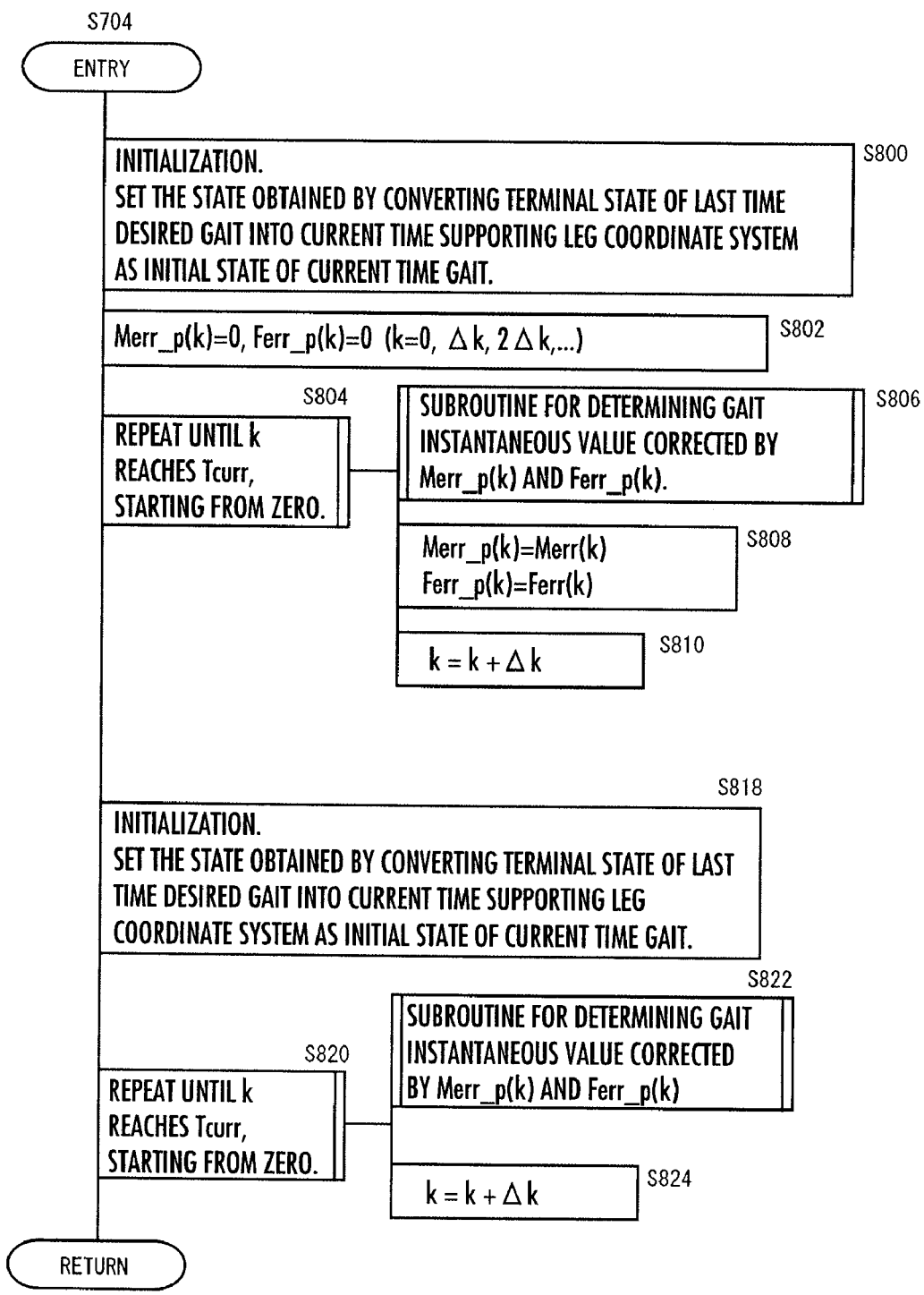
FIG. 18 is a flowchart showing the subroutine processing of FIG. 17.
Figure 19:
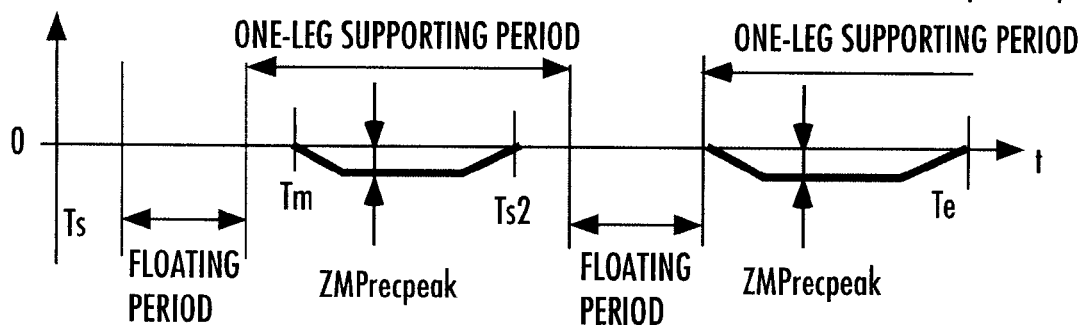
FIG. 19 is a graph showing examples of body inclination restoring moment ZMP-converted values in a normal gait.
Figure 20:
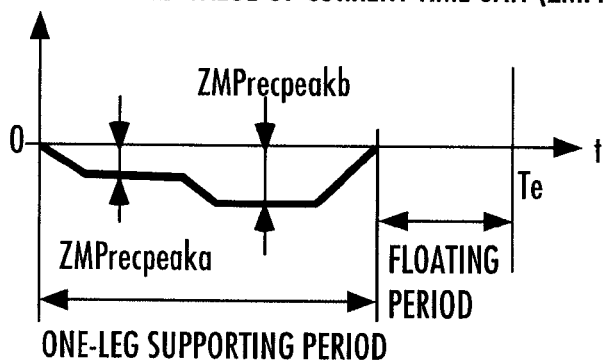
FIG. 20 is a graph showing examples of body inclination restoring moment ZMP-converted values in a current time's gait.
Figure 21:
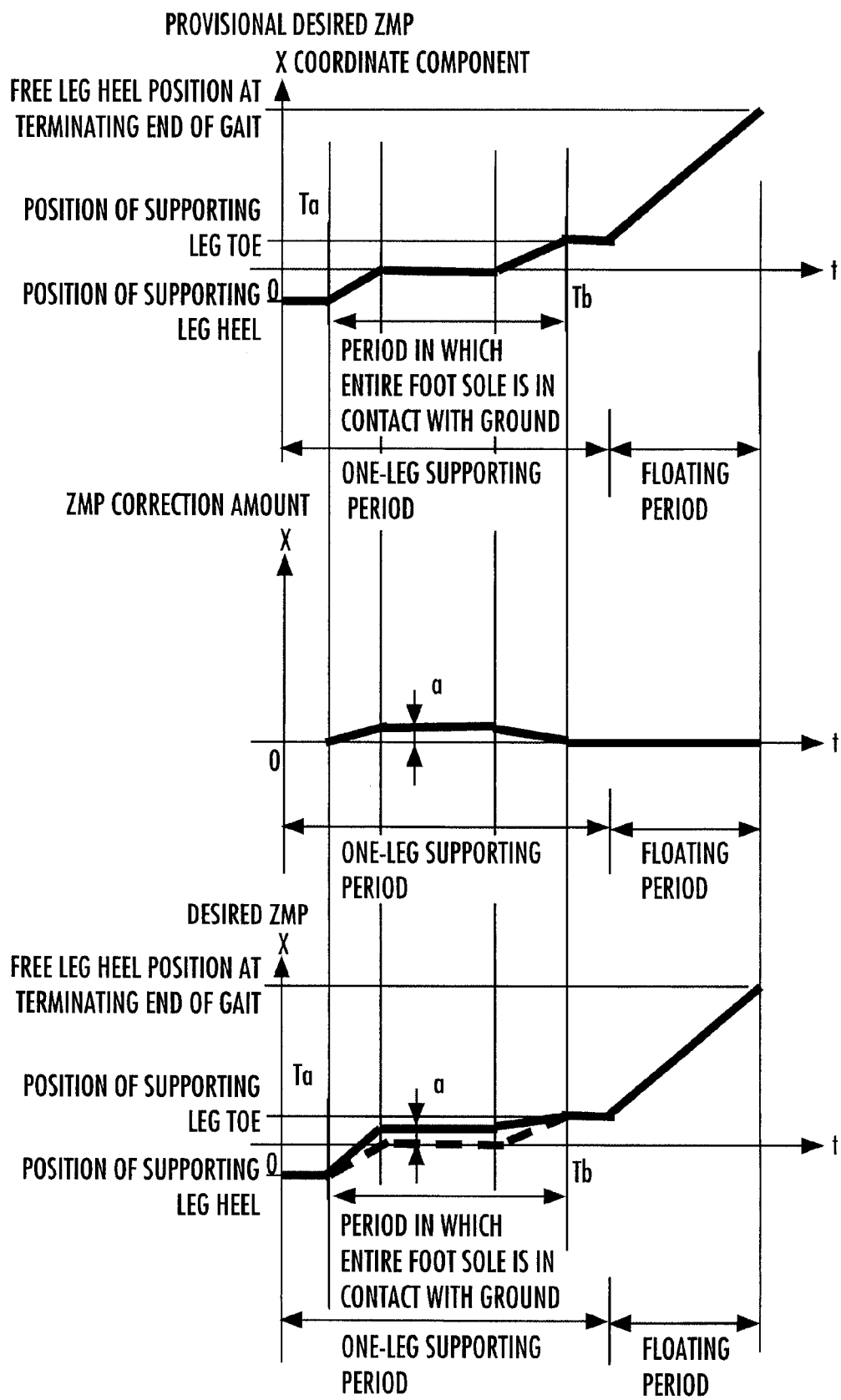
FIG. 21 is a graph showing examples of a provisional desired ZMP, a ZMP correction amount, and a desired ZMP in a current time's gait.

The invention claimed is:

1. A gait producing device for a moving robot that sets a desired value of a floor reaction force moment horizontal component generated by a motion of a moving robot and a permissible range of a translational floor reaction force horizontal component and produces a desired gait that includes at least a desired motion of the moving robot such that the desired value of the floor reaction force moment horizontal component and the permissible range of the translational floor reaction force horizontal component are satisfied, comprising:

a provisional motion creating means that uses a predetermined first dynamic model of the moving robot to create a provisional motion, which indicates a provisional value of the desired motion, such that the desired value of the floor reaction force moment horizontal component and the permissible range of the translational floor reaction force horizontal component are satisfied on the first dynamic model, and a provisional motion correcting means that corrects the created provisional motion by using the first dynamic model and a predetermined second dynamic model having a dynamic accuracy that is higher than that of the first dynamic model and obtains the corrected motion as the desired motion, wherein provided that, relative to arbitrary time t of the provisional motion, a difference between the floor reaction force moment horizontal component $M2(t)$ generated at the time t on the second dynamic model by the provisional motion and the floor reaction force moment horizontal component $M1(t)$ generated at the time t on the first dynamic model by the provisional motion ($M2(t)-M1(t)$) is defined as a floor reaction force moment horizontal component error Merr(t), and a difference between the translational floor reaction force horizontal component $F2(t)$ generated at the time t on the second dynamic model by the provisional motion and the translational floor reaction force horizontal component $F1(t)$ generated at the time t on the first dynamic model by the provisional motion ($F2(t)-F1(t)$) is defined as a translational floor reaction force horizontal component error Ferr(t), then the provisional motion correcting means corrects an instantaneous value of the provisional motion at the time t such that a value obtained by adding either the floor reaction force moment horizontal component error Merr(t) or a first floor reaction force correction amount determined on the basis of at least the floor reaction force moment horizontal component error Merr(t) to the floor reaction force moment horizontal component generated at the time t on the first dynamic model by a motion obtained by correcting the provisional motion agrees with the desired value at the time t, and a value obtained by adding either the translational floor reaction force horizontal component error Ferr(t) or a second floor reaction force correction amount determined on the basis of at least the translational floor reaction force horizontal component error Ferr(t) to a translational floor reaction force horizontal component generated at the time t on the first dynamic model by a motion obtained by correcting the provisional motion satisfies the permissible range at the time t.

2. A gait producing device for a moving robot that sets a desired value of a floor reaction force moment horizontal component generated by a motion of a moving robot and a permissible range of a translational floor reaction force horizontal component and produces a desired gait that includes at least a desired motion of the moving robot such that the desired value of the floor reaction force moment horizontal component and the permissible range of the translational floor reaction force horizontal component are satisfied, comprising:

a provisional motion creating means that uses a predetermined first dynamic model of the moving robot to create a provisional motion, which indicates a provisional value of the desired motion, such that the desired value of the floor reaction force moment horizontal component and the permissible range of the translational floor reaction force horizontal component are satisfied on the first dynamic model, and a provisional motion correcting means that corrects the created provisional motion by using the first dynamic model and a predetermined second dynamic model having a dynamic accuracy that is higher than that of the first dynamic model and obtains the corrected motion as the desired motion, wherein provided that, relative to arbitrary time t of the provisional motion, a difference between the floor reaction force moment horizontal component $M2(t)$ generated at the time t on the second dynamic model by the provisional motion and the desired value MT(t) of the floor reaction force moment horizontal component at the time t ($M2(t)-MT(t)$) is defined as a floor reaction force moment horizontal component error Merr(t), and a difference between the translational floor reaction force horizontal component $F2(t)$ generated at the time t on the second dynamic model by the provisional motion and the translational floor reaction force horizontal component $F1(t)$ generated at the time t on the first dynamic model by the provisional motion ($F2(t)-F1(t)$) is defined as a translational floor reaction force horizontal component error Ferr(t), then the provisional motion correcting means corrects an instantaneous value of the provisional motion at the time t such that a value obtained by adding either the floor reaction force moment horizontal component error Merr(t) or a first floor reaction force correction amount determined on the basis of at least the floor reaction force moment horizontal component error Merr(t) to the floor reaction force moment horizontal component generated at the time t on the first dynamic model by a motion obtained by correcting the provisional motion agrees with the desired value at the time t, and a value obtained by adding either the translational floor reaction force horizontal component error Ferr(t) or a second floor reaction force correction amount determined on the basis of at least the translational floor reaction force horizontal component error Ferr(t) to the translational floor reaction force horizontal component generated at the time t on the first dynamic model by a motion obtained by correcting the provisional motion satisfies the permissible range at the time t.

3. A gait producing device for a moving robot that sets a desired ZMP of a moving robot and a permissible range of a translational floor reaction force horizontal component generated by a motion of the moving robot, and generates a desired gait that includes at least a desired motion of the moving robot such that the desired ZMP and the permissible range of the translational floor reaction force horizontal component are satisfied, comprising:

a provisional motion creating means that uses a predetermined first dynamic model of the moving robot to create a provisional motion, which indicates a provisional value of the desired motion, such that the desired ZMP and the permissible range of the translational floor reaction force horizontal component are satisfied on the first dynamic model, and a provisional motion correcting means that corrects the created provisional motion by using the first dynamic model and a predetermined second dynamic model having a dynamic accuracy that is higher than that of the first dynamic model and obtains the corrected motion as the desired motion, wherein provided that, relative to arbitrary time t of the provisional motion, a difference between $ZMP2(t)$, which is a ZMP calculated at the time t on the second dynamic model from the provisional motion, and $ZMP1(t)$, which is a ZMP calculated at time t on the first dynamic model from the provisional motion, $(ZMP2(t)-ZMP1(t))$ is defined as a ZMP error ZMPerr(t), and a difference between the translational floor reaction force horizontal component $F2(t)$ generated at the time t on the second dynamic model by the provisional motion and the translational floor reaction force horizontal component $F1(t)$ generated at the time t on the first dynamic model by the provisional motion $(F2(t)-F1(t))$ is defined as a translational floor reaction force horizontal component error Ferr(t), then the provisional motion correcting means corrects an instantaneous value of the provisional motion at the time t such that a value obtained by adding either the ZMP error ZMPerr(t) or a ZMP correction amount determined on the basis of at least the ZMP error ZMPerr(t) to a ZMP calculated at the time t on the first dynamic model from a motion obtained by correcting the provisional motion agrees with the desired ZMP at the time t, and a value obtained by adding either the translational floor reaction force horizontal component error Ferr(t) or a floor reaction force correction amount determined on the basis of at least the translational floor reaction force horizontal component error Ferr(t) to the translational floor reaction force horizontal component generated at the time t on the first dynamic model by a motion obtained by correcting the provisional motion satisfies the permissible range at the time t.

4. A gait producing device for a moving robot that sets a desired ZMP of a moving robot and a permissible range of a translational floor reaction force horizontal component generated by a motion of the moving robot, and generates a desired gait that includes at least a desired motion of the moving robot such that the desired ZMP and the permissible range of the translational floor reaction force horizontal component are satisfied, comprising:

a provisional motion creating means that uses a predetermined first dynamic model of the moving robot to create a provisional motion, which indicates a provisional value of the desired motion, such that the desired ZMP and the permissible range of the translational floor reaction force horizontal component are satisfied on the first dynamic model, and a provisional motion correcting means that corrects the created provisional motion by using the first dynamic model and a predetermined second dynamic model having a dynamic accuracy that is higher than that of the first dynamic model and obtains the corrected motion as the desired motion, wherein provided that, relative to arbitrary time t of the provisional motion, a difference between $ZMP2(t)$, which is a ZMP calculated at the time t on the second dynamic model from the provisional motion, and a desired ZMP(t), which is the desired ZMP at the time t, $(ZMP2(t)$-desired $ZMP(t))$ is defined as a ZMP error ZMPerr(t), and a difference between the translational floor reaction force horizontal component $F2(t)$ generated at the time t on the second dynamic model by the provisional motion and the translational floor reaction force horizontal component $F1(t)$ generated at the time t on the first dynamic model by the provisional motion $(F2(t)-F1(t))$ is defined as a translational floor reaction force horizontal component error Ferr(t), then the provisional motion correcting means corrects an instantaneous value of the provisional motion at the time t such that a value obtained by adding either the ZMP error ZMPerr(t) or a ZMP correction amount determined on the basis of at least the ZMP error ZMPerr(t) to a ZMP calculated at the time t on the first dynamic model from a motion obtained by correcting the provisional motion agrees with the desired ZMP(t) at the time t, and a value obtained by adding either the translational floor reaction force horizontal component error Ferr(t) or a floor reaction force correction amount determined on the basis of at least the translational floor reaction force horizontal component error Ferr(t) to the translational floor reaction force horizontal component generated at the time t on the first dynamic model by a motion obtained by correcting the provisional motion satisfies the permissible range at the time t.

* * * * *